(12) United States Patent
Uenaka

(10) Patent No.: US 8,150,251 B2
(45) Date of Patent: Apr. 3, 2012

(54) PHOTOGRAPHIC APPARATUS

(75) Inventor: Yukio Uenaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 18 days.

(21) Appl. No.: 12/630,095

(22) Filed: Dec. 3, 2009

(65) Prior Publication Data

US 2010/0158492 A1    Jun. 24, 2010

(30) Foreign Application Priority Data

Dec. 22, 2008  (JP) ................................ 2008-326471
Dec. 22, 2008  (JP) ................................ 2008-326514
Dec. 22, 2008  (JP) ................................ 2008-326561
Dec. 22, 2008  (JP) ................................ 2008-326573

(51) Int. Cl.
   *G03B 17/00*  (2006.01)
   *G03B 17/18*  (2006.01)

(52) U.S. Cl. ......................................... 396/55; 396/287

(58) Field of Classification Search .................... 396/50, 396/52–55, 281, 287, 291, 296; 348/208.99, 348/208.2, 208.4, 208.7, 208.11, 208.12, 348/219.1, 374
See application file for complete search history.

(56) References Cited

U.S. PATENT DOCUMENTS

| | | | |
|---|---|---|---|
| 6,556,783 B1 | 4/2003 | Gelphman | |
| 7,639,933 B2 | 12/2009 | Seo et al. | |
| 2005/0206736 A1* | 9/2005 | Ng et al. | 348/208.7 |
| 2006/0257128 A1* | 11/2006 | Ishito et al. | 396/55 |
| 2009/0005165 A1* | 1/2009 | Arezina et al. | 463/37 |
| 2009/0040329 A1 | 2/2009 | Uehara | |
| 2009/0040347 A1 | 2/2009 | Uehara | |
| 2009/0245768 A1 | 10/2009 | Uenaka | |
| 2009/0245770 A1 | 10/2009 | Uenaka | |
| 2009/0245771 A1 | 10/2009 | Uenaka | |
| 2009/0245773 A1 | 10/2009 | Uenaka | |
| 2009/0245774 A1 | 10/2009 | Uenaka | |
| 2009/0251551 A1 | 10/2009 | Uenaka | |

FOREIGN PATENT DOCUMENTS

| | | |
|---|---|---|
| JP | 2006-071743 | 3/2006 |
| JP | 2007-025616 | 6/2006 |

OTHER PUBLICATIONS

U.S. Appl. No. 12/629,090 to Uenaka, filed Dec. 2, 2009.
U.S. Appl. No. 12/629,074 to Uenaka, filed Dec. 2, 2009.
U.S. Appl. No. 12/629,076 to Uenaka, filed Dec. 2, 2009.
U.S. Appl. No. 12/629,080 to Uenaka, filed Dec. 2, 2009.
U.S. Appl. No. 12/629,082 to Uenaka, filed Dec. 2, 2009.
U.S. Appl. No. 12/629,085 to Uenaka, filed Dec. 2, 2009.

* cited by examiner

*Primary Examiner* — W. B. Perkey
*Assistant Examiner* — Minh Phan
(74) *Attorney, Agent, or Firm* — Greenblum & Bernstein, P.L.C.

(57) ABSTRACT

A photographic apparatus comprises a movable platform, an operation unit, and a controller. The movable platform has an imager that captures an optical image through a taking lens, and is movable relative to the taking lens on an xy plane perpendicular to an optical axis of the taking lens. The operation unit is configured to set a movement quantity of the movable platform on the xy plane. The controller performs a controlled movement of the movable platform in accordance to the movement quantity set by using the operation unit.

25 Claims, 33 Drawing Sheets

Direction of gravitational force

Direction of gravitational force

Direction of gravitational force

PHOTOGRAPHIC APPARATUS

BACKGROUND OF THE INVENTION

1. Field of the Invention

The present invention relates to a photographic apparatus, and in particular, to a photographic apparatus that adjusts a picture-composition by moving a movable platform including an imager.

2. Description of the Related Art

The shifter that holds and moves a photographic apparatus in one direction perpendicular to an optical axis of the photographic apparatus is proposed, as shown in U.S. Pat. No. 6,556,783. By using the shifter, the picture-composition can be adjusted.

However, this shifter has to move all parts of the photographic apparatus. Therefore, a device for adjusting the picture-composition, such as the shifter, is enlarged. Furthermore, it is also difficult to perform a fine adjustment of the picture-composition.

SUMMARY OF THE INVENTION

Therefore, an object of the present invention is to provide a photographic apparatus that performs the picture-composition without moving the photographic apparatus.

According to the present invention, a photographic apparatus comprises a movable platform, an operation unit, and a controller. The movable platform has an imager that captures an optical image through a taking lens, and is movable relative to the taking lens on an xy plane perpendicular to an optical axis of the taking lens. The operation unit is configured to set a movement quantity of the movable platform on the xy plane. The controller performs a controlled movement of the movable platform in accordance to the movement quantity set by using the operation unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
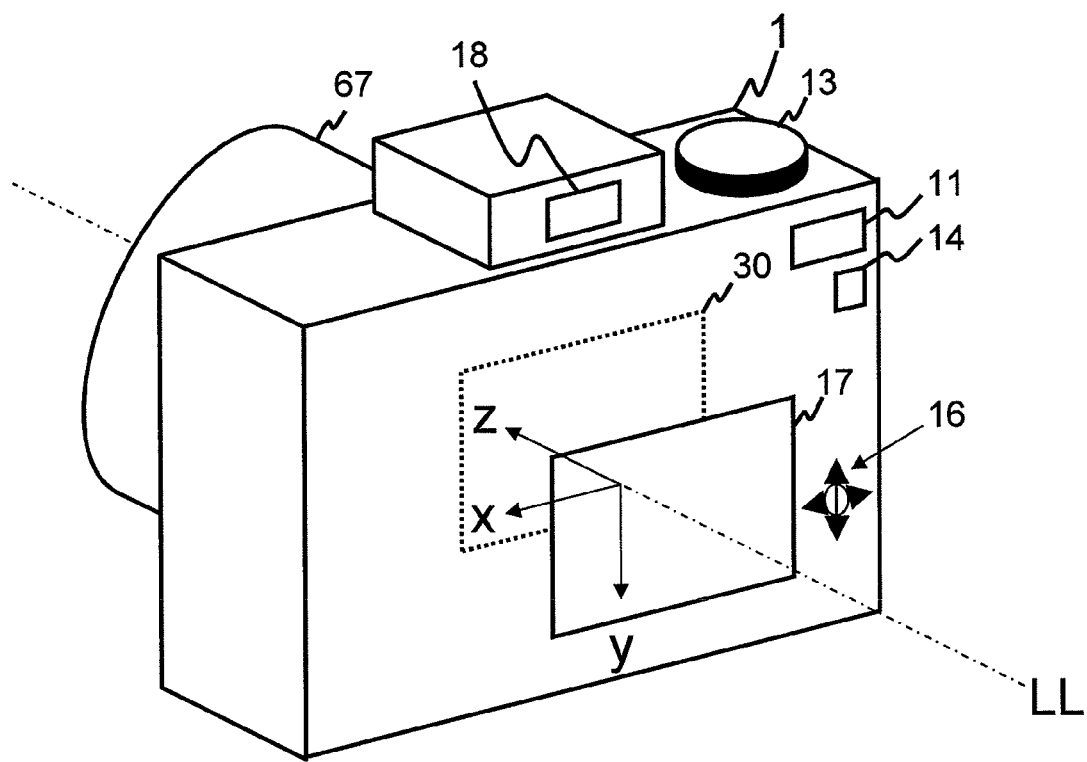
FIG. 1 is a perspective view of the embodiment of the photographic apparatus as viewed from the rear.

The present invention is described below with reference to the embodiment shown in the drawings. In the embodiment, the photographic apparatus 1 is a digital camera. A camera lens (i.e. taking lens) 67 of the photographic apparatus 1 has the optical axis LL.

By way of orientation in the embodiment, the x direction, the y direction, and the z direction are defined (see FIG. 1). The x direction is the direction perpendicular to the optical axis LL. The y direction is the direction perpendicular to both the optical axis LL and the x direction. The z direction is the direction parallel to the optical axis LL and perpendicular to both the x direction and the y direction.

The relationships between the direction of gravitational force and the x direction, the y direction, and the z direction, change according to the orientation of the photographic apparatus 1.

Figure 2:
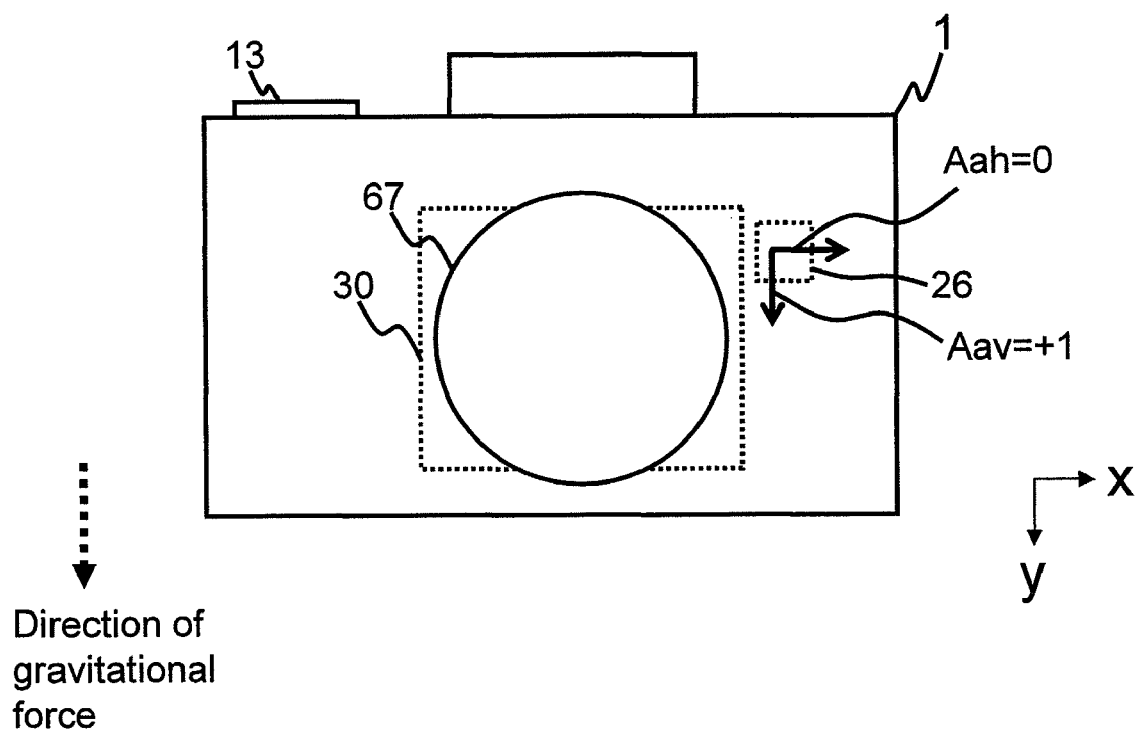
FIG. 2 is a front view of the photographic apparatus, when the photographic apparatus is held in the first horizontal orientation.

For example, when the photographic apparatus 1 is held in the first horizontal orientation, in other words, when the photographic apparatus 1 is held horizontally and the upper surface of the photographic apparatus 1 faces upward (see FIG. 2), the x direction and the z direction are perpendicular to the direction of gravitational force and the y direction is parallel to the direction of gravitational force.

Figure 3:
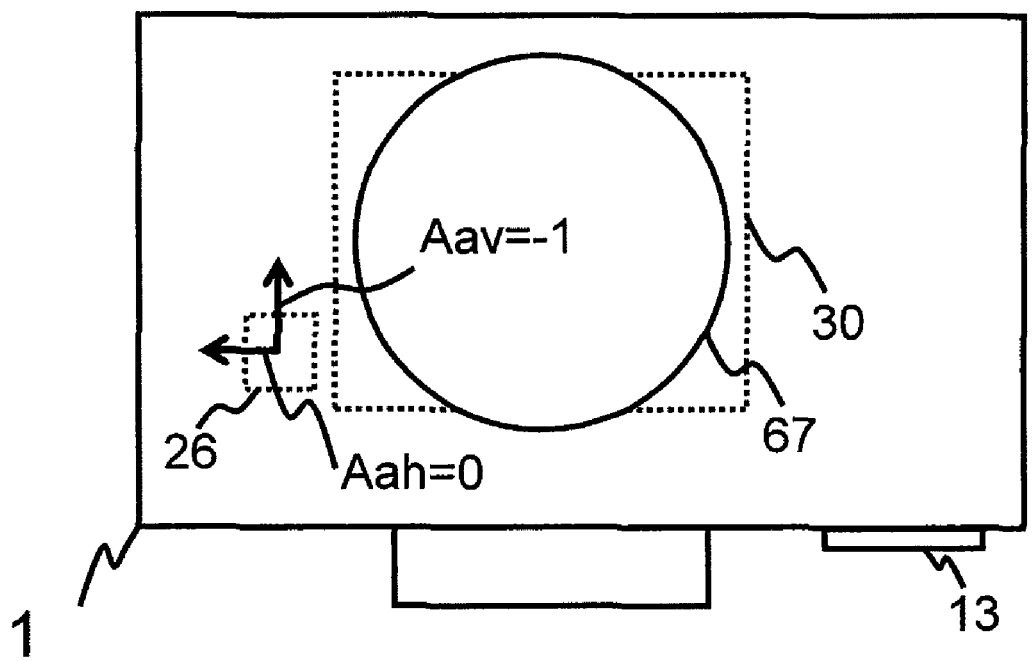
FIG. 3 is a front view of the photographic apparatus, when the photographic apparatus is held in the second horizontal orientation.

When the photographic apparatus 1 is held in the second horizontal orientation, in other words, when the photographic apparatus 1 is held horizontally and the lower surface of the photographic apparatus 1 faces upward (see FIG. 3), the x direction and the z direction are perpendicular to the direction of gravitational force and the y direction is parallel to the direction of gravitational force.

Figure 4:
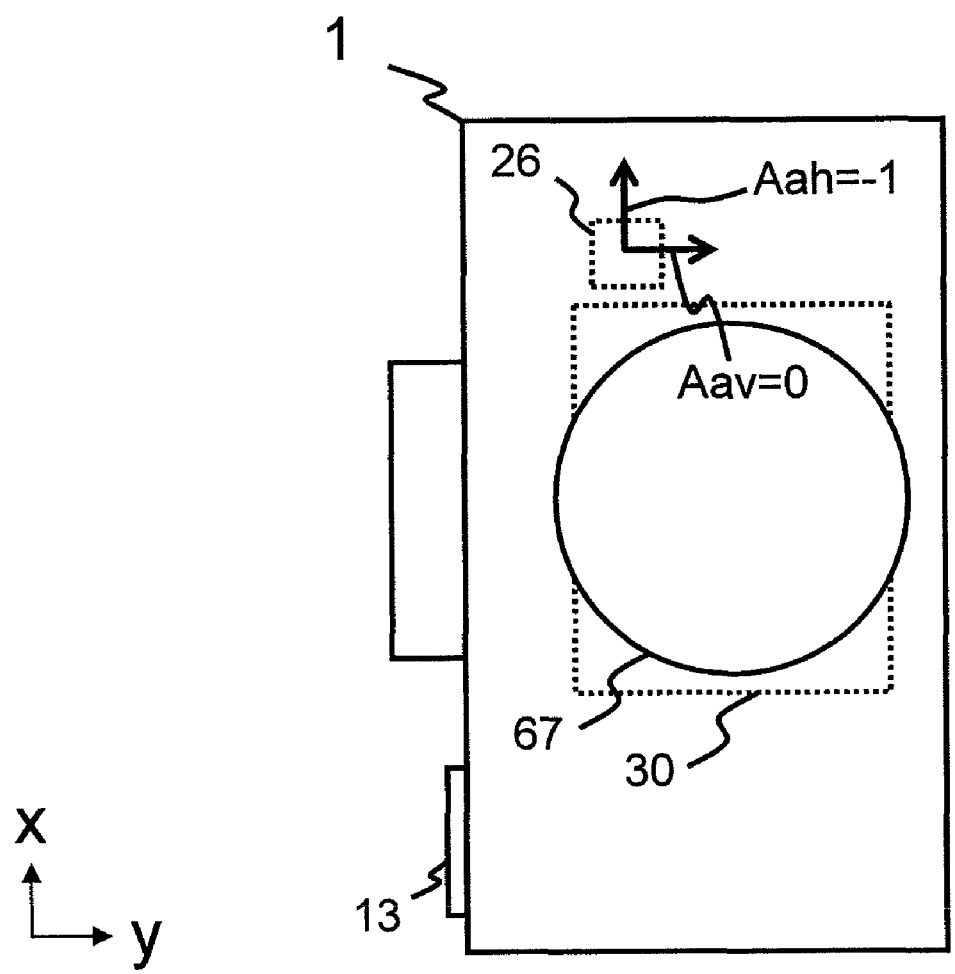
FIG. 4 is a front view of the photographic apparatus, when the photographic apparatus is held in the first vertical orientation.

When the photographic apparatus 1 is held in the first vertical orientation, in other words, when the photographic apparatus 1 is held vertically and one of the side surfaces of the photographic apparatus 1 faces upward (see FIG. 4), the x direction is parallel to the direction of gravitational force and the y direction and the z direction are perpendicular to the direction of gravitational force.

Figure 5:
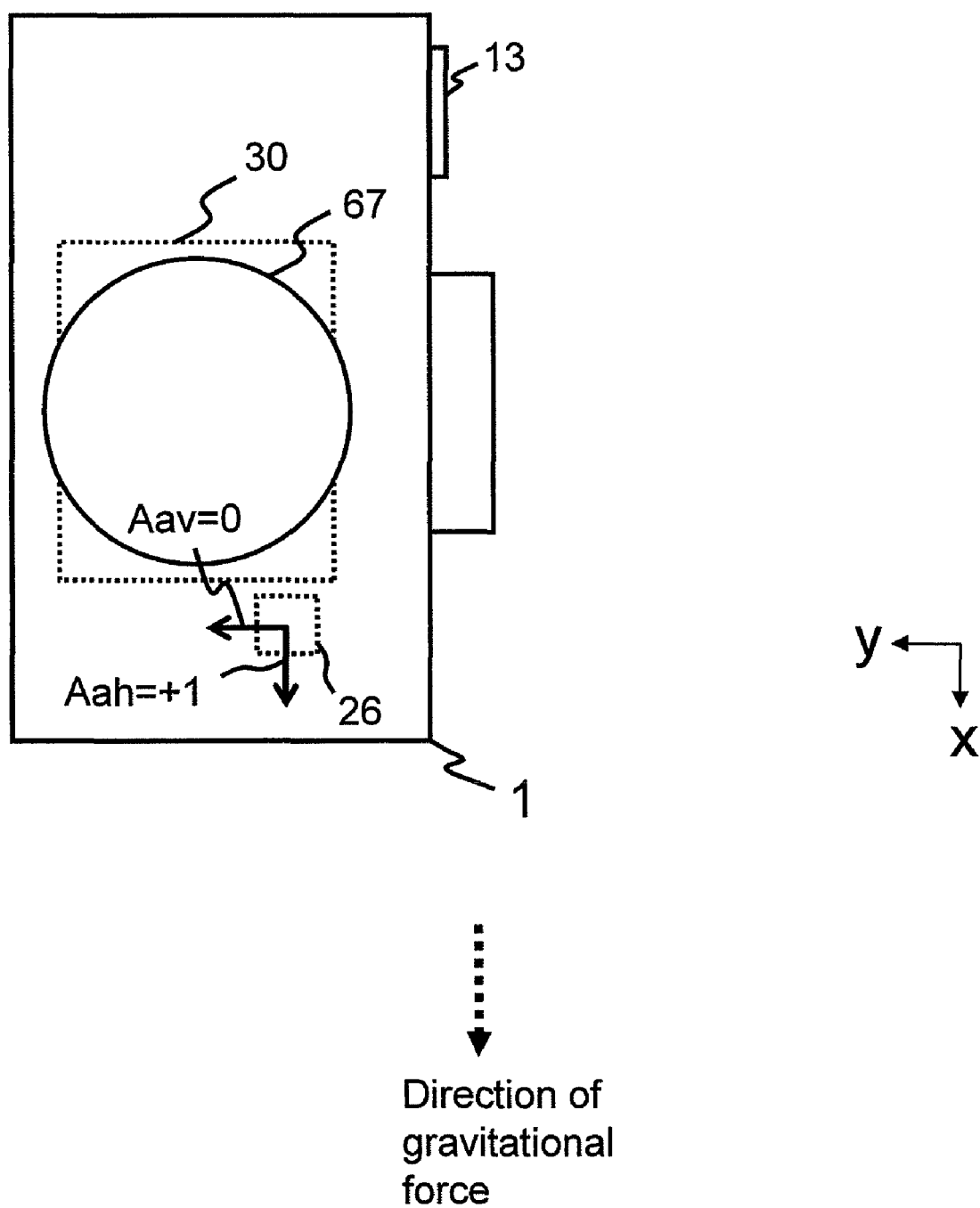
FIG. 5 is a front view of the photographic apparatus, when the photographic apparatus is held in the second vertical orientation.

When the photographic apparatus 1 is held in the second vertical orientation, in other words, when the photographic apparatus 1 is held vertically and the other side surface of the photographic apparatus 1 faces upward (see FIG. 5), the x direction is parallel to the direction of gravitational force and the y direction and the z direction are perpendicular to the direction of gravitational force.

When the front surface of the photographic apparatus 1 faces in the direction of gravitational force, the x direction and the y direction are perpendicular to the direction of gravitational force and the z direction is parallel to the direction of gravitational force. The front surface of the photographic apparatus 1 is the side on which the camera lens 67 is attached.

The imaging part of the photographic apparatus 1 comprises a PON button 11, a PON switch 11a, a shutter release button 13, a shutter release switch 13a for an exposure operation, a picture-composition adjustment ON/OFF button 14, a picture-composition adjustment ON/OFF switch 14a, picture-composition adjustment keys 16, a display 17 such as an LCD monitor or the like, an optical finder 18, a DSP 19, a CPU 21, an AE (automatic exposure) unit 23, an AF (automatic focus) unit 24, an imaging unit 39a in the picture-composition adjustment unit 30, and the camera lens 67 (see FIGS. 1, 2, 6, and 7).

The picture-composition adjustment keys 16 includes a right direction key 16a, a left direction key 16b, an upward direction key 16c, a downward direction key 16d, a right-hand rotation key 16e, and a left-hand rotation key 16f.

The PON button 11, the picture-composition adjustment ON/OFF button 14, the picture-composition adjustment keys 16, and the display 17 are arranged on the back surface of the photographic apparatus 1.

Whether the PON switch 11a is in the ON state or OFF state is determined by the state of the PON button 11. The ON/OFF states of the photographic apparatus 1 correspond to the ON/OFF states of the PON switch 11a.

The subject image is captured as an optical image through the camera lens 67 by the imaging unit 39a, and the captured image is displayed on the display 17. The subject image can be optically observed through the optical finder 18.

When the shutter release button 13 is fully depressed by the operator, the shutter release switch 13a changes to the ON state so that the imaging operation is performed by the imaging unit 39a (the imaging apparatus), and the captured image is stored.

The information indicating whether the shutter release switch 13a is in the ON or OFF state is input to port P13 of the CPU 21 as a 1-bit digital signal.

The right direction key 16a is connected to port P21 of the CPU 21. When the right direction key 16a is depressed in the picture-composition adjustment mode, the movable platform 30a is moved in the left direction, as viewed from the rear, so as to move the picture-composition in the right direction; in other words, to capture the photographic subject further toward the right side compared to before movement (horizontal movement quantity H: positive direction).

The left direction key 16b is connected to port P22 of the CPU 21. When the left direction key 16b is depressed in the picture-composition adjustment mode, the movable platform 30a is moved in the right direction, as viewed from the rear, so as to move the picture-composition in the left direction; in other words, to capture the photographic subject further toward the left side compared to before movement (horizontal movement quantity H: negative direction).

The upward direction key 16c is connected to port P23 of the CPU 21. When the upward direction key 16c is depressed in the picture-composition adjustment mode, the movable platform 30a is moved in the downward direction so as to move the picture-composition in the upward direction; in other words, to capture the photographic subject further toward the upper side compared to before movement (vertical movement quantity V: positive direction).

The downward direction key 16d is connected to port P24 of the CPU 21. When the downward direction key 16d is depressed in the picture-composition adjustment mode, the movable platform 30a is moved in the upward direction so as to move the picture-composition in the downward direction; in other words, to capture the photographic subject further toward the lower side compared to before movement (vertical movement quantity V: negative direction).

The right-hand rotation key 16e is connected to port P25 of the CPU 21. When the right-hand rotation key 16e is depressed in the picture-composition adjustment mode, the movable platform 30a is rotated in the right-hand direction (clockwise direction), as viewed from the rear, so as to rotate the picture-composition in the right-hand direction; in other words, to capture the photographic subject further toward the right-hand side compared to before movement (rotation quantity α: positive direction).

The left-hand rotation key 16f is connected to port P26 of the CPU 21. When the left-hand rotation key 16f is depressed in the picture-composition adjustment mode, the movable platform 30a is rotated in the left-hand direction (counter-clockwise direction), as viewed from the rear, so as to rotate the picture-composition in the left-hand direction; in other words, to capture the photographic subject further toward the left-hand side compared to before movement (rotation quantity α: negative direction).

On the opposite side of the right direction key 16a, left direction key 16b, upward direction key 16c, downward direction key 16d, right-hand direction key 16e, and left-hand direction key 16f, backlights are arranged.

For a warning, which is described later, the backlight of the corresponding key emits a warning light so that at least one part of the key arranged on the emitting backlight is illuminated; in other words, at least one part of the key arranged above the backlight transmits the light emitted from the backlight.

Therefore, each of the right direction key 16a, left direction key 16b, upward direction key 16c, downward direction key 16d, right-hand direction key 16e, and left-hand direction key 16f has a translucent member that transmits the light emitted from the corresponding backlight.

The display 17 is connected to port P6 of the CPU 21 for inputting and outputting signals.

Figure 8:
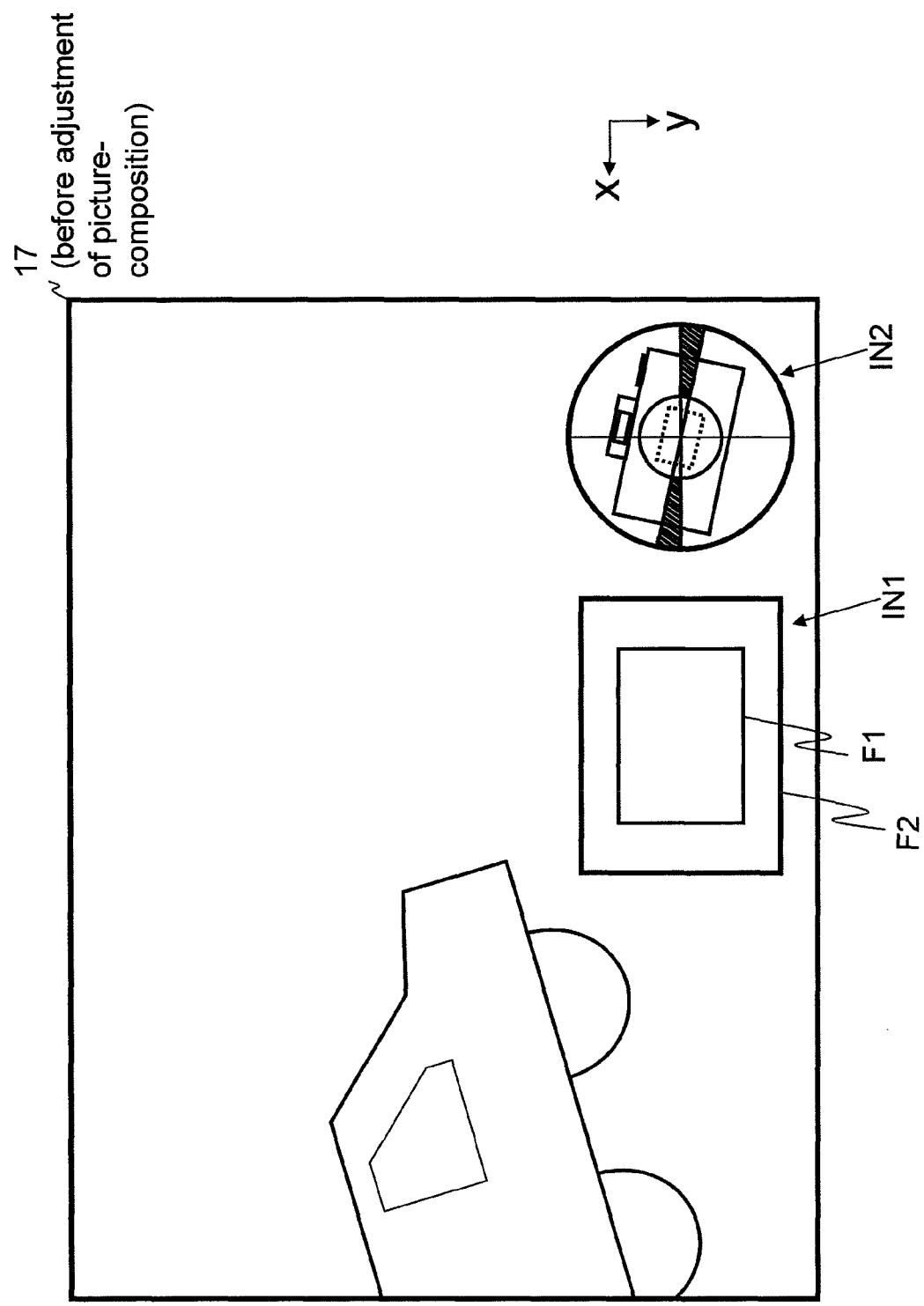
FIG. 8 is a through image including the displayed first information and the displayed second information before the picture-composition adjustment is performed.
Figure 9:
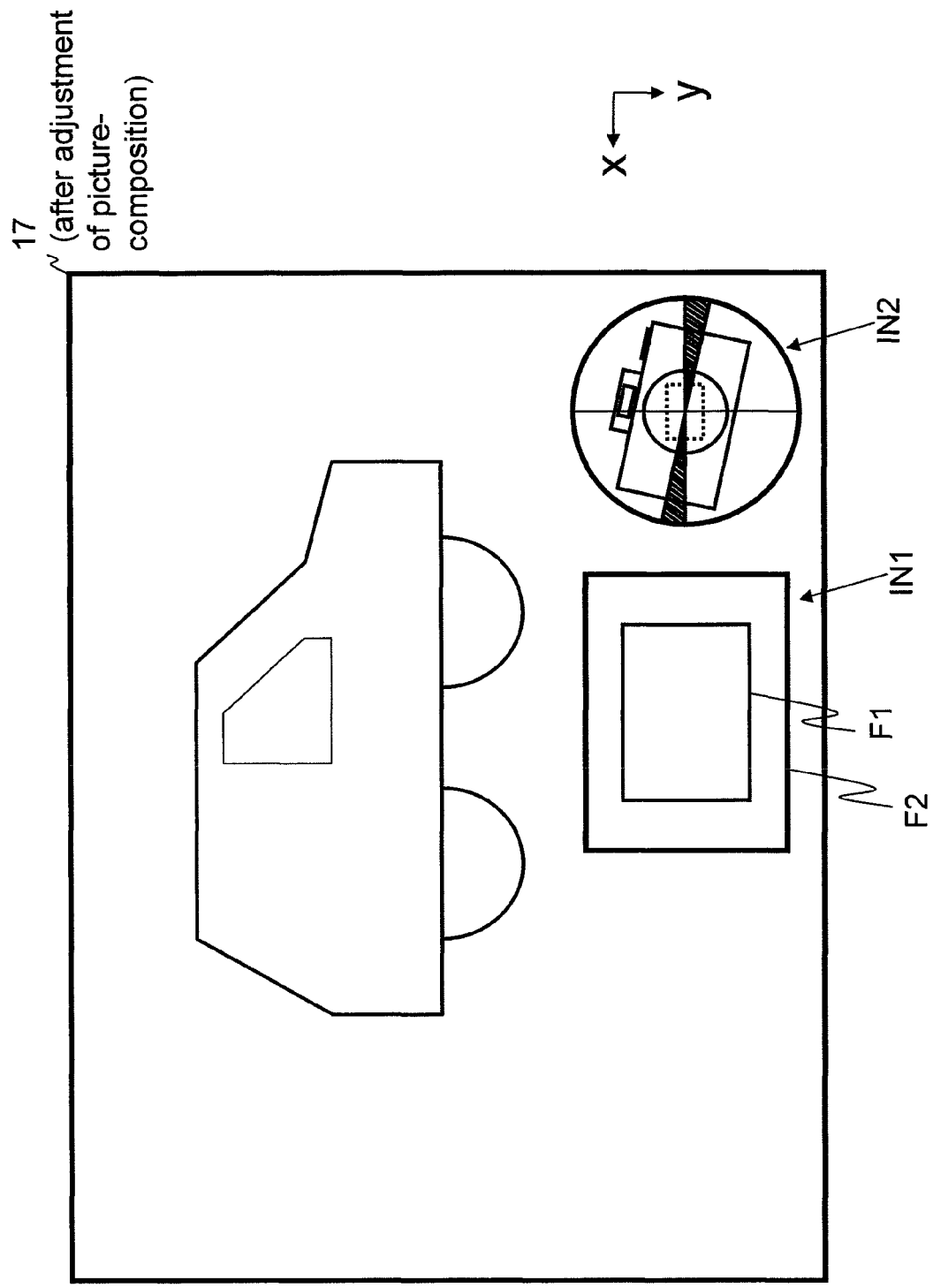
FIG. 9 is a through image including the displayed first information and the displayed second information after the picture-composition adjustment is performed.

The display 17 indicates first information IN1 and second information IN2 on the through image regarding the picture-composition adjustment (see FIGS. 8 and 9).

The displayed first information IN1 indicates a positional relationship between the movable platform 30a and the movement range of the movable platform 30a.

When the movable platform 30a makes contact with a frame that shows the outline of the movement range of the movable platform 30a, this contacting state is clearly indicated in the displayed first information IN1.

The displayed second information IN2 indicates an inclination state of the photographic apparatus 1 and a rotation state of the movable platform 30a.

Specifically, the displayed first information IN1 consists of a first frame F1 and a second frame F2. The first frame F1 schematically shows the outline of the movable platform 30a. The second frame F2 schematically shows the movement range of the movable platform 30a.

When the movable platform 30a can be rotated in accordance to the rotation quantity α, the first frame F1 and the second frame F2 are indicated on the through image, under the condition in which the two sides of the rectangle of the first frame F1 are parallel to the two sides of the rectangle of the second frame F2 and the first frame F1 is arranged at the center of the second frame F2 (see FIGS. 8 and 9).

Figure 10:
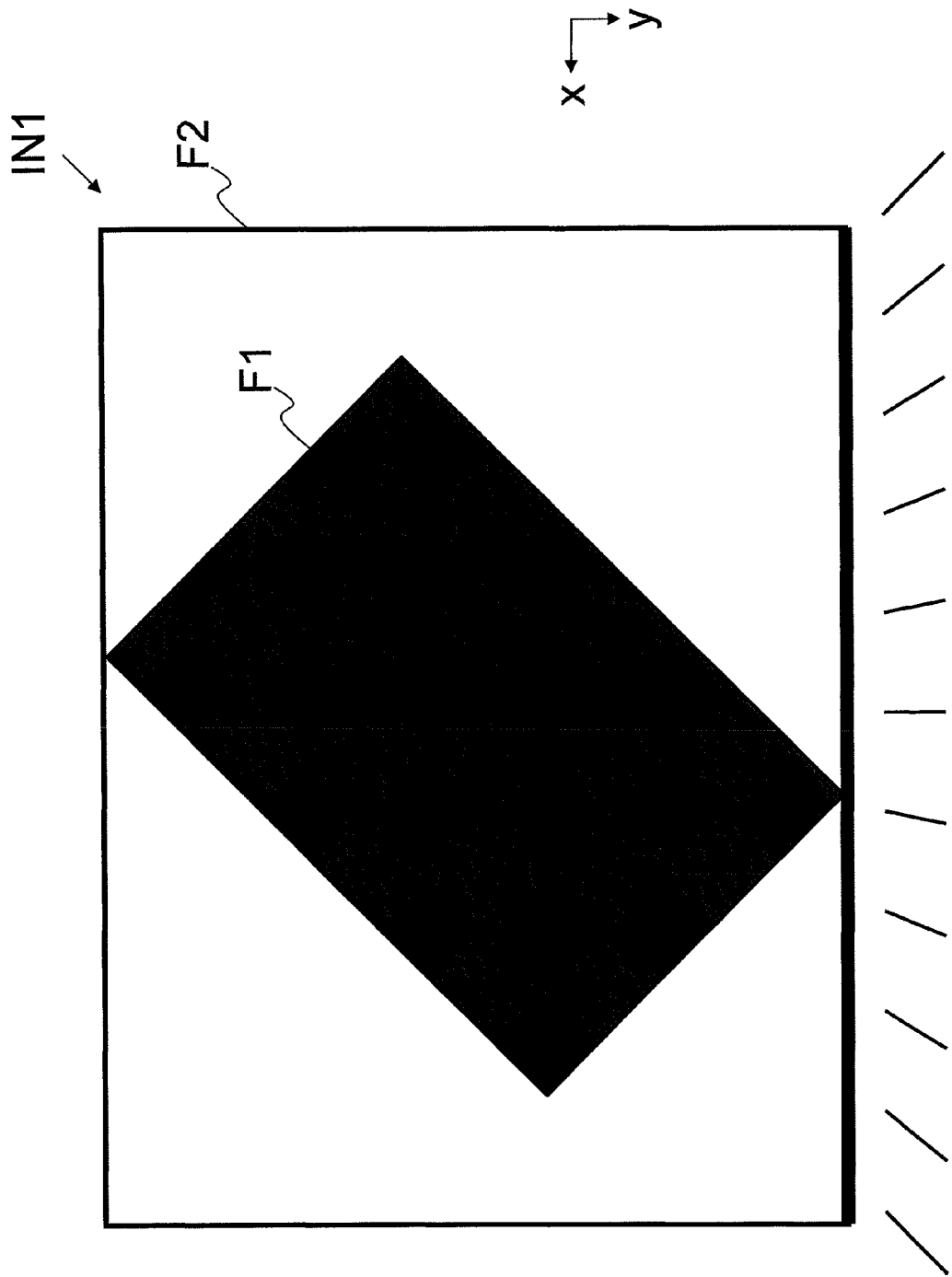
FIG. 10 is the displayed first information when the rotation of the movable platform cannot be performed in accordance to the rotation quantity α (the first warning)

When the movable platform 30a cannot be rotated in accordance to the rotation quantity α, the first frame F1 and the second frame F2 are indicated on the through image, under the following conditions: the first frame F1 is inclined, the first frame F1 is emphasized, at least one of the corners of the rectangle of the first frame F1 makes contact with the second frame F2, and at least one of the four sides of the rectangle of the second frame F2 is also emphasized (see FIG. 10).

Figure 11:
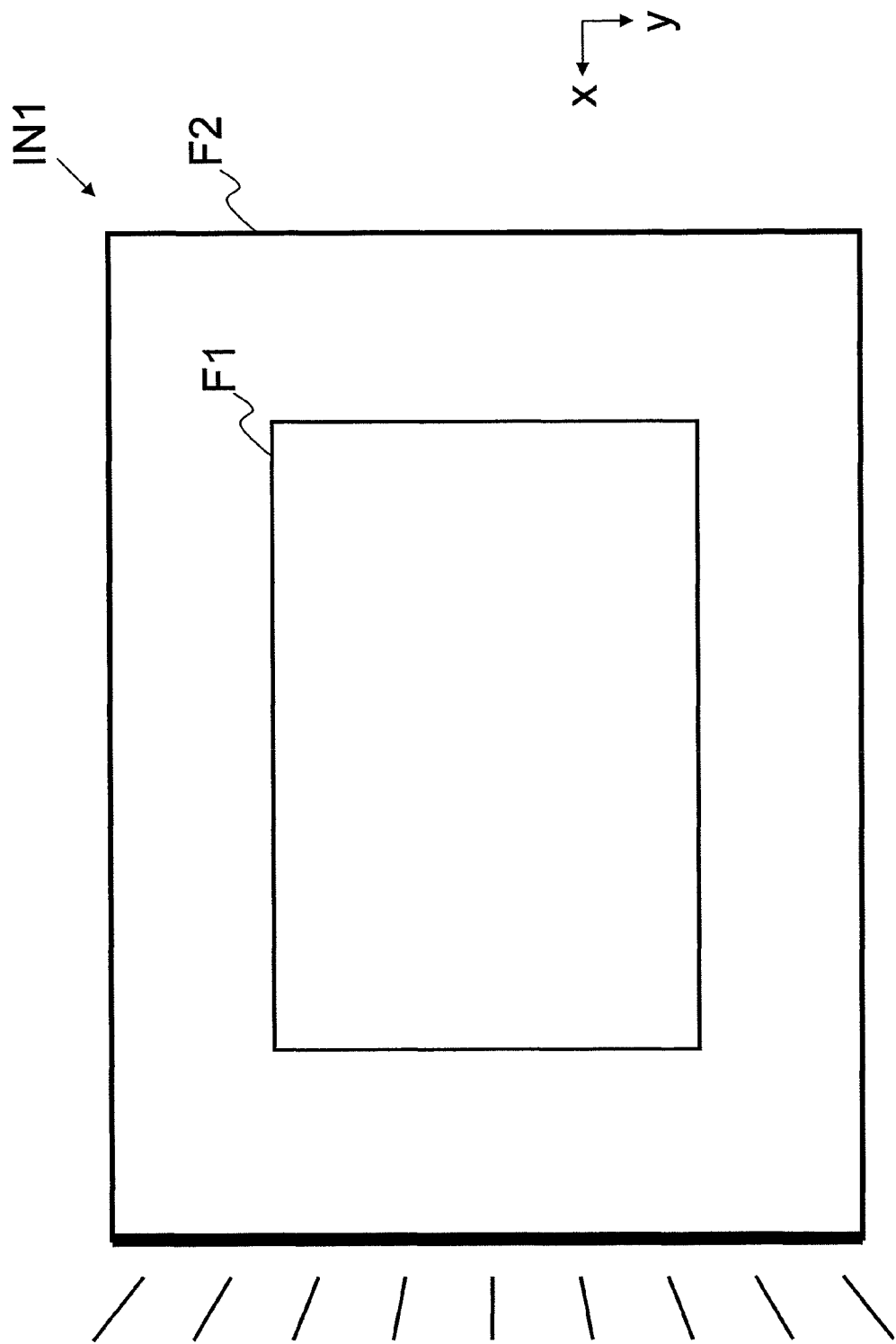
FIG. 11 is the displayed first information when the horizontal shift of the movable platform cannot be performed in accordance to the horizontal movement quantity H (the second warning)

When the movable platform 30a cannot be horizontally moved in accordance to the horizontal movement quantity H, the first frame F1 and the second frame F2 are indicated on the through image under the condition in which at least one of the two sides of the rectangle of the second frame F2, which are parallel to the y direction, is emphasized (see FIG. 11).

Figure 12:
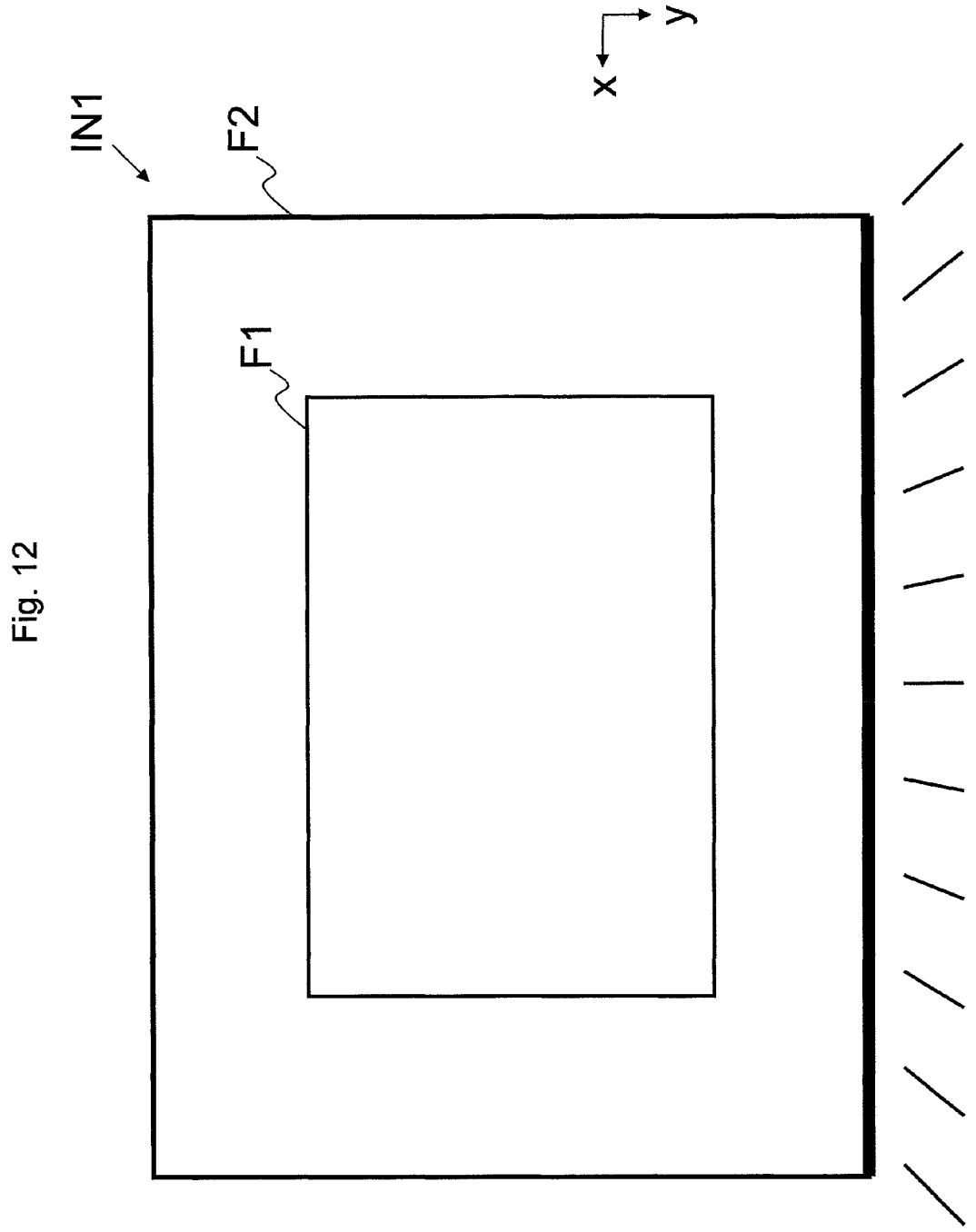
FIG. 12 is the displayed first information when the vertical shift of the movable platform cannot be performed in accordance to the vertical movement quantity V (the third warning)

When the movable platform 30a cannot be vertically moved in accordance to the vertical movement quantity V, the first frame F1 and the second frame F2 are indicated on the through image under the condition in which at least one of the two sides of the rectangle of the second frame F2, which are parallel to the x direction, is emphasized (see FIG. 12).

Namely, the CPU 21 determines whether the movable platform 30a is in an unmovable state where it cannot be moved or rotated on the xy plane in accordance to the horizontal movement quantity H etc. The display 17 indicates the first information IN1 under the condition where the unmovable state is emphasized, when the CPU 21 determines that the movable platform 30a is in an unmovable state or a non-rotatable state.

In the embodiment, the relationship between the movable platform 30a and the movement range of the movable platform 30a can be easily understood, particularly whether the movable platform 30a is movable/rotatable or not can be easily understood by indicating the first frame F1 and the second frame F2 in the displayed first information IN1 under the condition in which the indication of a movable and rotatable state is differentiated from that of an unmovable state and from that of a non-rotatable state.

Particularly, a first warning regarding a non-rotatable state is performed by using the first frame F1. On the other hand, a second warning regarding an unmovable state in the horizontal direction and a third warning regarding an unmovable state in the vertical direction are both performed by using the second frame F2. Therefore, the category of the warning can be easily understood.

The displayed second information IN2 consists of a camera icon IC11, an imager icon IC12, a horizontal axis HX, a vertical axis VX, a first direction axis AX, and a movable platform inclination axis LVX.

The horizontal axis HX is parallel to the horizontal line (in other words, the horizontal axis HX is perpendicular to the direction of gravitational force).

The vertical axis VX is parallel to the direction of gravitational force.

The first direction axis AX is a line parallel to the x direction in the displayed second information IN2.

The movable platform inclination axis LVX is parallel to the two sides of the rectangle of the imaging surface of the imager 39a1.

The camera icon IC11 is indicated under the condition in which the camera icon IC11 is rotated around the optical axis LL in accordance to the inclination state (second inclination state) of the photographic apparatus 1 (the camera inclination angle Kθ), as measured with respect to a level plane perpendicular to the direction of gravitational force.

The imager icon IC12 is indicated under the condition in which the imager icon IC12 is rotated around the optical axis LL in accordance to the inclination state (third inclination state) of the movable platform 30a (rotation quantity α) with respect to the photographic apparatus 1.

Figure 13:
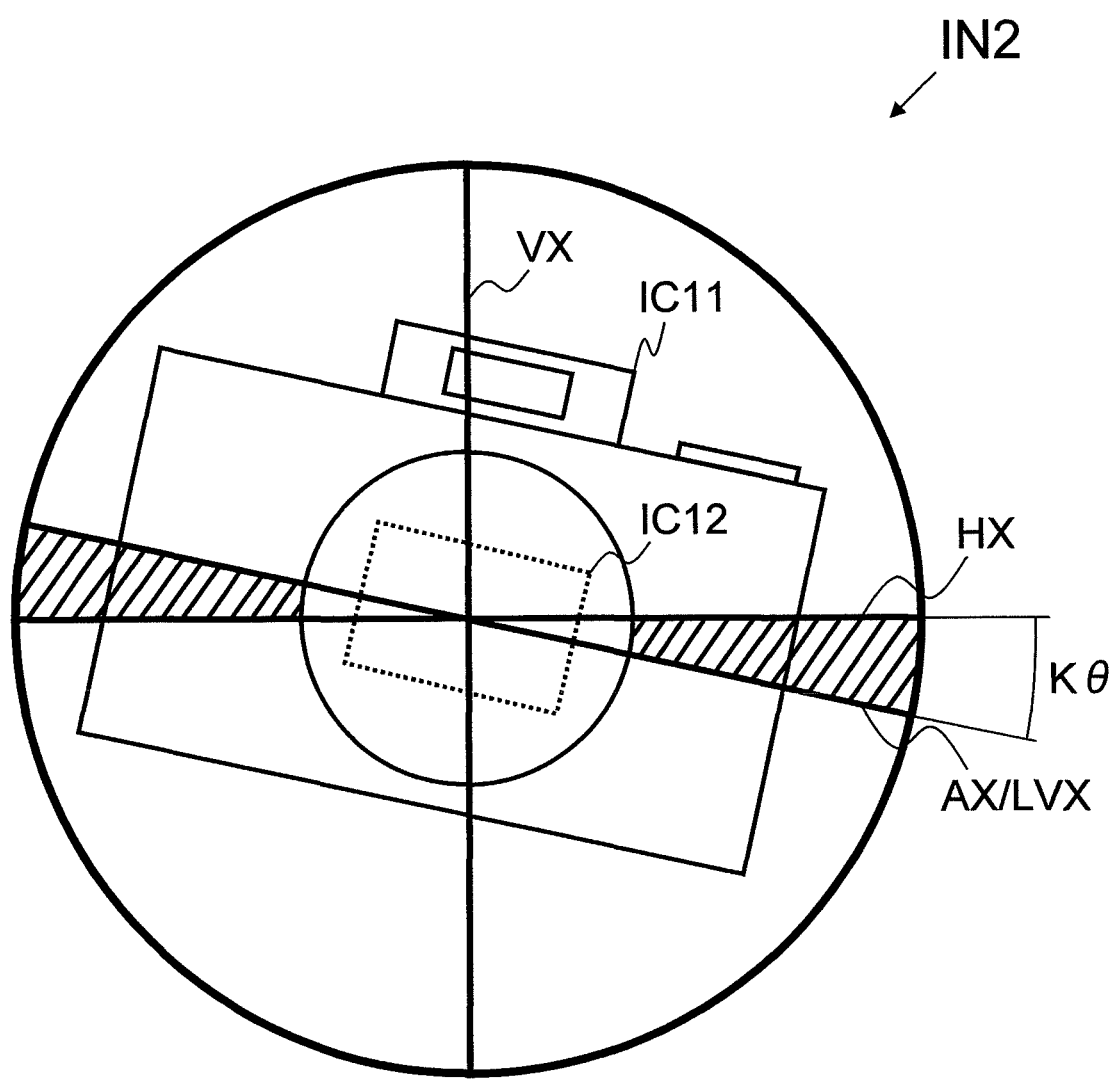
FIG. 13 is the displayed second information under the condition in which the photographic apparatus is inclined in accordance to Kθ and the rotation quantity α is 0.
Figure 14:
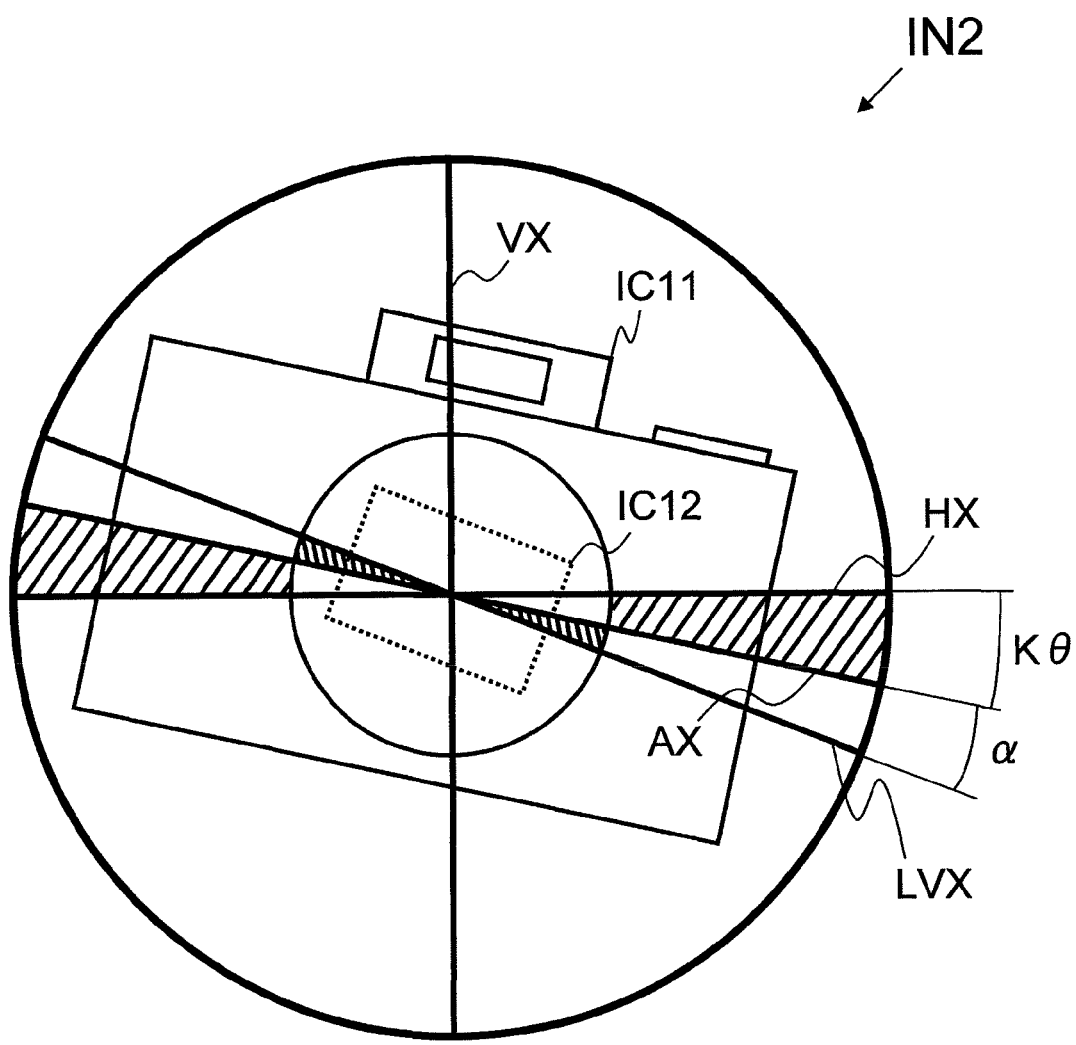
FIG. 14 is the displayed second information under the condition in which the photographic apparatus is inclined in accordance to Kθ and the movable platform is rotated in accordance to the rotation quantity α (α≠−Kθ)
Figure 15:
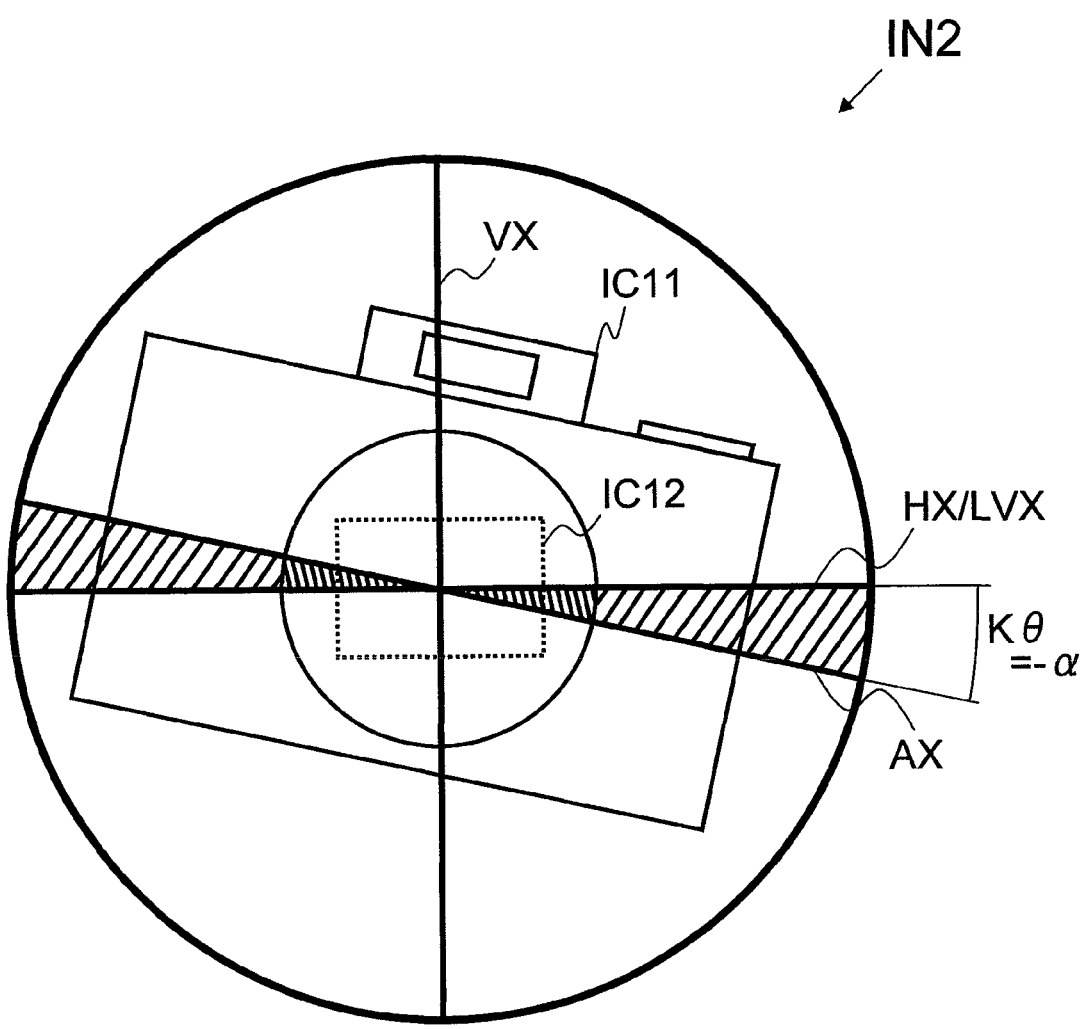
FIG. 15 is the displayed second information under the condition in which the photographic apparatus is inclined in accordance to Kθ and the movable platform is rotated in accordance to the rotation quantity α (α=−Kθ)

The camera inclination angle Kθ is shown as the angle at which the horizontal axis HX intersects the first direction axis AX (see outward hatched area in FIGS. 13, 14 and 15).

The rotation quantity α is shown as the angle at which the first direction axis AX intersects the movable platform inclination axis LVX (see inward hatched area in FIGS. 14 and 15).

Figure 16:
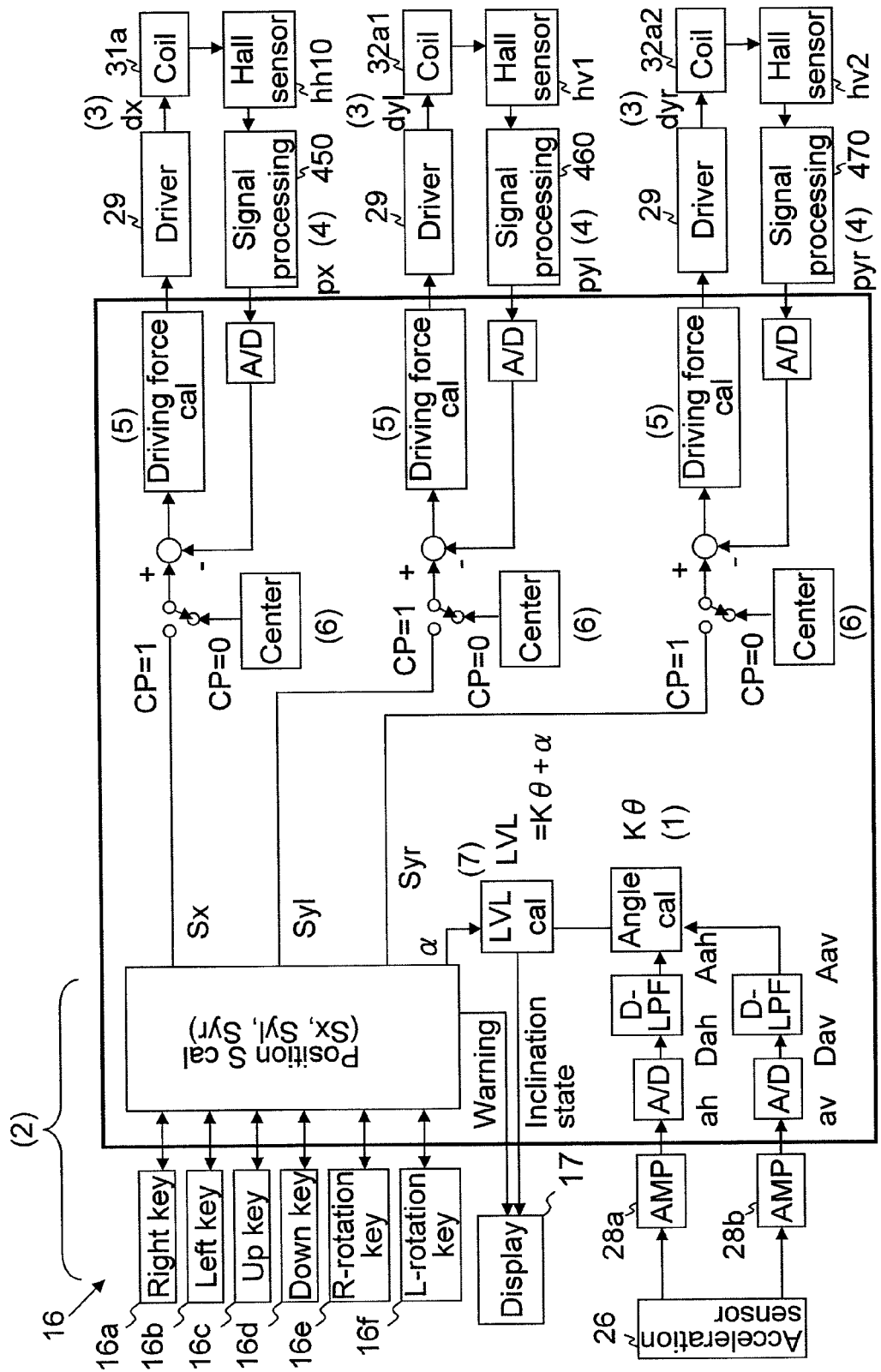
FIG. 16 illustrates the calculations involved in the picture-composition adjustment.

The movable platform inclination angle LVL, which is the inclination angle (first inclination state) of the movable platform 30a as measured with respect to the level plane perpendicular to the direction of gravitational force around the optical axis LL, is shown as the angle at which the horizontal axis HX intersects the movable platform inclination axis LVX (LVL=Kθ+α, see (7) in FIG. 16).

In the embodiment, the first information IN1 and the second information IN2 are indicated on the through image, however, they may be indicated on another display device that is different from the display 17.

The camera lens 67 is an interchangeable lens of the photographic apparatus 1 and is connected to port P8 of the CPU 21. The camera lens 67 outputs the lens information stored in a built-in ROM in the camera lens 67, to the CPU 21, when the photographic apparatus 1 is set to the ON state etc.

The DSP 19 is connected to port P9 of the CPU 21 and to the imaging unit 39a. Based on a command from the CPU 21, the DSP 19 performs the calculation operations, such as the image-processing operation, etc., on the image signal obtained by the imaging operation of the imaging unit 39a.

The CPU 21 is a control apparatus that controls each part of the photographic apparatus 1 in its imaging operation, and controls the movement of the movable platform 30a when the picture-composition is adjusted.

The AE unit (exposure-calculating unit) 23 performs the photometric operation and calculates photometric values based on the subject being photographed. The AE unit 23 also calculates the aperture value and the duration of the exposure operation, with respect to the photometric values, both of which are needed for the imaging operation. The AF unit 24 performs the AF sensing operation and the corresponding focusing operation, both of which are needed for the imaging operation. In the focusing operation, the camera lens 67 is re-positioned along the optical axis LL.

The AE unit 23 is connected to port P4 of the CPU 21 for inputting and outputting signals. The AF unit 24 is connected to port P5 of the CPU 21 for inputting and outputting signals.

The picture-composition adjustment part (the picture-composition adjustment apparatus) of the photographic apparatus 1 comprises a picture-composition adjustment ON/OFF button 14, a picture-composition adjustment ON/OFF switch 14a, picture-composition adjustment keys 16, a display 17, a CPU 21, an inclination detection unit 25, a driver circuit 29, a picture-composition adjustment unit 30, and a hall sensor signal-processing unit (a signal processing circuit of the magnetic-field change-detecting element) 45.

The ON/OFF states of the picture-composition adjustment ON/OFF switch 14a change according to the operation state of the picture-composition adjustment ON/OFF button 14.

Specifically, when the picture-composition adjustment ON/OFF button 14 is depressed by the operator, the picture-composition adjustment ON/OFF switch 14a is changed to the ON state so that the picture-composition adjustment, in which the inclination detection unit 25 and the picture-composition adjustment unit 30 are driven independently of the other operations that include the photometric operation etc., is carried out in the predetermined time interval. When the picture-composition adjustment ON/OFF switch 14a is in the ON state, (in other words in the picture-composition adjustment mode), the picture-composition adjustment parameter CP is set to 1 (CP=1). When the picture-composition adjustment ON/OFF switch 14a is not in the ON state, (in other words in the non-picture-composition adjustment mode), the picture-composition adjustment parameter CP is set to 0 (CP=0). In the embodiment, the value of the predetermined time interval is set to 1 ms.

The information indicating whether the picture-composition adjustment ON/OFF switch 14a is in the ON or OFF state is input to port P14 of the CPU 21 as a 1-bit digital signal.

Next, the details of the input and output relationships between the CPU 21 and the inclination detection unit 25, the driver circuit 29, the picture-composition adjustment unit 30, and the hall sensor signal-processing unit 45 are explained.

The inclination detection unit 25 has an acceleration sensor 26, a first amplifier 28a, and a second amplifier 28b.

The acceleration sensor 26 detects a first gravitational component and a second gravitational component. The first gravitational component is the horizontal component of gravitational acceleration in the x direction. The second gravitational component is the vertical component of gravitational acceleration in the y direction.

The first amplifier 28a amplifies the signal representing the first gravitational component output from the acceleration sensor 26, and outputs the analog signal to the A/D converter A/D 1 of the CPU 21 as a first acceleration ah.

The second amplifier 28b amplifies the signal representing the second gravitational component output from the acceleration sensor 26, and outputs the analog signal to the A/D converter A/D 2 of the CPU 21 as a second acceleration av.

The picture-composition adjustment unit 30 is an apparatus that changes the picture-composition by moving the imaging unit 39a to the position S.

The picture-composition adjustment unit 30 has a fixed unit 30b and a movable platform 30a that includes the imaging unit 39a and can be moved and rotated on the xy plane.

The supply of electric power to the CPU 21 and each part of the inclination detection unit 25 begins after the PON switch 11a is set to the ON state (i.e. when the main power supply is set to the ON state). Inclination detection efforts by the inclination detection unit 25 for calculating the inclination angle (the camera inclination angle Kθ) begin after the PON switch 11a is set to the ON state.

The CPU 21 converts the first acceleration ah, which is input to the A/D converter A/D 1, to a first digital acceleration signal Dah (A/D conversion operation). It also calculates a first digital acceleration Aah by reducing the high-frequency component of the first digital acceleration signal Dah (the digital low-pass filtering) in order to reduce the noise component in the first digital acceleration signal Dah.

Similarly, the CPU 21 converts the second acceleration av, which is input to the A/D converter A/D 2, to a second digital acceleration signal Dav (A/D conversion operation). It also calculates a second digital acceleration Aav by reducing the high-frequency component of the second digital acceleration signal Dav (the digital low-pass filtering) in order to reduce the noise component in the second digital acceleration signal Dav.

The CPU 21 also calculates the camera inclination angle Kθ of the photographic apparatus 1, which is formed by the rotation of the photographic apparatus 1 around its optical axis LL, and is measured with respect to the level plane perpendicular to the direction of gravitational force, on the basis of the magnitude of the difference between the absolute value of the first digital acceleration Aah and the absolute value of the second digital acceleration Aav (see (1) in FIG. 16).

The camera inclination angle Kθ of the photographic apparatus 1 changes according to the orientation of the photographic apparatus 1, and is measured with respect to one of either the first horizontal orientation, the second horizontal orientation, the first vertical orientation, or the second vertical orientation. Therefore, the camera inclination angle Kθ of the photographic apparatus 1 is represented by the angle at which the x direction or the y direction intersects the level plane.

When one of either the x direction or y direction lies on the level plane, and when the other of the x direction or y direction intersects the level plane at an angle of 90 degrees, the photographic apparatus 1 is in a non-inclined state.

Thus, the CPU 21 and the inclination detection unit 25 have a function for calculating the inclination angle of the photographic apparatus 1.

The first digital acceleration Aah (the first gravitational component) and the second digital acceleration Aav (the second gravitational component) change according to the orientation of the photographic apparatus 1, and take values from −1 to +1.

For example, when the photographic apparatus 1 is held in the first horizontal orientation, in other words, when the photographic apparatus 1 is held horizontally and the upper surface of the photographic apparatus 1 faces upward (see FIG. 2), the first digital acceleration Aah is 0 and the second digital acceleration Aav is +1.

When the photographic apparatus 1 is held in the second horizontal orientation, in other words, when the photographic apparatus 1 is held horizontally and the lower surface of the photographic apparatus 1 faces upward (see FIG. 3), the first digital acceleration Aah is 0 and the second digital acceleration Aav is −1.

When the photographic apparatus 1 is held in the first vertical orientation, in other words, when the photographic apparatus 1 is held vertically and one of the side surfaces of the photographic apparatus 1 faces upward (see FIG. 4), the first digital acceleration Aah is −1 and the second digital acceleration Aav is 0.

When the photographic apparatus 1 is held in the second vertical orientation, in other words, when the photographic apparatus 1 is held vertically and the other side surface of the photographic apparatus 1 faces upward (see FIG. 5), the first digital acceleration Aah is +1 and the second digital acceleration Aav is 0.

When the front surface of the photographic apparatus 1 faces the direction of gravitational force or the opposite direction, in other words, when the front surface of the photographic apparatus 1 faces upward or downward, the first digital acceleration Aah and the second digital acceleration Aav are 0.

Figure 17:
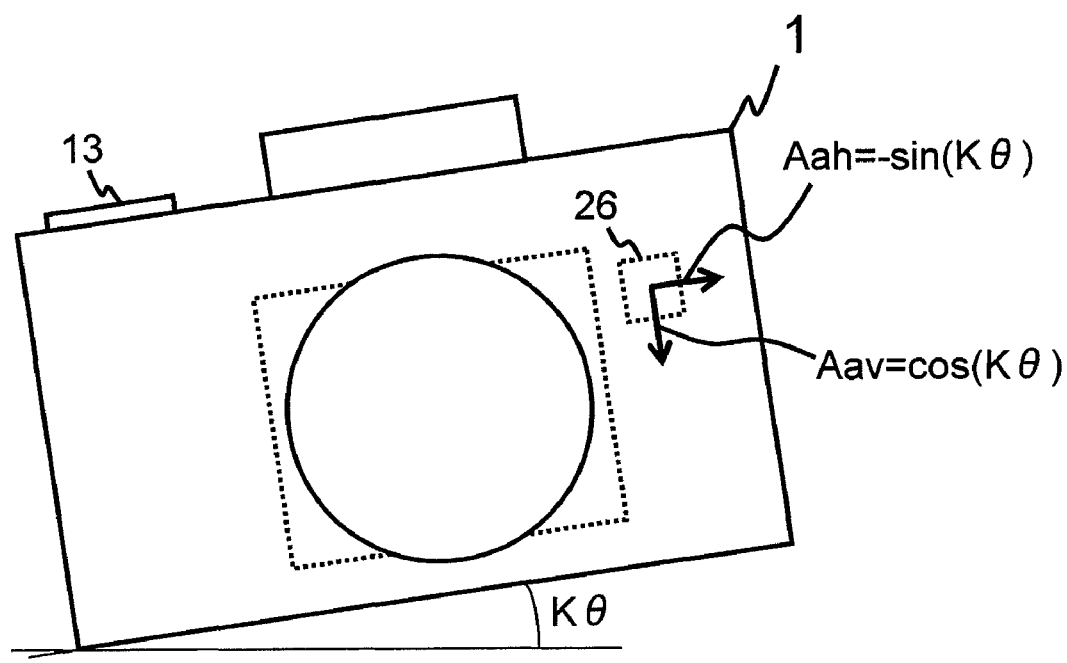
FIG. 17 is a front view of the photographic apparatus, and Kθ is the angle formed when the photographic apparatus is rotated (inclined) in a counter-clockwise direction as viewed from the front, away from the first horizontal orientation.

When the photographic apparatus 1 is rotated (inclined) at an angle $K\theta$ in a counter-clockwise direction as viewed from the front, from the first horizontal orientation (see FIG. 17), the first digital acceleration Aah is $-\sin(K\theta)$ and the second digital acceleration Aav is $+\cos(K\theta)$.

Therefore, the inclination angle (the camera inclination angle $K\theta$) can be calculated by performing an arcsine transformation on the first digital acceleration Aah and taking the negative or by performing an arccosine transformation on the second digital acceleration Aav.

Figure 27:
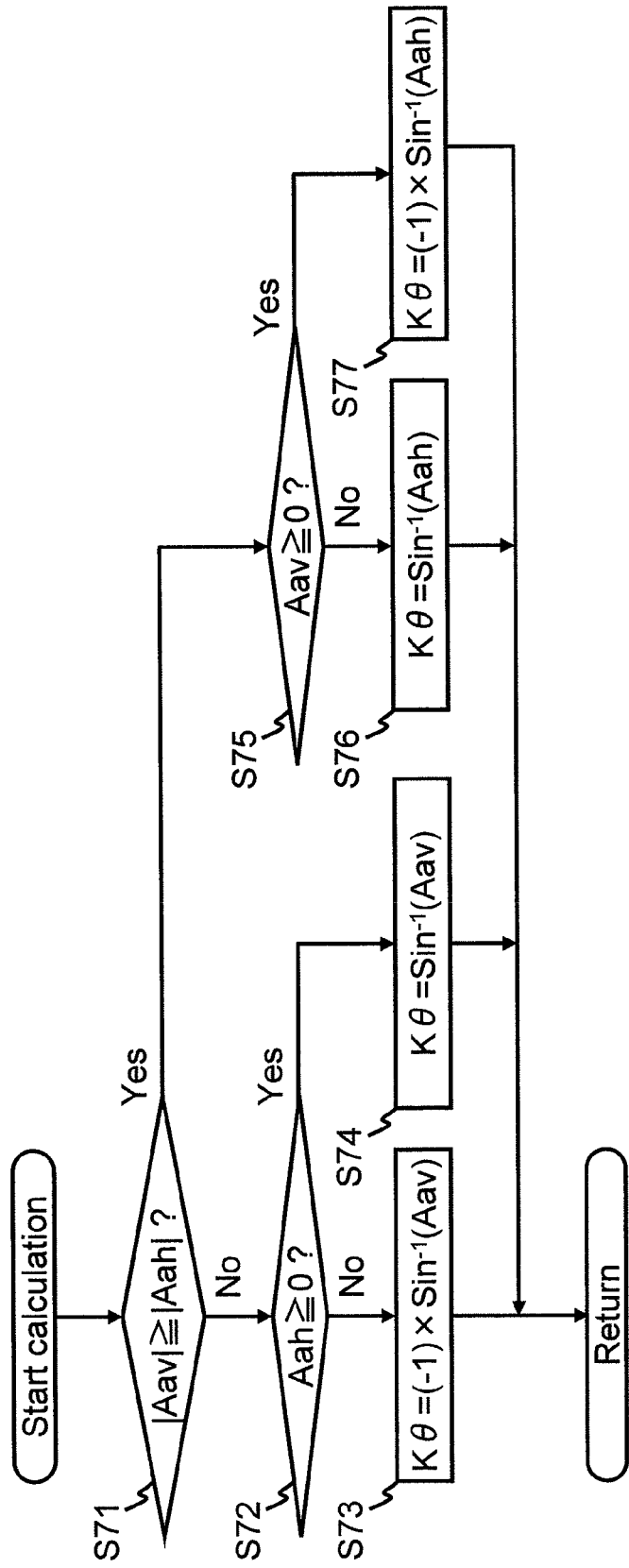
FIG. 27 is a flowchart that shows the details of the calculation of the camera inclination angle.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = -\sin^{-1}(Aah)$, see step S77 in FIG. 27).

Figure 18:
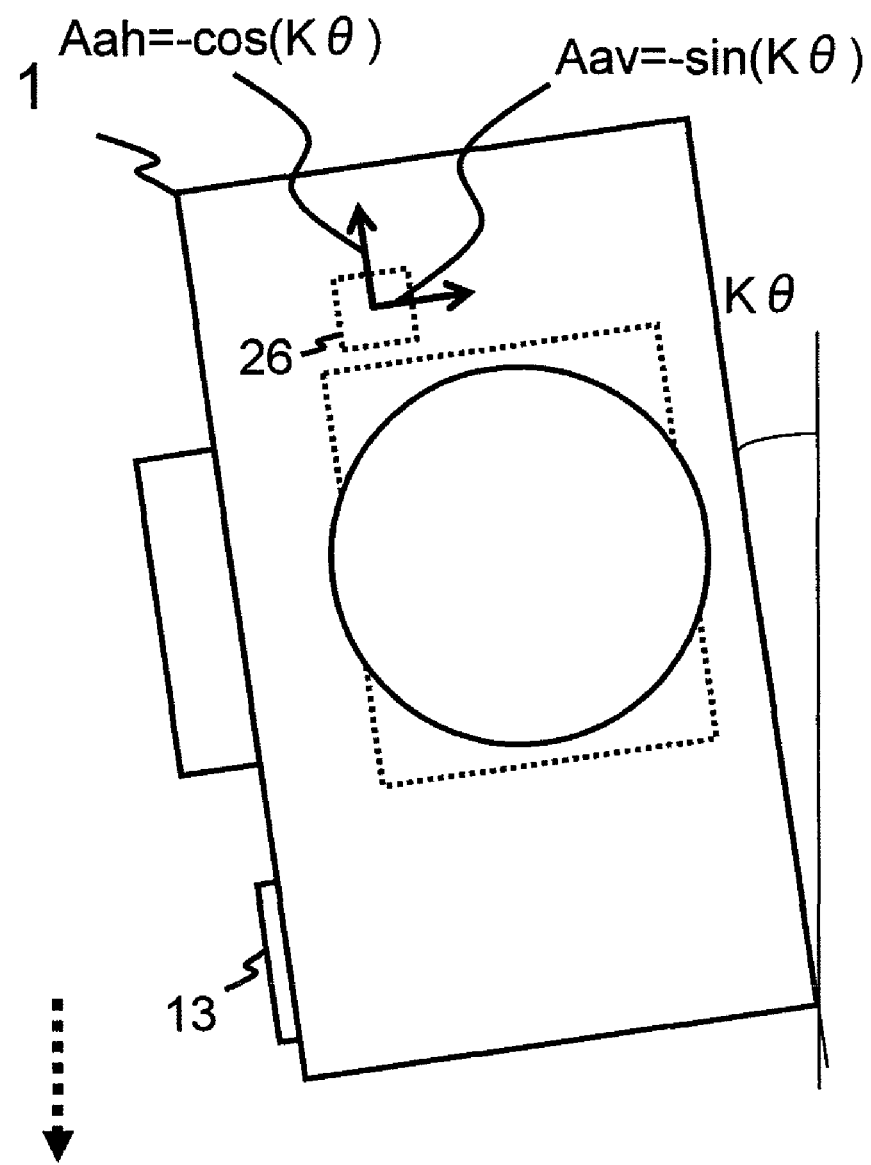
FIG. 18 is a front view of the photographic apparatus, and Kθ is the angle formed when the photographic apparatus is rotated (inclined) in a counter-clockwise direction as viewed from the front, away from the first vertical orientation.

When the photographic apparatus 1 is rotated (inclined) at an angle $K\theta$ in a counter-clockwise direction as viewed from the front, from the first vertical orientation (see FIG. 18), the first digital acceleration Aah is $-\cos(K\theta)$ and the second digital acceleration Aav is $-\sin(K\theta)$.

Therefore, the inclination angle (the camera inclination angle $K\theta$) can be calculated by performing an arccosine transformation on the first digital acceleration Aah and taking the negative or by performing an arcsine transformation on the second digital acceleration Aav and taking the negative.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = -\sin^{-1}(Aav)$, see step S73 in FIG. 27).

Figure 19:
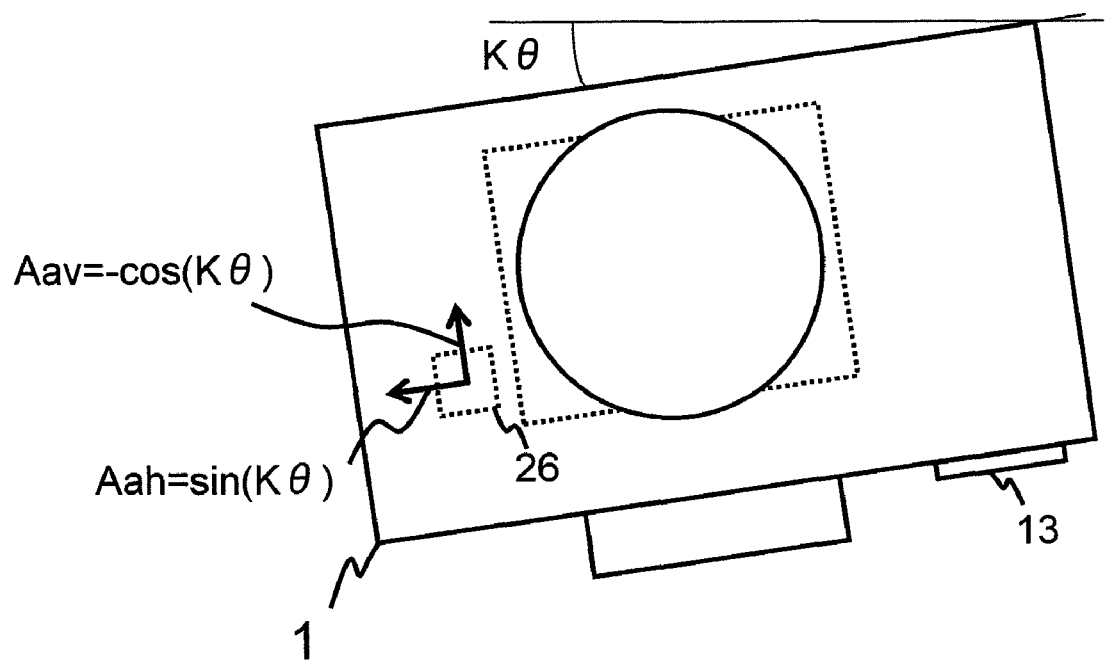
FIG. 19 is a front view of the photographic apparatus, and Kθ is the angle formed when the photographic apparatus is rotated (inclined) in a counter-clockwise direction as viewed from the front, away from the second horizontal orientation.

When the photographic apparatus 1 is rotated (inclined) at an angle $K\theta$ in a counter-clockwise direction as viewed from the front, from the second horizontal orientation (see FIG. 19), the first digital acceleration Aah is $+\sin(K\theta)$ and the second digital acceleration Aav is $-\cos(K\theta)$.

Therefore, the inclination angle (the camera inclination angle $K\theta$) can be calculated by performing an arcsine transformation on the first digital acceleration Aah or by performing an arccosine transformation on the second digital acceleration Aav and taking the negative.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = +\sin^{-1}(Aah)$, see step S76 in FIG. 27).

Figure 20:
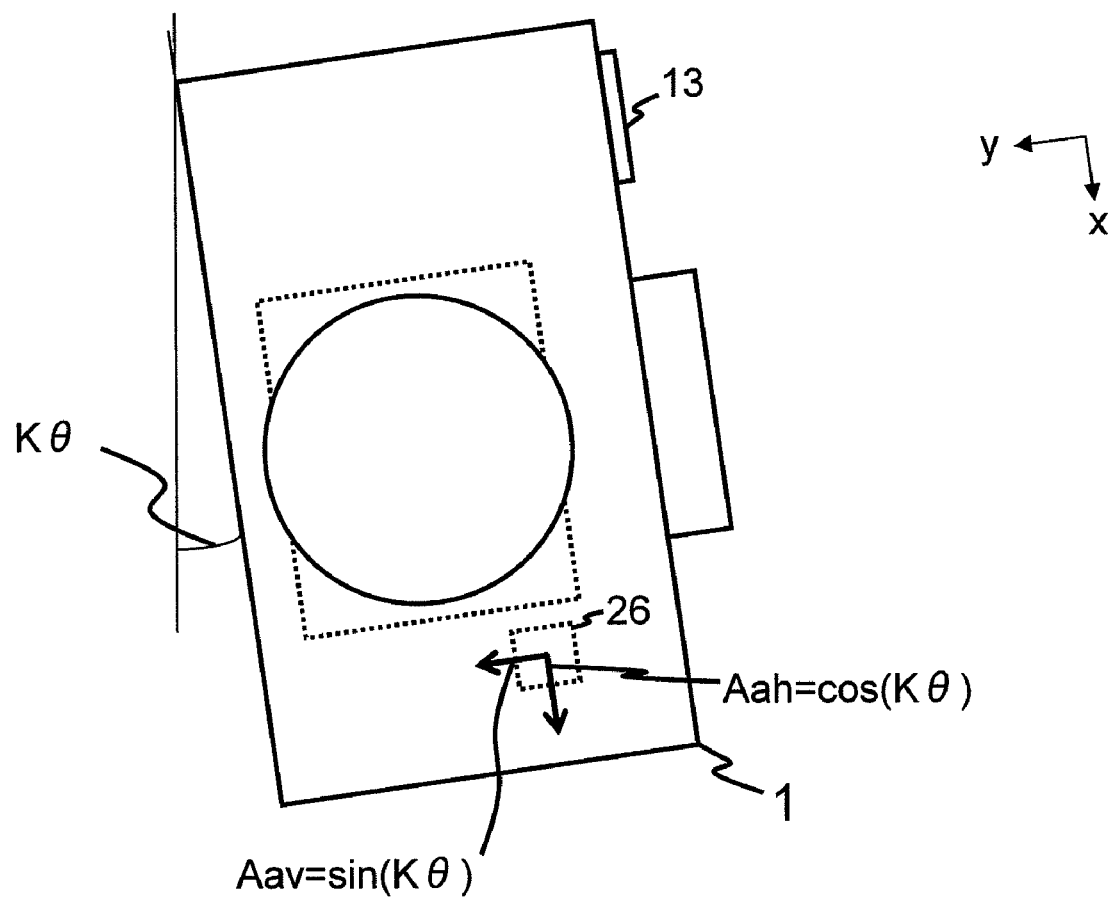
FIG. 20 is a front view of the photographic apparatus, and Kθ is the angle formed when the photographic apparatus is rotated (inclined) in a counter-clockwise direction as viewed from the front, away from the second vertical orientation.

When the photographic apparatus 1 is rotated (inclined) at an angle $K\theta$ in a counter-clockwise direction as viewed from the front, from the second vertical orientation (see FIG. 20), the first digital acceleration Aah is $+\cos(K\theta)$ and the second digital acceleration Aav is $+\sin(K\theta)$.

Therefore, the inclination angle (the camera inclination angle $K\theta$) can be calculated by performing an arccosine transformation on the first digital acceleration Aah or by performing an arcsine transformation on the second digital acceleration Aav.

However, while the absolute value of the inclination angle $K\theta$ is very small, in other words, is nearly 0, the variation of the sine function is larger than that of the cosine function so that the inclination angle is best calculated by using the arcsine transformation rather than the arccosine transformation ($K\theta = +\sin^{-1}(Aav)$, see step S74 in FIG. 27).

The inclination angle, in other words, the camera inclination angle $K\theta$ is calculated by performing the arcsine transformation on the smaller of the absolute value of the first digital acceleration Aah and the absolute value of the second digital acceleration Aav and by adding a positive or negative sign ($K\theta = +\sin^{-1}(Aah)$, $-\sin^{-1}(Aah)$, $+\sin^{-1}(Aav)$, or $-\sin^{-1}(Aav)$).

Whether the positive or negative sign is added is determined on the basis of the larger of the absolute value of the first digital acceleration Aah and the absolute value of the second digital acceleration Aav, and the sign of that larger value without applying the absolute value (see steps S72 and S75 in FIG. 27). The details of this decision are explained by using the flowchart in FIG. 27.

In the embodiment, the acceleration detection operation during the first interrupt process includes a process in the inclination detection unit 25 and the input of the first acceleration ah and the second acceleration av from the inclination detection unit 25 to the CPU 21.

The camera inclination angle $K\theta$ is configured to calculate the movable platform inclination angle LVL by adding the rotation quantity α, which is set by the user.

When the picture-composition adjustment is performed (CP=1), the CPU 21 determines the horizontal movement quantity H on the basis of the operation quantity of the right direction key 16*a* and the left direction key 16*b* operated by the user, determines the vertical movement quantity V on the basis of the operation quantity of the upward direction key 16c and the downward direction key 16d operated by the user, and determines the rotation quantity α on the basis of the operation quantity of the right-hand rotation key 16e and the left-hand rotation key 16f operated by the user.

When the picture-composition adjustment is not performed (CP=0), the CPU 21 determines the horizontal movement quantity H, the vertical movement quantity V, and the rotation quantity α, under the condition where the movable platform 30a is fixed at an initial state (H=V=α=0).

In the initial state, the movable platform 30a is positioned at the center of its movement range in both the x and y directions, and each of the four sides of the rectangle composing the outline of the imaging surface of the imager (an imaging sensor) 39a1 is parallel to either the x direction or the y direction.

Figure 26:
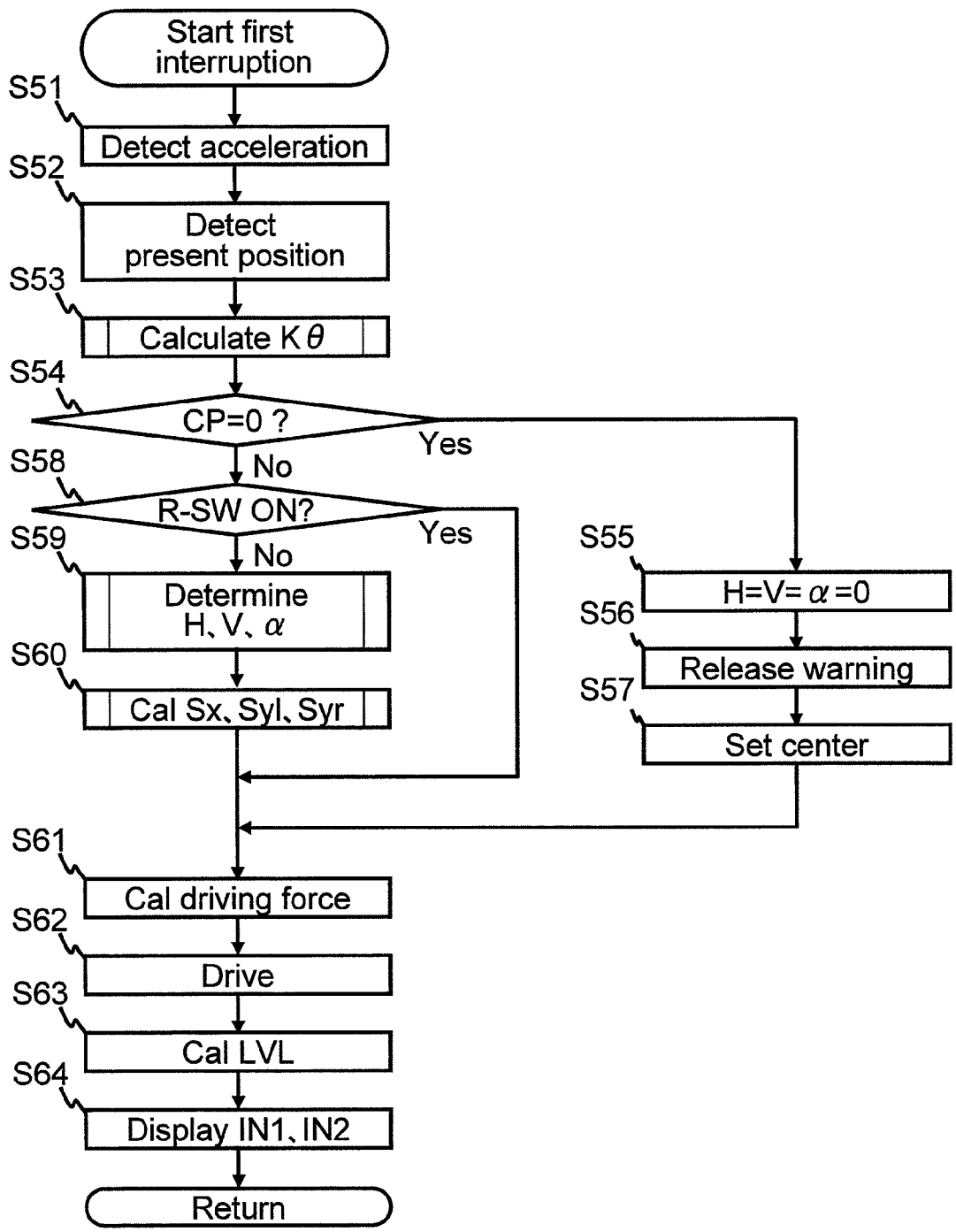
FIG. 26 is a flowchart that shows the details of the first timer interrupt process.

The CPU 21 calculates the position S where the imaging unit 39a (the movable platform 30a) should be moved in accordance to the horizontal movement quantity H, the vertical movement quantity V, and the rotation quantity α (see (2) in FIG. 16, and steps S57 and S60 in FIG. 26). The position S indicates the position of the driving points of the movable platform 30a. Then, the CPU 21 moves the movable platform 30a to this position S.

The picture-composition adjustment for horizontal shift is carried out by moving the movable platform 30a in the x direction by using the right direction key 16a and/or the left direction key 16b.

The picture-composition adjustment for vertical shift is carried out by moving the movable platform 30a in the y direction by using the upward direction key 16c and/or the downward direction key 16d.

The picture-composition adjustment for rotation movement is carried out by rotating the movable platform 30a by using the right-hand rotation key 16e and/or the left-hand rotation key 16f.

The relationship between the operations of the picture-composition adjustment keys 16 and the movement/rotation direction of the movable platform 30a is set where the user can operate the picture-composition adjustment keys 16 without consideration of the re-supination and inversion of the photographic subject image.

For example, when the movable platform 30a is moved in the right direction, as viewed from the rear, for the horizontal shift, the picture-composition (the photographic subject image) is moved in the left direction.

Similarly, when the movable platform 30a is moved in the upward direction, as viewed from the rear, for the vertical shift, the picture-composition (the photographic subject image) is moved in the downward direction.

Similarly, when the movable platform 30a is rotated in the right-hand direction (clockwise direction), as viewed from the rear, for the rotation movement, the picture-composition (the photographic subject image) is rotated in the right-hand direction.

Namely, the movable platform 30a is moved where the direction of each direction key 16a to 16f corresponds to the movement direction of the image on the display 17.

Specifically, when one of the right/left/upward/downward direction keys 16a to 16d is operated, the CPU 21 moves the movable platform 30a in the opposite direction of the operated direction key, as viewed from the rear.

When one of the right-hand/left-hand rotation keys 16e and 16f is operated, the CPU 21 rotates the movable platform 30a in the same rotation direction of the operated rotation key, as viewed from the rear.

Therefore, the picture-composition can be moved in the intended direction corresponding to the direction of the picture-composition adjustment keys 16a to 16f.

In the embodiment, the picture-composition can be adjusted without moving the photographic apparatus 1, even when the photographic apparatus 1 is fixed to a tripod etc. Furthermore, in this case, the change of the picture-composition corresponding to the movement of the movable platform 30a can be confirmed by observing the through image on the display 17.

The picture-composition before adjustment and the picture-composition after adjustment can both be observed on the through image. So, the user can adjust the intended picture-composition by observing the through image on the display 17.

FIG. 8 shows the through image on the display 17 under the condition in which the photographic subject image is captured with a car on the left side of the image and its front end facing toward the right and tilted upward.

When the user operates the left direction key 16b to move the movable platform 30a in the right direction, as viewed from the rear, when the user operates the downward direction key 16d to move the movable platform 30a in the upward direction, and when the user operates the right-hand rotation key 16e to rotate the movable platform 30a in the clockwise direction, as viewed from the rear (in the counter-clockwise direction as viewed form the front), the photographic subject image including a non-inclined car at the center of the imager 39a1 is captured (see FIG. 9).

In the embodiment, only the movable platform 30a including the imager 39a1 that is arranged in the photographic apparatus 1 is moved/rotated on a plane perpendicular to the optical axis LL (the xy plane). Therefore, it is not necessary to move/rotate the photographic apparatus 1 to adjust the picture-composition. Accordingly, the device for adjusting the picture-composition is not enlarged.

Note, in the inclination correction, the movable platform 30a is moved/rotated within the movement range, but cannot be moved/rotated beyond the movement range. Therefore, in the calculation of the position S, the relationship between the movement range of the movable platform 30a and the movement quantity of the movable platform 30a based on the horizontal movement quantity H, the vertical movement quantity V, and the rotation quantity α is considered.

A driving point on the movable platform 30a for moving the movable platform 30a in the x direction is defined as a horizontal driving point DPx.

Figure 21:
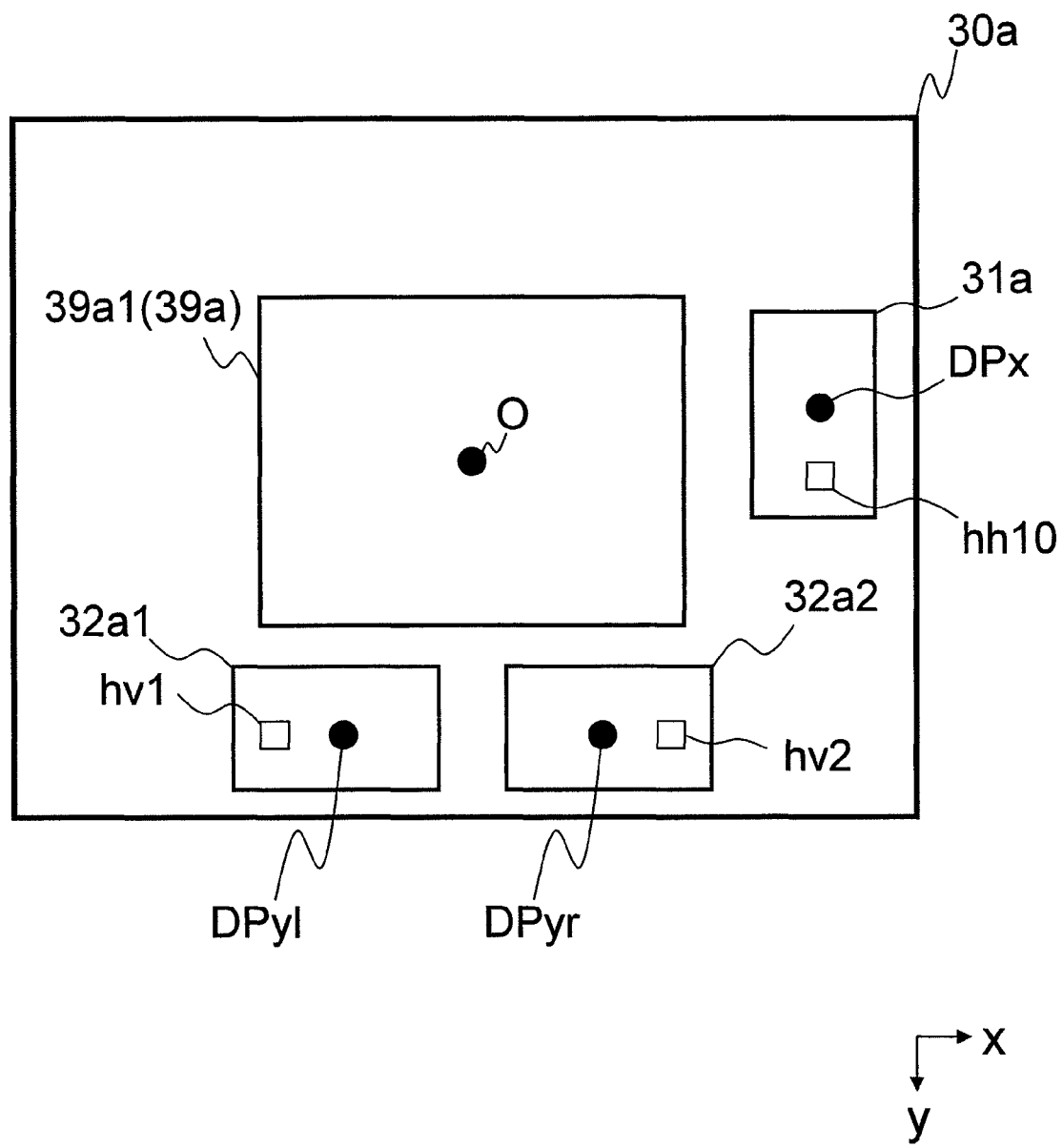
FIG. 21 is a construction diagram of the movable platform.
Figure 22:
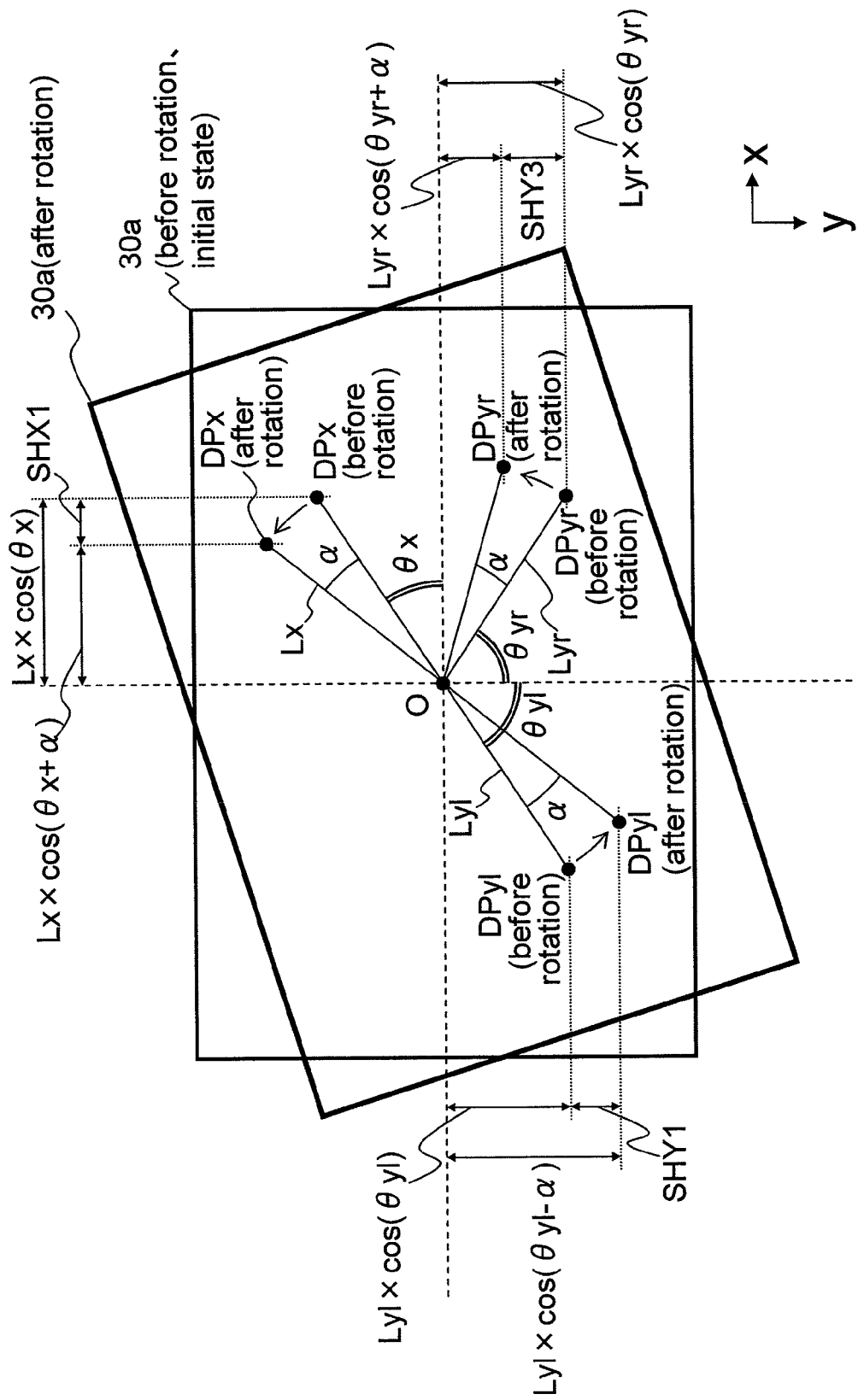
FIG. 22 illustrates the movement quantity of the horizontal driving point DPx in the x direction and the movement quantities of the first and second vertical driving points DPyl and DPyr in the y direction, in accordance to the rotation quantity α.

Driving points on the movable platform 30a for moving the movable platform 30a in the y direction and for rotating the movable platform 30a are defined as a first vertical driving point DPyl and a second vertical driving point DPyr (see FIGS. 21 and 22).

The horizontal driving point DPx is the point to which a horizontal electro-magnetic force based on a coil for driving the movable platform 30a in the x direction (the horizontal coil 31a) is applied. The horizontal driving point DPx is set to a position close to the horizontal hall sensor hh10.

The first vertical driving point DPyl is the point to which a first electro-magnetic force based on a coil for driving the movable platform 30a in the y direction (the first vertical coil 32a1) is applied. The first vertical driving point DPyl is set to a position close to the first vertical hall sensor hv1.

The second vertical driving point DPyr is the point to which a second electro-magnetic force based on a coil for driving the movable platform 30a in the y direction (the second vertical coil 32a2) is applied. The second vertical driving point DPyr is set to a position close to the second vertical hall sensor hv2.

The movement position Sx of the horizontal driving point DPx, which is the movement quantity to the position of the horizontal driving point DPx in the initial state (when the picture-composition adjustment commences), is calculated on the basis of the rotation quantity α and the horizontal movement quantity H.

Specifically, the horizontal driving point DPx moves a first horizontal shift quantity SHX1 in the x direction in accordance to the rotation quantity α (SHX1=Lx×cos(θx+α)−Lx×cos(θx)).

Note that the distance Lx is the distance between the rotation center O of the imaging surface of the imager 39a1 and the horizontal driving point DPx.

The angle θx is the angle at which the x direction intersects the line passing through the horizontal driving point DPx in the initial state and the rotation center O.

These values Lx and θx are fixed values that are determined by design in advance (see FIG. 22).

Furthermore, the horizontal driving point DPx moves a second horizontal shift quantity SHX2 in the x direction in accordance to the horizontal movement quantity H (SHX2=H).

Therefore, the movement position Sx of the horizontal driving point DPx is indicated by the sum of the first horizontal shift quantity SHX1 and the second horizontal shift quantity SHX2 (Sx=SHX1+SHX2).

The movement position Syl of the first vertical driving point DPyl, which is the movement quantity to the position of the first vertical driving point DPyl in the initial state (when the picture-composition adjustment commences), is calculated on the basis of the rotation quantity α and the vertical movement quantity V.

Specifically, the first vertical driving point DPyl moves a first vertical shift quantity SHY1 in the y direction in accordance to the rotation quantity α (SHY1=Lyl×cos(θyl−α)−Lyl×cos(θyl)).

Note that the distance Lyl is the distance between the rotation center O of the imaging surface of the imager 39a1 and the first vertical driving point DPyl.

The angle θyl is the angle at which the y direction intersects the line passing through the first vertical driving point DPyl in the initial state and the rotation center O.

These values Lyl and θyl are fixed values that are determined by design in advance.

Furthermore, the first vertical driving point DPyl moves a second vertical shift quantity SHY2 in the y direction in accordance to the vertical movement quantity V (SHY2=V).

Therefore, the movement position Syl of the first vertical driving point DPyl is indicated by the sum of the first vertical shift quantity SHY1 and the second vertical shift quantity SHY2 (Syl=SHY1+SHY2).

The movement position Syr of the second vertical driving point DPyr, which is the movement quantity to the position of the second vertical driving point DPyr in the initial state (when the picture-composition adjustment commences), is calculated on the basis of the rotation quantity α and the vertical movement quantity V.

Specifically, the second vertical driving point DPyr moves a third vertical shift quantity SHY3 in the y direction in accordance to the rotation quantity α (SHY3=Lyr×cos(θyr+α)−Lyl×cos(θyr)).

Note that the distance Lyr is the distance between the rotation center O of the imaging surface of the imager 39a1 and the second vertical driving point DPyr.

The angle θyr is the angle at which the y direction intersects the line passing through the second vertical driving point DPyr in the initial state and the rotation center O.

These values Lyr and θyr are fixed values that are determined by design in advance.

Furthermore, the second vertical driving point DPyr moves a fourth vertical shift quantity SHY4 in the y direction in accordance to the vertical movement quantity V (SHY4=V).

Therefore, the movement position Syr of the second vertical driving point DPyr is indicated by the sum of the third vertical shift quantity SHY3 and the fourth vertical shift quantity SHY4 (Syr=SHY3+SHY4).

Figure 23:
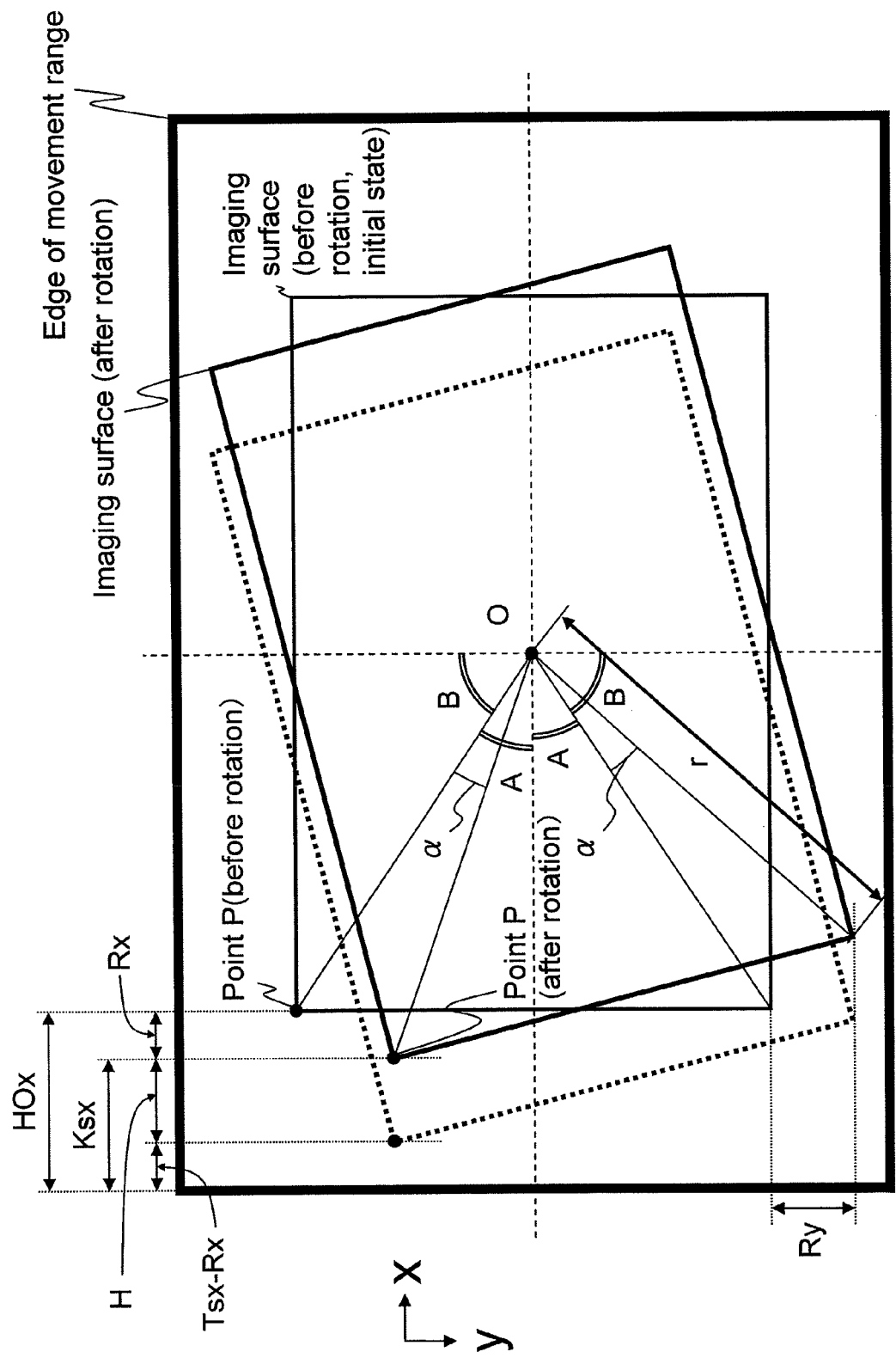
FIG. 23 illustrates the first horizontal movement quantity Tsx and the second horizontal movement quantity Ksx, in accordance to the rotation quantity α and the horizontal movement quantity H.
Figure 24:
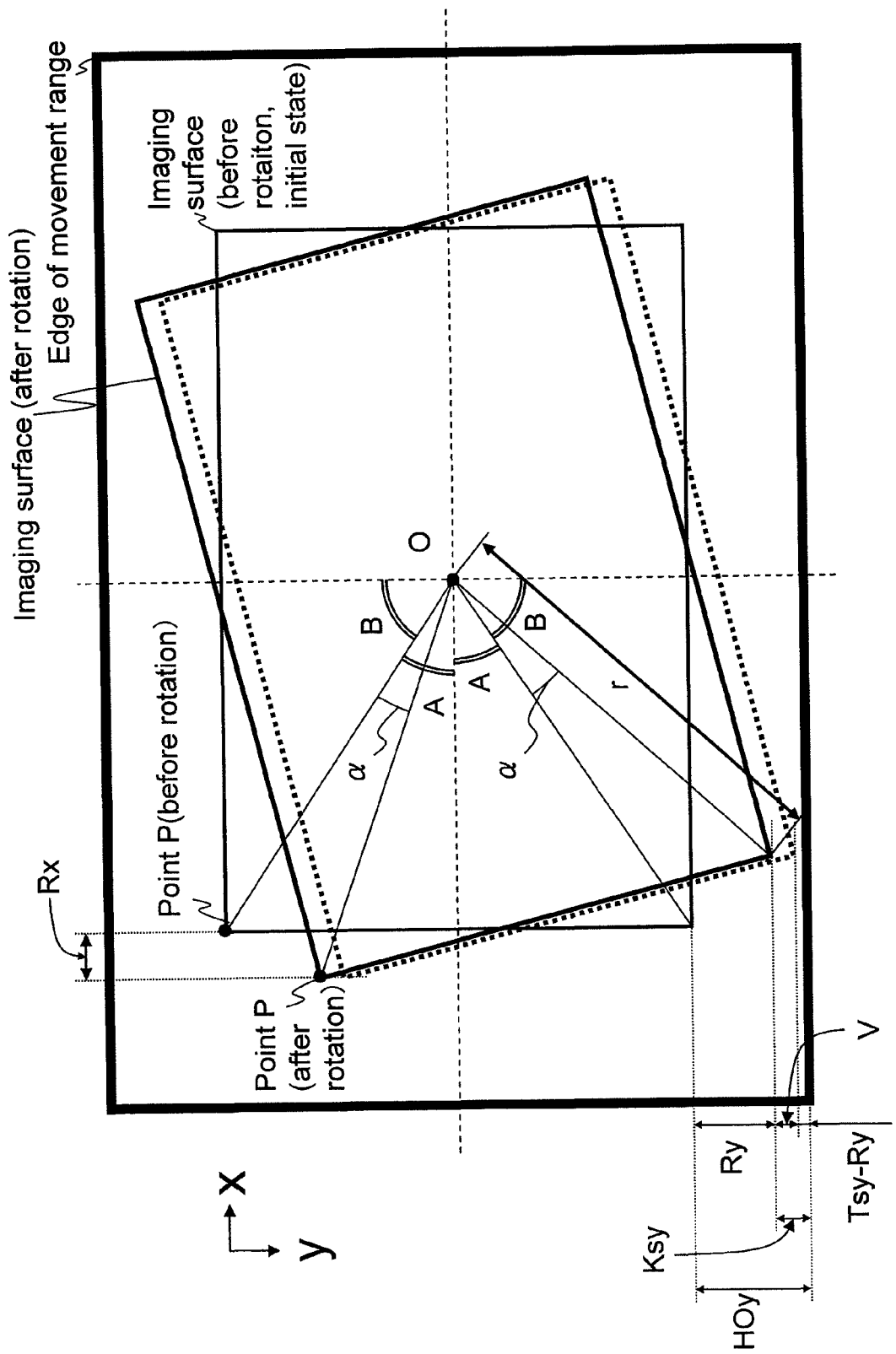
FIG. 24 illustrates the first vertical movement quantity Tsy and the second vertical movement quantity Ksy, in accordance to the rotation quantity α and the vertical movement quantity V.

When the movable platform 30a is rotated through the angle of the rotation quantity α, in other words, when the horizontal driving point DPx moves the first horizontal shift quantity SHX1 in the x direction, the first vertical driving point DPyl moves the first vertical shift quantity SHY1 in the y direction, and the second vertical driving point DPyr moves the third vertical shift quantity SHY3 in the y direction, in accordance to the rotation quantity α, a movement quantity of a point P on the movable platform 30a in the x direction is indicated by a first movement quantity Rx and a movement quantity of the point P in the y direction is indicated by a second movement quantity Ry (Rx=r×sin(B+|α|)−r×sinB, Ry=r×sin(A+|α|)−r×sinA, see FIGS. 23 and 24).

For example, the point P is one of the corners of the rectangle of the imaging surface of the imager 39a1.

Note that the distance r is the distance between the point P and the rotation center O.

The angle B is the angle at which the y direction intersects the line passing through the point P in the initial state and the rotation center O.

The angle A is the angle at which the x direction intersects the line passing through the point P in the initial state and the rotation center O.

These values r, A, and B are fixed values that are determined by design in advance.

The movement position Sx of the horizontal driving point DPx is adjusted (limited) under the condition in which the movement of the movable platform 30a in the x direction based on the horizontal movement quantity H and the rotation quantity α is within the movement range of the movable platform 30a.

The movement position Syl of the first vertical driving point DPyl and the movement position Syr of the second vertical driving point DPyr are adjusted (limited) under the condition in which the movement of the movable platform 30a in the y direction based on the vertical movement quantity V and the rotation quantity α is within the movement range of the movable platform 30a.

Specifically, the CPU 21 determines whether the absolute value of the first movement quantity Rx is larger than a first horizontal movement quantity Tsx and the absolute value of the second movement quantity Ry is greater than a first vertical movement quantity Tsy.

The first horizontal movement quantity Tsx is the movable quantity of the movable platform 30a in the x direction in accordance to the rotation The first horizontal movement quantity Tsx is indicated by the sum of the absolute value of the first movement quantity Rx and the difference between a second horizontal movement quantity Ksx and the absolute value of the horizontal movement quantity H (Tsx=(Ksx−|H|)+|Rx|).

The first vertical movement quantity Tsy is the movable quantity of the movable platform 30a in the y direction in accordance to the rotation.

The first vertical movement quantity Tsy is indicated by the sum of the absolute value of the second movement quantity Ry and the difference between a second vertical movement quantity Ksy and the absolute value of the vertical movement quantity V (Tsy=(Ksy−|V|)+|Ry|).

When the absolute value of the first movement quantity Rx is greater than the first horizontal movement quantity Tsx (Tsx<|Rx|) or when the absolute value of the second movement quantity Ry is greater than the first vertical movement quantity Tsy (Tsy<|Ry|), the CPU 21 determines that a part of the movable platform 30a makes contact with the frame of the movement range of the movable platform 30a if the movable platform 30a rotates in accordance to the rotation quantity α under the condition in which the movable platform 30a performs the horizontal shift in accordance to the horizontal movement quantity H and performs the vertical shift in accordance to the vertical movement quantity V.

In this case, the CPU 21 does not re-calculate the first horizontal shift quantity SHX1, the first vertical shift quantity SHY1, and the third vertical shift quantity SHY3 corresponding to the rotation quantity α so that the previous rotation state of the movable platform 30a is maintained.

Furthermore, the CPU 21 performs the first warning that indicates that the rotation in accordance to the rotation quantity α cannot be performed, as the first information IN1 displayed on the through image.

Figure 29:
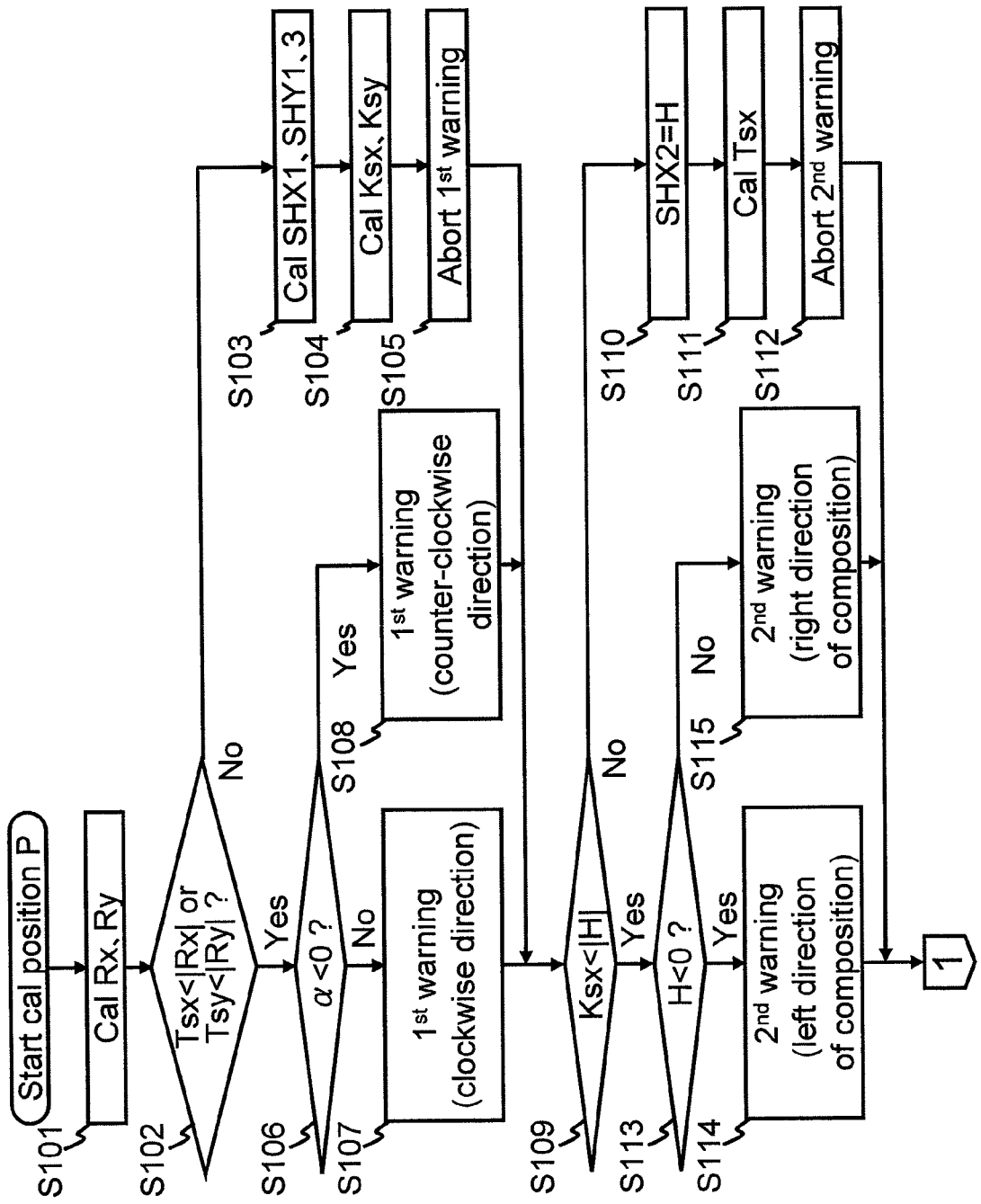
FIGS. 29 and 30 are different sections of a flowchart that shows the details of the calculation of the position S (Sx, Syl, Syr)

Specifically, when the rotation quantity α is less than 0, the CPU 21 determines that the rotation of the movable platform 30a in the counter-clockwise direction, as viewed from the rear, cannot be performed so that the first frame F1 is emphasized and tilted lower and toward the left (see FIG. 10 and step S108 in FIG. 29).

When the rotation quantity α is greater than or equal to 0, the CPU 21 determines that the rotation of the movable platform 30a in the clockwise direction, as viewed from the rear, cannot be performed so that the first frame F1 is emphasized and tilted lower and toward the right (see step S107 in FIG. 29).

Furthermore, when the CPU 21 determines that the rotation in the counter-clockwise direction, as viewed from the rear, cannot be performed, the CPU 21 controls the backlight of the left-hand rotation key 16f to illuminate. So the CPU 21 performs the first warning which indicates that the operation of the left-hand rotation key 16f is invalid unless this non-rotatable state is resolved by operating any of the picture-composition adjustment keys 16 except for the left-hand rotation key 16f.

When the CPU 21 determines that the rotation in the clockwise direction, as viewed from the rear, cannot be performed, the CPU 21 controls the backlight of the right-hand rotation key 16e to illuminate. So the CPU 21 performs the first warning which indicates that the operation of the right-hand rotation key 16e is invalid unless this non-rotatable state is resolved by operating any of the picture-composition adjustment keys 16 except for the right-hand rotation key 16e (see FIG. 7).

Figure 7:
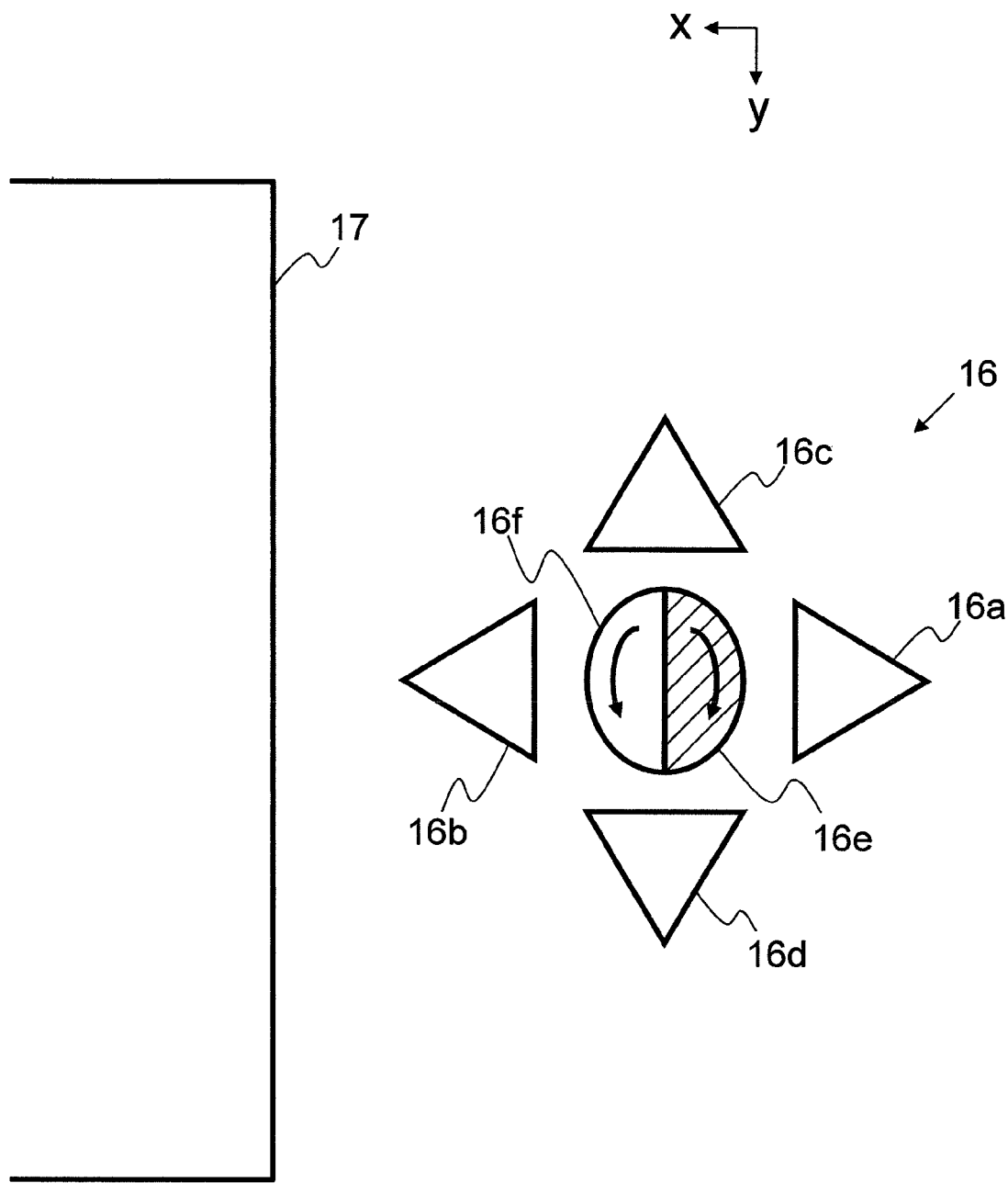
FIG. 7 is a construction diagram of the picture-composition adjustment keys.

In FIG. 7, the hatched area of the right-hand rotation key 16e indicates the illuminated state of the backlight of the right-hand rotation key 16e.

Therefore, the picture-composition adjustment keys display third information regarding a positional relationship between the movable platform 30a and the movement range of the movable platform 30a, under the condition where an ON/OFF state of the backlight of an invalid key (a non-operable key) among the picture-composition adjustment keys 16 is differentiated from an ON/OFF state of the backlight of valid keys (operable keys) among the picture-composition adjustment keys 16, when the CPU 21 determines that the movable platform 30a cannot be rotated on the xy plane in accordance to the rotation quantity α.

When the absolute value of the first movement quantity Rx is less than or equal to the first horizontal movement quantity Tsx (Tsx≧|Rx|) and when the absolute value of the second movement quantity Ry is less than or equal to the first vertical movement quantity Tsy (Tsy≧|Ry|), the CPU 21 determines that the movable platform 30a does not make contact with the frame of the movement range of the movable platform 30a even if the movable platform 30a rotates in accordance to the rotation quantity α under the condition in which the movable platform 30a performs the horizontal shift in accordance to the horizontal movement quantity H and performs the vertical shift in accordance to the vertical movement quantity V.

In this case, the CPU 21 re-calculates the first horizontal shift quantity SHX1, the first vertical shift quantity SHY1, and the third vertical shift quantity SHY3 corresponding to the rotation quantity α (see step S103 in FIG. 29), so that the horizontal driving point DPx is moved in accordance to the first horizontal shift quantity SHX1 in the x direction, the first vertical driving point DPyl is moved in accordance to the first vertical shift quantity SHY1 in the y direction, and the second vertical driving point DPyr is moved in accordance to the third vertical shift quantity SHY3 in the y direction.

Furthermore, the first information IN1 is indicated on the through image under the condition in which the first frame F1 is not inclined and is not emphasized (see FIGS. 8, 9, 11, and 12, and see step S105 in FIG. 29).

Furthermore, the CPU 21 diagrammatically indicates the inclination state of the photographic apparatus 1 (the camera inclination angle Kθ) and the rotation state of the movable platform 30a (the rotation quantity α), as the second information IN2 on the through image displayed on the display 17.

By this diagrammatical indication, the camera inclination angle Kθ, the rotation quantity α, and the movable platform inclination angle LVL that is the sum of the camera inclination angle Kθ and the rotation quantity α (LVL=Kθ+α), can be objectively recognized.

FIGS. 9 and 15 show examples where the rotation quantity α is set so that the positive and negative of the camera inclination angle Kθ is different from that of the rotation quantity α, and where the absolute values of the camera inclination angle Kθ and the rotation quantity α are the same, and the two sides of the rectangle of the imaging surface of the imager 39a1 are parallel to the horizontal line and the other two sides are perpendicular to the horizontal line (LVL=Kθ+α=0).

Furthermore, the CPU 21 determines whether the absolute value of the horizontal movement quantity H is larger than the second horizontal movement quantity Ksx and the absolute value of the vertical movement quantity V is greater than the second vertical movement quantity Ksy.

The second horizontal movement quantity Ksx is the movable quantity of the movable platform 30a in the x direction in accordance to the horizontal shift.

The second horizontal movement quantity Ksx is indicated by the sum of the absolute value of the horizontal movement quantity H and the difference between the first horizontal movement quantity Tsx and the absolute value of the first movement quantity Rx (Ksx=(Tsx−|Rx|)+|H|).

The second vertical movement quantity Ksy is the movable quantity of the movable platform 30a in the y direction in accordance to the vertical shift.

The second vertical movement quantity Ksy is indicated by the sum of the absolute value of the vertical movement quantity V and the difference between a first vertical movement quantity Tsy and the absolute value of the second movement quantity Ry (Ksy=(Tsy−|Ry|)+|V|).

When the absolute value of the horizontal movement quantity H is greater than the second horizontal movement quantity Ksx (Ksx<|H|), the CPU 21 determines that a part of the movable platform 30*a* makes contact with the frame of the movement range of the movable platform 30*a* if the movable platform 30*a* performs the horizontal shift in accordance to the horizontal movement quantity H under the condition in which the movable platform 30*a* rotates in accordance to the rotation quantity α and performs the vertical shift in accordance to the vertical movement quantity V.

In this case, the CPU 21 does not re-calculate the second horizontal shift quantity SHX2 corresponding to the horizontal movement quantity H so that the previous horizontal shift state of the movable platform 30*a* is maintained.

Furthermore, the CPU 21 performs the second warning that indicates that the horizontal shift in accordance to the horizontal movement quantity H cannot be performed, as the first information IN1 displayed on the through image.

Specifically, when the horizontal movement quantity H is less than 0, the CPU 21 determines that the horizontal shift of the movable platform 30*a* in the right direction, as viewed from the rear, cannot be performed. In other words, the CPU 21 determines that the picture-composition cannot be moved in the left direction and the left edge of the second frame F2 is emphasized accordingly (see FIG. 11 and step S114 in FIG. 29).

When the horizontal movement quantity H is greater than or equal to 0, the CPU 21 determines that the horizontal shift of the movable platform 30*a* in the left direction, as viewed from the rear, cannot be performed. In other words, the CPU 21 determines that the picture-composition cannot be moved in the right direction and the right edge of the second frame F2 is emphasized accordingly (see step S115 in FIG. 29).

Furthermore, when the CPU 21 determines that the horizontal shift in the right direction, as viewed from the rear, cannot be performed, the CPU 21 controls the backlight of the left direction key 16*b* to illuminate. So the CPU 21 performs the second warning which indicates that the operation of the left direction key 16*b* is invalid unless this unmovable state for the horizontal shift is resolved by operating any of the picture-composition adjustment keys 16 except for the left direction key 16*b*.

When the CPU 21 determines that the horizontal shift in the left direction viewed from the rear cannot be performed, the CPU 21 controls the backlight of the right direction key 16*a* to illuminate. So the CPU 21 performs the second warning which indicates that the operation of the right direction key 16*a* is invalid unless this unmovable state for the horizontal shift is resolved by operating any of the picture-composition adjustment keys 16 except for the right direction key 16*a*.

Therefore, the picture-composition adjustment keys 16 display the third information regarding a positional relationship between the movable platform 30*a* and the movement range of the movable platform 30*a*, under the condition where an ON/OFF state of the backlight of an invalid key (a non-operable key) among the picture-composition adjustment keys 16 is differentiated from an ON/OFF state of the backlight of valid keys (operable keys) among the picture-composition adjustment keys 16, when the CPU 21 determines that the movable platform 30*a* cannot be moved in the horizontal direction on the xy plane in accordance to the horizontal movement quantity H.

When the absolute value of the horizontal movement quantity H is less than or equal to the second horizontal movement quantity Ksx (Ksx≧|H|), the CPU 21 determines that the movable platform 30*a* does not make contact with the frame of the movement range of the movable platform 30*a* even if the movable platform 30*a* performs the horizontal shift in accordance to the horizontal movement quantity H under the condition in which the movable platform 30*a* rotates in accordance to the rotation quantity α and performs the vertical shift in accordance to the vertical movement quantity V.

In this case, the CPU 21 re-calculates the second horizontal shift quantity SHX2 corresponding to the horizontal movement quantity H (see step S110 in FIG. 29), so that the horizontal driving point DPx is moved in accordance to the second horizontal shift quantity SHX2 in the x direction.

Furthermore, the first information IN1 is indicated on the through image under the condition in which the right and left edges of the second frame F2 are not emphasized (see FIGS. 8, 9, and 12, and see step S112 in FIG. 29).

When the absolute value of the vertical movement quantity V is greater than the second vertical movement quantity Ksy (Ksy<|V|), the CPU 21 determines that a part of the movable platform 30*a* makes contact with the frame of the movement range of the movable platform 30*a* if the movable platform 30*a* performs the vertical shift in accordance to the vertical movement quantity V under the condition in which the movable platform 30*a* rotates in accordance to the rotation quantity α and performs the horizontal shift in accordance to the horizontal movement quantity H.

In this case, the CPU 21 does not re-calculate the second vertical shift quantity SHY2 and the fourth vertical shift quantity SHY4 corresponding to the vertical movement quantity V so that the previous vertical shift state of the movable platform 30*a* is maintained.

Furthermore, the CPU 21 performs the third warning that indicates that the vertical shift in accordance to the vertical movement quantity V cannot be performed, as the first information IN1 displayed on the through image.

Specifically, when the vertical movement quantity V is less than 0, the CPU 21 determines that the vertical shift of the movable platform 30*a* in the upward direction cannot be performed. In other words, the CPU 21 determines that the picture-composition cannot be moved in the downward direction and the lower edge of the second frame F2 is emphasized accordingly (see FIG. 12 and step S121 in FIG. 30).

When the vertical movement quantity V is greater than or equal to 0, the CPU 21 determines that the vertical shift of the movable platform 30*a* in the downward direction cannot be performed. In other words, the CPU 21 determines that the picture-composition cannot be moved in the upward direction and the upper edge of the second frame F2 is emphasized accordingly (see step S122 in FIG. 30).

Furthermore, when the CPU 21 determines that the vertical shift in the upward direction cannot be performed, the CPU 21 controls the backlight of the downward direction key 16*d* to illuminate. So the CPU 21 performs the third warning which indicates that the operation of the downward direction key 16*d* is invalid unless this unmovable state for the vertical shift is resolved by operating any of the picture-composition adjustment keys 16 except for the downward direction key 16*d*.

When the CPU 21 determines that the vertical shift in the downward direction cannot be performed, the CPU 21 controls the backlight of the upward direction key 16*c* to illuminate. So the CPU 21 performs the third warning which indicates that the operation of the upward direction key 16*c* is invalid unless this unmovable state for the horizontal shift is resolved by operating any of the picture-composition adjustment keys 16 except for the upward direction key 16*c*.

Therefore, the picture-composition adjustment keys 16 display the third information regarding a positional relationship between the movable platform 30*a* and the movement range of the movable platform 30*a*, under the condition where an ON/OFF state of the backlight of an invalid key (a non-operable key) among the picture-composition adjustment keys 16 is differentiated from an ON/OFF state of the backlight of valid keys (operable keys) among the picture-composition adjustment keys 16, when the CPU 21 determines that the movable platform 30*a* cannot be moved in the vertical direction on the xy plane in accordance to the vertical movement quantity V.

When the absolute value of the vertical movement quantity V is less than or equal to the second vertical movement quantity Ksy (Ksy≧|V|), the CPU 21 determines that the movable platform 30*a* does not make contact with the frame of the movement range of the movable platform 30*a* even if the movable platform 30*a* performs the vertical shift in accordance to the vertical movement quantity V under the condition in which the movable platform 30*a* rotates in accordance to the rotation quantity α and performs the horizontal shift in accordance to the horizontal movement quantity H.

In this case, the CPU 21 re-calculates the second vertical shift quantity SHY2 and the fourth vertical shift quantity SHY4 corresponding to the vertical movement quantity V (see step S117 in FIG. 30), so that the first vertical driving point DPyl is moved in accordance to the second vertical shift quantity SHY2 in the y direction and the second vertical driving point DPyr is moved in accordance to the fourth vertical shift quantity SHY4 in the y direction.

Figure 30:
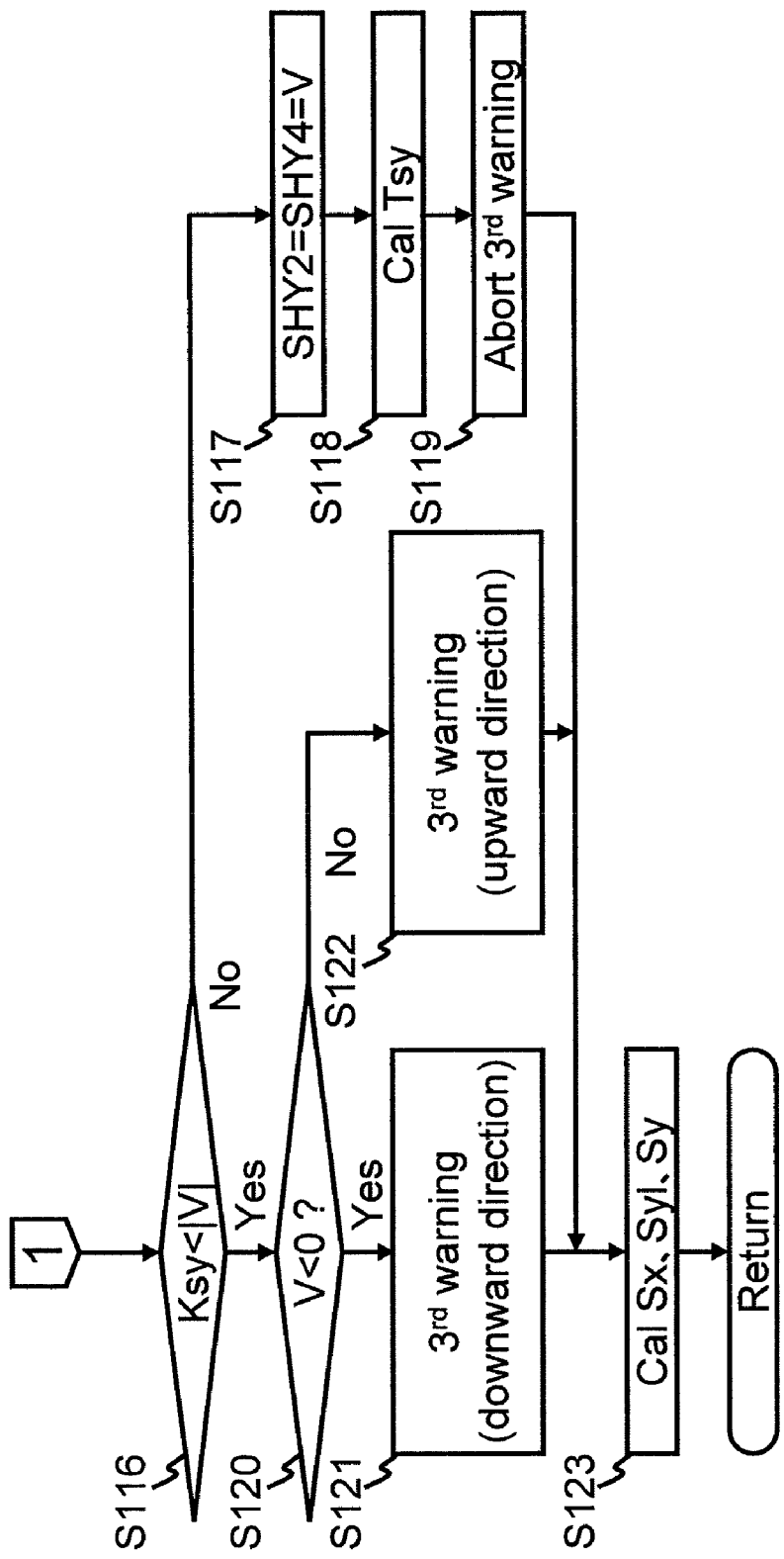

Furthermore, the first information IN1 is indicated on the through image under the condition in which the upper and lower edges of the second frame F2 are not emphasized (see FIGS. 8, 9, and 11, and see step S119 in FIG. 30).

The first warning of the non-rotatable state by emphasizing the first frame F1, the second warning of the unmovable state in the horizontal direction by emphasizing at least one of either the right or left edge of the second frame F2, and the third warning of the unmovable state in the vertical direction by emphasizing at least one of either the upper or lower edge of the second frame F2, may be performed at the same time.

FIG. 10 indicates the first information IN1 including the first warning that indicates that the rotation of the picture-composition in the counter-clockwise direction cannot be performed (the rotation of the movable platform 30*a* in the counter-clockwise direction, as viewed from the rear, cannot be performed), and the third warning that indicates that the movement of the picture-composition in the lower direction cannot be performed (the vertical shift of the movable platform 30*a* in the upward direction cannot be performed).

The limitation of the movement/rotation of the movable platform 30*a* for the picture-composition can be visually recognized by displaying these warnings.

Particularly, by illuminating the backlight of the non-operable key (invalid key), the user can visually recognize the necessary keys for resolving the non-rotatable/unmovable state.

In the embodiment, the backlight of the non-operable key illuminates and the backlights of the operable keys do not illuminate, however, the backlight of the non-operable key may illuminate and the backlights of the operable keys may not illuminate.

Furthermore, in the case that the picture-composition keys 16 are included in the touch panel and are displayed on the display 17 etc., the indication state of the invalid key (non-operable key) may be differentiated from that of the valid keys (operable keys).

Furthermore, the picture-composition adjustment keys 16 may issue a warning when the non-operable key (invalid key) is operated. Specifically, a warning sound or warning vibration may be output when the non-operable key is operated, as the warning.

Figure 32:
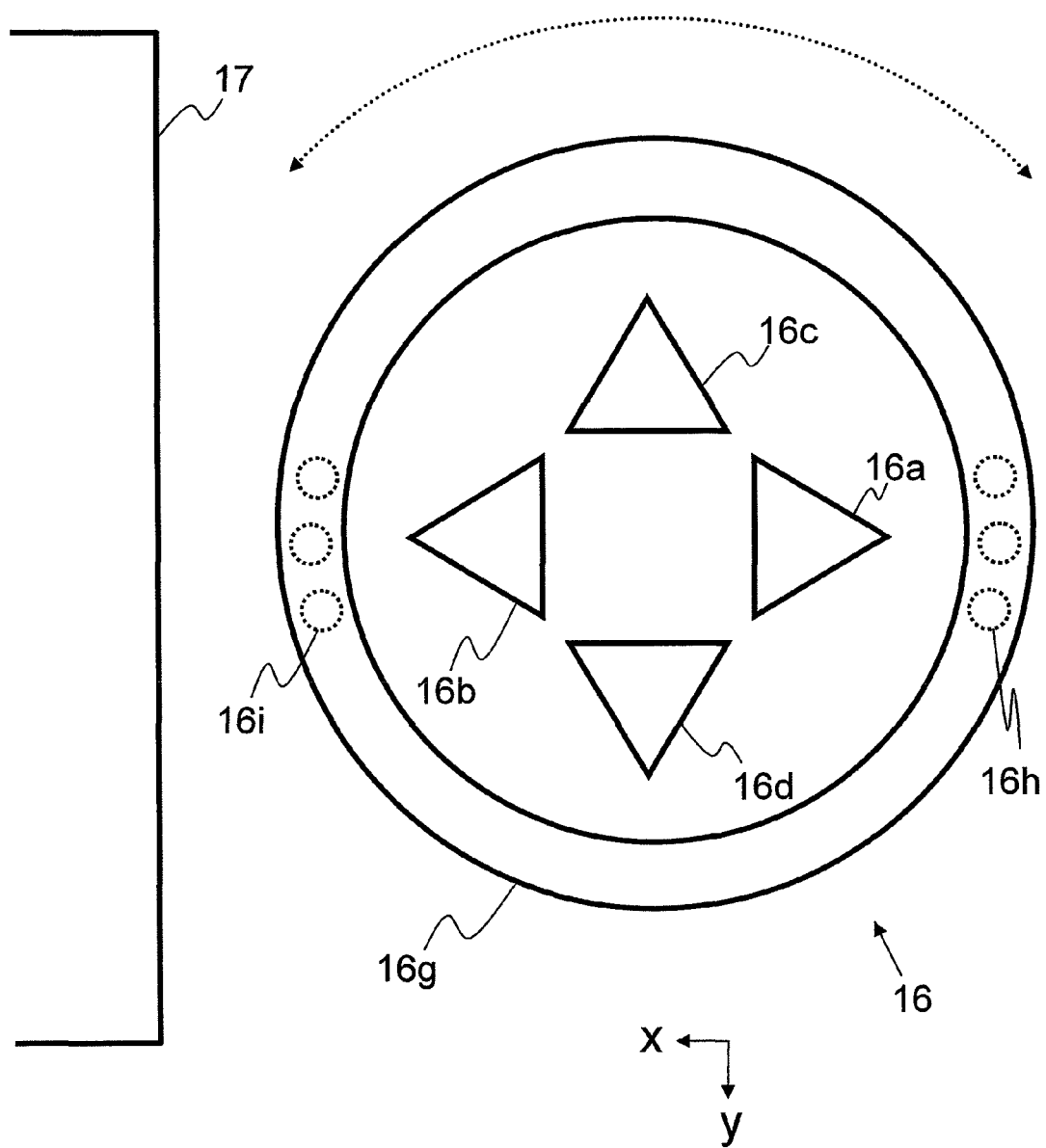
FIG. 32 is a construction diagram of the picture-composition adjustment keys in the case that the rotation dial member 16g, the right-hand rotation backlight 16h, and the left-hand rotation backlight 16i are arranged.

Furthermore, a rotation dial member 16*g* instead of the picture-composition adjustment keys 16 regarding rotation (the right-hand rotation key 16*e* and the left-hand rotation key 16*f*) may be arranged around the right direction key 16*a*, the left direction key 16*b*, the upward direction key 16*c*, and the downward direction key 16*d*, to effect rotation (see FIG. 32).

When the rotation dial member 16*g* is rotated in the clockwise direction, as viewed from the rear, a right-hand rotation switch (not depicted) is set to the ON state so that the movable platform 30*a* is rotated in the clockwise direction in accordance to the rotation quantity of the rotation dial member 16*g*, similar to the operation of the right-hand rotation key 16*e*.

When the rotation dial member 16*g* is rotated in the counter-clockwise direction, as viewed from the rear, a left-hand rotation switch (not depicted) is set to the ON state so that the movable platform 30*a* is rotated in the counter-clockwise direction in accordance to the rotation quantity of the rotation dial member 16*g*, similar to the operation of the left-hand rotation key 16*f*.

The warning indication for the non-rotatable state in the clockwise direction is performed by illuminating a right-hand rotation backlight 16*h* arranged behind the right side of the rotation dial member 16*g*.

The warning indication for the non-rotatable state in the counter-clockwise direction is performed by illuminating a left-hand rotation backlight 16*i* arranged behind the left side of the rotation dial member 16*g*.

Therefore, the rotation dial member 16*g* has a translucent member that transmits the light illuminated by the right-hand rotation backlight 16*h* and the left-hand rotation backlight 16*i*.

Figure 33:
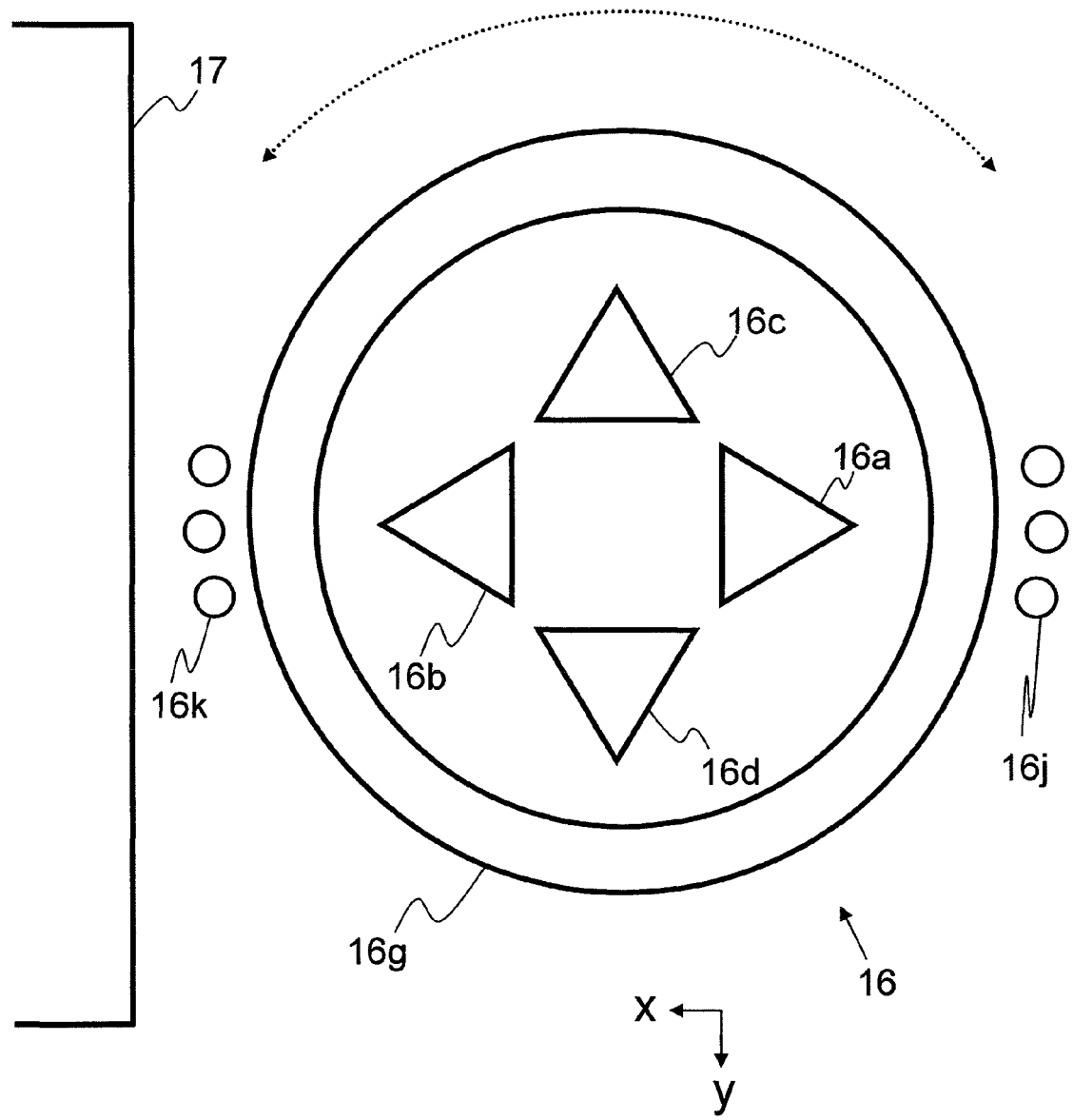
FIG. 33 is a construction diagram of the picture-composition adjustment keys in the case that the rotation dial member 16g, the right-hand rotation warning light 16j, and the left-hand rotation warning light 16k are arranged.

Note that the warning indication for the non-rotatable state in the clockwise direction may be performed by illuminating a right-hand rotation warning light 16*j* arranged at the right exterior side of the rotation dial member 16*g*, and the warning indication for the non-rotatable state in the counter-clockwise direction may be performed by illuminating a left-hand rotation warning light 16*k* arranged at the left exterior side of the rotation dial member 16*g* (see FIG. 33).

The movement/rotation of the movable platform 30*a*, which includes the imaging unit 39*a*, is performed by using an electro-magnetic force and is described later.

The driving force D is for driving the driver circuit 29 in order to move the movable platform 30*a* to the position S.

The horizontal direction component of the driving force D for the horizontal coil 31*a* is defined as the horizontal driving force Dx (after D/A conversion, the horizontal PWM duty dx).

The vertical direction component of the driving force D for the first vertical coil 32*a*1 is defined as the first vertical driving force Dyl (after D/A conversion, the first vertical PWM duty dyl).

The vertical direction component of the driving force D for the second vertical coil 32*a*2 is defined as the second vertical driving force Dyr (after D/A conversion, the second vertical PWM duty dyr).

Driving of the movable platform 30*a*, including movement to the fixed (held) position of the initial state, is performed by the electro-magnetic force of the coil unit and the magnetic unit through the driver circuit 29, which has the horizontal PWM duty dx input from the PWM 0 of the CPU 21, the first vertical PWM duty dyl input from the PWM 1 of the CPU 21, and the second vertical PWM duty dyr input from the PWM 2 of the CPU 21 (see (3) in FIG. 16).

The detected position P of the movable platform 30a, either before or after the movement/rotation performed by the driver circuit 29, is detected by the hall sensor unit 44a and the hall sensor signal-processing unit 45.

Information regarding the horizontal direction component of the detected position P, in other words, the horizontal detected position signal px, is input to the A/D converter A/D 3 of the CPU 21 (see (4) in FIG. 16). The horizontal detected position signal px is an analog signal that is converted to a digital signal by the A/D converter A/D 3 (A/D conversion operation). The horizontal direction component of the detected position P after the A/D conversion operation is defined as pdx and corresponds to the horizontal detected position signal px.

Information regarding one of the vertical direction components of the detected position P, in other words, the first vertical detected position signal pyl, is input to the A/D converter A/D 4 of the CPU 21. The first vertical detected position signal pyl is an analog signal that is converted to a digital signal by the A/D converter A/D 4 (A/D conversion operation). The first vertical direction component of the detected position P after the A/D conversion operation is defined as pdyl and corresponds to the first vertical detected position signal pyl.

Information regarding the other of the vertical direction components of the detected position P, in other words, the second vertical detected position signal pyr, is input to the A/D converter A/D 5 of the CPU 21. The second vertical detected position signal pyr is an analog signal that is converted to a digital signal by the A/D converter A/D 5 (A/D conversion operation). The second vertical direction component of the detected position P after the A/D conversion operation is defined as pdyr and corresponds to the second vertical detected position signal pyr.

The PID (Proportional Integral Differential) control calculates the horizontal driving force Dx and the first and second vertical driving forces Dyl and Dyr on the basis of the coordinate data of the detected position P (pdx, pdyl, pdyr) and the position S (Sx, Syl, Syr) following movement (see (5) in FIG. 16).

Driving of the movable platform 30a to the position S (Sx, Syl, Syr) corresponding to the picture-composition adjustment of the PID control is performed when the photographic apparatus 1 is in the picture-composition adjustment mode (CP=1) where the picture-composition adjustment ON/OFF switch 14a is set to the ON state.

When the picture-composition adjustment parameter CP is 0, a PID control unrelated to the picture-composition adjustment is performed so that the movable platform 30a is moved to the center of the movement range in the initial state, such that each of the four sides composing the outline of the imaging surface of the imager 39a1 of the imaging unit 39a is parallel to either the x direction or the y direction (see (6) in FIG. 16).

Figure 6:
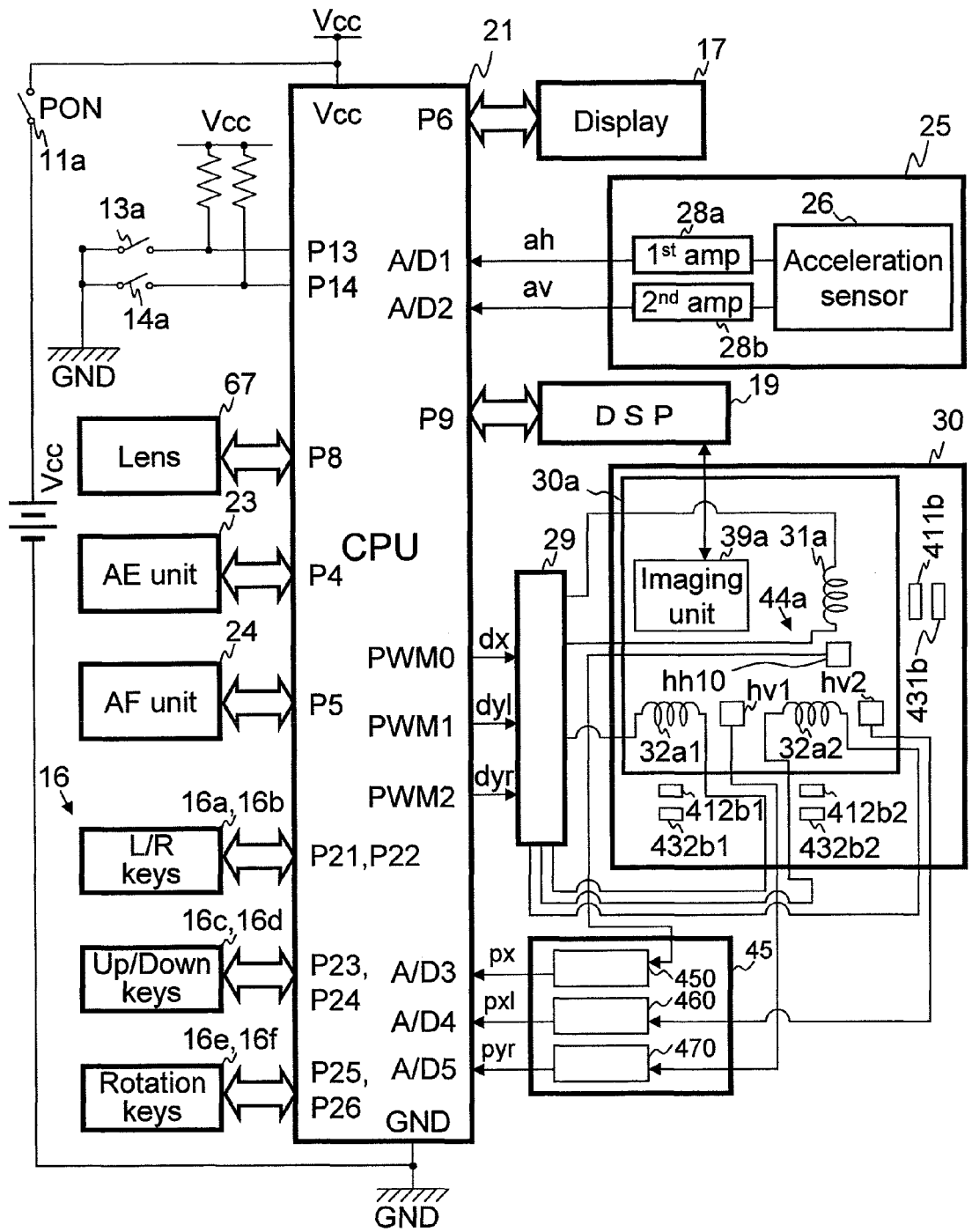
FIG. 6 is a circuit construction diagram of the photographic apparatus.

The movable platform 30a has the coil unit for driving that is comprised of a horizontal coil 31a, a first vertical coil 32a1, and a second vertical coil 32a2, an imaging unit 39a having the imager 39a1, and a hall sensor unit 44a as a magnetic-field change-detecting element unit (see FIGS. 6 and 21). In the embodiment, the imager 39a1 is a CCD; however, the imager 39a1 may be another type, such as a CMOS, etc.

The fixed unit 30b has a magnetic position detection and driving unit that is comprised of a horizontal magnet 411b, a first vertical magnet 412b1, a second vertical magnet 412b2, a horizontal yoke 431b, a first vertical yoke 432b1, and a second vertical yoke 432b2.

The fixed unit 30b movably and rotatably supports the movable platform 30a in the rectangular-shaped movement range on the xy plane, using balls, etc. The balls are arranged between the fixed unit 30b and the movable platform 30a.

When the central area of the imager 39a1 is intersected by the optical axis LL of the camera lens 67, the relationship between the position of the movable platform 30a and the position of the fixed unit 30b is arranged so that the movable platform 30a is positioned at the center of its movement range in both the x direction and the y direction, in order to utilize the full size of the imaging range of the imager 39a1.

The rectangular shape of the imaging surface of the imager 39a1 has two diagonal lines. In the embodiment, the center of the imager 39a1 is at the intersection of these two diagonal lines.

Figure 25:
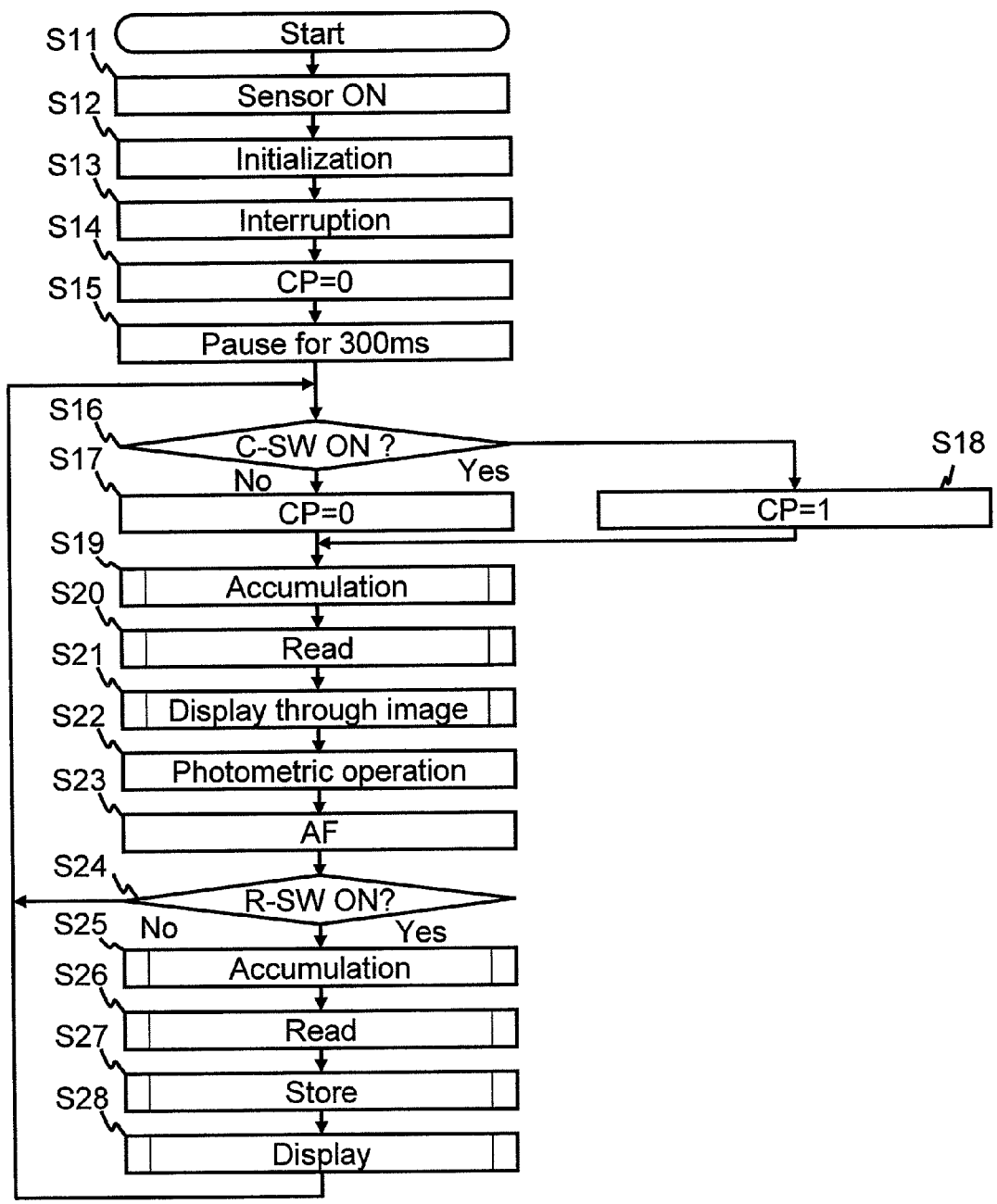
FIG. 25 is a flowchart that shows the main operation of the photographic apparatus.

Furthermore, the movable platform 30a is positioned at the center of its movement range in both the x direction and the y direction, and each of the four sides composing the outline of the imaging surface of the imager 39a1 is parallel to either the x direction or the y direction, in the initial state immediately after the PON switch 11a is set to the ON state corresponding to depressing the PON button 11, at which point the picture-composition adjustment commences (see step S15 of FIG. 25).

The horizontal coil 31a, the first vertical coil 32a1, the second vertical coil 32a2, and the hall sensor unit 44a are attached to the movable platform 30a.

The horizontal coil 31a forms a seat and a spiral-shaped coil pattern. The coil pattern of the horizontal coil 31a has lines that are parallel to the y direction, thus creating the horizontal electro-magnetic force to move the horizontal driving point DPx on the movable platform 30a that includes the horizontal coil 31a, in the x direction.

The horizontal electro-magnetic force is created by the current direction of the horizontal coil 31a and the magnetic-field direction of the horizontal magnet 411b.

The first vertical coil 32a1 forms a seat and a spiral-shaped coil pattern. The coil pattern of the first vertical coil 32a1 has lines that are parallel to the x direction, thus creating the first vertical electro-magnetic force to move the first vertical driving point DPyl on the movable platform 30a that includes the first vertical coil 32a1, in the y direction.

The first vertical electro-magnetic force is created by the current direction of the first vertical coil 32a1 and the magnetic-field direction of the first vertical magnet 412b1.

The second vertical coil 32a2 forms a seat and a spiral-shaped coil pattern. The coil pattern of the second vertical coil 32a2 has lines that are parallel to the x direction, thus creating the second vertical electro-magnetic force to move the second vertical driving point DPyr on the movable platform 30a that includes the second vertical coil 32a2, in the y direction and to rotate the movable platform 30a.

The second vertical electro-magnetic force is created by the current direction of the second vertical coil 32a2 and the magnetic-field direction of the second vertical magnet 412b2.

The horizontal coil 31a and the first and second vertical coils 32a1 and 32a2 are connected to the driver circuit 29, which drives the horizontal coil 31a and the first and second vertical coils 32a1 and 32a2, through the flexible circuit board (not depicted).

The horizontal PWM duty dx, which is a duty ratio of a PWM pulse, is input to the driver circuit 29 from the PWM 0 of the CPU 21. The first vertical PWM duty dyl, which is a duty ratio of a PWM pulse, is input to the driver circuit 29 from the PWM 1 of the CPU 21. The second vertical PWM duty dyr, which is a duty ratio of a PWM pulse, is input to the driver circuit 29 from the PWM 2 of the CPU 21.

The driver circuit 29 supplies power to the horizontal coil 31a, corresponding to the value of the horizontal PWM duty dx, in order to move the horizontal driving point DPx on the movable platform 30a in the x direction.

The driver circuit 29 supplies power to the first vertical coil 32a1, corresponding to the value of the first vertical PWM duty dyl, in order to move the first vertical driving point DPyl on the movable platform 30a in the y direction.

The driver circuit 29 supplies power to the second vertical coil 32a2, corresponding to the value of the second vertical PWM duty dyr, in order to move the second vertical driving point DPyr on the movable platform 30a in the y direction.

The first and second vertical coils 32a1 and 32a2 are arranged in the x direction in the initial state.

The first and second vertical coils 32a1 and 32a2 are arranged in the initial state such that the distance between the central area of the imager 39a1 (the rotation center O) and the central area of the first vertical coil 32a1 in the y direction is the same as the distance between the central area of the imager 39a1 and the central area of the second vertical coil 32a2 in the y direction.

The horizontal magnet 411b is attached to the movable platform side of the fixed unit 30b, where the horizontal magnet 411b faces the horizontal coil 31a and the horizontal hall sensor hh10 in the z direction.

The first vertical magnet 412b1 is attached to the movable platform side of the fixed unit 30b, where the first vertical magnet 412b1 faces the first vertical coil 32a1 and the first vertical hall sensor hv1 in the z direction.

The second vertical magnet 412b2 is attached to the movable platform side of the fixed unit 30b, where the second vertical magnet 412b2 faces the second vertical coil 32a2 and the second vertical hall sensor hv2 in the z direction.

The horizontal magnet 411b is attached to the horizontal yoke 431b, such that the N pole and S pole are arranged in the x direction. The horizontal yoke 431b is attached to the fixed unit 30b.

The first vertical magnet 412b1 is attached to the first vertical yoke 432b1, such that the N pole and S pole are arranged in the y direction. The first vertical yoke 432b1 is attached to the fixed unit 30b.

Likewise, the second vertical magnet 412b2 is attached to the second vertical yoke 432b2, such that the N pole and S pole are arranged in the y direction. The second vertical yoke 432b2 is attached to the fixed unit 30b.

The horizontal yoke 431b is made of a soft magnetic material.

The horizontal yoke 431b prevents the magnetic field of the horizontal magnet 411b from dissipating to the surroundings, and raises the magnetic-flux density between the horizontal magnet 411b and the horizontal coil 31a, and between the horizontal magnet 411b and the horizontal hall sensor hh10.

The first and second vertical yokes 432b1 and 432b2 are made of a soft magnetic material.

The first vertical yoke 432b1 prevents the magnetic field of the first vertical magnet 412b1 from dissipating to the surroundings, and raises the magnetic-flux density between the first vertical magnet 412b1 and the first vertical coil 32a1, and between the first vertical magnet 412b1 and the first vertical hall sensor hv1.

Likewise, the second vertical yoke 432b2 prevents the magnetic field of the second vertical magnet 412b2 from dissipating to the surroundings, and raises the magnetic-flux density between the second vertical magnet 412b2 and the second vertical coil 32a2, and between the second vertical magnet 412b2 and the second vertical hall sensor hv2.

The horizontal yoke 431b and the first and second vertical yokes 432b1 and 432b2 may be composed of one body or separate bodies.

The hall sensor unit 44a is a single-axis hall sensor with three component hall sensors that are electromagnetic converting elements (magnetic-field change-detecting elements) using the Hall Effect. The hall sensor unit 44a detects the horizontal detected position signal px as the present position P of the movable platform 30a in the x direction, the first vertical detected position signal pyl and the second vertical detected position signal pyr as the present position P of the movable platform 30a in the y direction.

One of the three hall sensors is a horizontal hall sensor hh10 for detecting the horizontal detected position signal px, and another of the three hall sensors is a first vertical hall sensor hv1 for detecting the first vertical detected position signal pyl, with the third being a second vertical hall sensor hv2 for detecting the second vertical detected position signal pyr.

The horizontal hall sensor hh10 is attached to the movable platform 30a, where the horizontal hall sensor hh10 faces the horizontal magnet 411b of the fixed unit 30b in the z direction, and where the horizontal driving point DPx is set to a position close to the horizontal hall sensor hh10.

The horizontal hall sensor hh10 may be arranged outside the spiral winding of the horizontal coil 31a in the y direction. However, it is desirable for the horizontal hall sensor hh10 to be arranged inside the spiral winding of the horizontal coil 31a, and midway along the outer circumference of the spiral winding of the horizontal coil 31a in the x direction (see FIG. 21).

The horizontal hall sensor hh10 is layered on the horizontal coil 31a in the z direction. Accordingly, the area in which the magnetic field is generated for the position-detecting operation and the area in which the magnetic field is generated for driving the movable platform 30a are shared. Therefore, the length of the horizontal magnet 411b in the y direction and the length of the horizontal yoke 431b in the y direction can be shortened.

Furthermore, the horizontal driving point DPx, to which the horizontal electro-magnetic force based on the horizontal coil 31a is applied, can be close to a position-detecting point by the horizontal hall sensor hh10. Therefore, accurate driving control of the movable platform 30a in the x direction can be performed.

The first vertical hall sensor hv1 is attached to the movable platform 30a, where the first vertical hall sensor hv1 faces the first vertical magnet 412b1 of the fixed unit 30b in the z direction, and where the first vertical driving point DPyl is set to a position close to the first vertical hall sensor hv1.

The second vertical hall sensor hv2 is attached to the movable platform 30a, where the second vertical hall sensor hv2 faces the second vertical magnet 412b2 of the fixed unit 30b in the z direction, and where the second vertical driving point DPyr is set to a position close to the second vertical hall sensor hv2.

The first and second vertical hall sensors hv1 and hv2 are arranged in the x direction in the initial state.

The first vertical hall sensor hv1 may be arranged outside the spiral winding of the first vertical coil 32a1 in the x direction. However, it is desirable for the first vertical hall sensor hv1 to be arranged inside the spiral winding of the first vertical coil 32a1, and midway along the outer circumference of the spiral winding of the first vertical coil 32a1 in the y direction.

The first vertical hall sensor hv1 is layered on the first vertical coil 32a1 in the z direction. Accordingly, the area in which the magnetic field is generated for the position-detecting operation and the area in which the magnetic field is generated for driving the movable platform 30a are shared. Therefore, the length of the first vertical magnet 412b1 in the x direction and the length of the first vertical yoke 432b1 in the x direction can be shortened.

The second vertical hall sensor hv2 may be arranged outside the spiral winding of the second vertical coil 32a2 in the x direction. However, it is desirable for the second vertical hall sensor hv2 to be arranged inside the spiral winding of the second vertical coil 32a2, and midway along the outer circumference of the spiral winding of the second vertical coil 32a2 in the y direction.

The second vertical hall sensor hv2 is layered on the second vertical coil 32a2 in the z direction. Accordingly, the area in which the magnetic field is generated for the position-detecting operation and the area in which the magnetic field is generated for driving the movable platform 30a are shared. Therefore, the length of the second vertical magnet 412b2 in the x direction and the length of the second vertical yoke 432b2 in the x direction can be shortened.

Furthermore, the first vertical driving point DPyl, to which the first vertical electro-magnetic force based on the first vertical coil 32a1 is applied, can be close to a position-detecting point by the first vertical hall sensor hv1, and the second vertical driving point DPyr, to which the second vertical electro-magnetic force based on the second vertical coil 32a2 is applied, can be close to a position-detecting point by the second vertical hall sensor hv2. Therefore, accurate driving control of the movable platform 30a in the y direction can be performed.

In the initial state and when the central area of the imager 39a1 (the rotation center O) is intersected by the optical axis LL of the camera lens 67, it is desirable for the horizontal hall sensor hh10 to be located on the hall sensor unit 44a so that it faces an intermediate area between the N pole and S pole of the horizontal magnet 411b in the x direction, as viewed from the z direction, to perform the position-detecting operation and utilize the full range within which an accurate position-detecting operation can be performed based on the linear output change (linearity) of the single-axis hall sensor.

Similarly, in the initial state and when the central area of the imager 39a1 (the rotation center O) is intersected by the optical axis LL of the camera lens 67, it is desirable for the first vertical hall sensor hv1 to be located on the hall sensor unit 44a so that it faces an intermediate area between the N pole and S pole of the first vertical magnet 412b1 in the y direction, as viewed from the z direction.

Likewise, in the initial state and when the central area of the imager 39a1 (the rotation center O) is intersected by the optical axis LL of the camera lens 67, it is desirable for the second vertical hall sensor hv2 to be located on the hall sensor unit 44a so that it faces an intermediate area between the N pole and S pole of the second vertical magnet 412b2 in the y direction, as viewed from the z direction.

The first hall sensor signal-processing unit 45 has a signal processing circuit of the magnetic-field change-detecting element that is comprised of a first hall sensor signal-processing circuit 450, a second hall sensor signal-processing circuit 460, and a third hall sensor signal-processing circuit 470.

The first hall sensor signal-processing circuit 450 detects a horizontal potential difference between the output terminals of the horizontal hall sensor hh10, based on the output signal of the horizontal hall sensor hh10.

The first hall sensor signal-processing circuit 450 outputs the horizontal detected position signal px to the A/D converter A/D 3 of the CPU 21, on the basis of the horizontal potential difference. The horizontal detected position signal px represents the specific location of the horizontal hall sensor hh10 (the position-detecting point by the horizontal hall sensor hh10) on the movable platform 30a, in the x direction.

The first hall sensor signal-processing circuit 450 is connected to the horizontal hall sensor hh10 through the flexible circuit board (not depicted).

The second hall sensor signal-processing circuit 460 detects a first vertical potential difference between the output terminals of the first vertical hall sensor hv1, based on the output signal of the first vertical hall sensor hv1.

The second hall sensor signal-processing circuit 460 outputs the first vertical detected position signal pyl to the A/D converter A/D 4 of the CPU 21, on the basis of the first vertical potential difference. The first vertical detected position signal pyl represents the specific location of the first vertical hall sensor hv1 (the position-detecting point by the first vertical hall sensor hv1) on the movable platform 30a, in the y direction.

The second hall sensor signal-processing circuit 460 is connected to the first vertical hall sensor hv1 through the flexible circuit board (not depicted).

The third hall sensor signal-processing circuit 470 detects a second vertical potential difference between the output terminals of the second vertical hall sensor hv2, based on the output signal of the second vertical hall sensor hv2.

The third hall sensor signal-processing circuit 470 outputs the second vertical detected position signal pyr to the A/D converter A/D 5 of the CPU 21, on the basis of the second vertical potential difference. The second vertical detected position signal pyr represents the specific location of the second vertical hall sensor hv2 (the position-detecting point by the second vertical hall sensor hv2) on the movable platform 30a, in the y direction.

The third hall sensor signal-processing circuit 470 is connected to the second vertical hall sensor hv2 through the flexible circuit board (not depicted).

In the embodiment, the three hall sensors (hh10, hv1 and hv2) are configured to specify the location of the movable platform 30a including the rotational (inclination) angle.

The locations in the y direction of the two points on the movable platform 30a are determined by using two of the three hall sensors (hv1 and hv2). These two points are close to the first vertical driving point DPyl and the second vertical driving point DPyr, respectively. The location in the x direction of the one point on the movable platform 30a is determined by using another of the three hall sensors (hh10). This one point is close to the horizontal driving point DPx. The location of the movable platform 30a, which includes the rotational (inclination) angle on the xy plane, can be determined on the basis of the information regarding the locations in the x direction of the one point and the location in the y direction of the two points.

Next, the main operation of the photographic apparatus 1 in the embodiment is explained using the flowchart of FIG. 25.

When the PON switch 11a is set to the ON state, the photographic apparatus 1 is set to the ON state and electrical power is supplied to the inclination detection unit 25 so that the inclination detection unit 25 is set to the ON state in step S11.

In step S12 the CPU 21 initializes the values. The values include the horizontal movement quantity H, the vertical movement quantity V, the rotation quantity α, the first horizontal movement quantity Tsx, the second horizontal movement quantity Ksx, the first vertical movement quantity Tsy, the second vertical movement quantity Ksy, the first horizontal shift quantity SHX1, the second horizontal shift quantity SHX2, the first vertical shift quantity SHY1, the second vertical shift quantity SHY2, the third vertical shift quantity SHY3, and the fourth vertical shift quantity SHY4.

Specifically, the CPU 21 sets the values of the horizontal movement quantity H, the vertical movement quantity V, the rotation quantity α, the first horizontal shift quantity SHX1, the second horizontal shift quantity SHX2, the first vertical shift quantity SHY1, the second vertical shift quantity SHY2, the third vertical shift quantity SHY3, and the fourth vertical shift quantity SHY4 to 0.

The CPU 21 sets the values of the first horizontal movement quantity Tsx and the second horizontal movement quantity Ksx to a horizontal maximum movement quantity HOx.

The CPU 21 sets the values of the first vertical movement quantity Tsy and the second vertical movement quantity Ksy to a vertical maximum movement quantity Hoy.

The horizontal maximum movement quantity HOx is the quantity that the movable platform 30a can be moved in the x direction in the initial state.

The vertical maximum movement quantity Hoy is the quantity that the movable platform 30a can be moved in the y direction in the initial state.

The horizontal maximum movement quantity HOx and the vertical maximum movement quantity Hoy are the fixed values that are determined by design in advance (see FIGS. 23 and 24).

In step S13, a first timer interrupt process and a second timer interrupt process at the predetermined time interval (1 ms) commence. The details of the first timer interrupt process in the embodiment are explained later using the flowcharts of FIGS. 26, 27, 29, and 30. The details of the second timer interrupt process in the embodiment are explained later using the flowchart of FIG. 28.

In step S14, the CPU 21 sets the value of the picture-composition adjustment parameter CP to 0.

In step S15, the CPU 21 pauses for 300 ms. Then, the operation continues to step S16.

In the first timer interrupt process performed during this waiting period, the movable platform 30a is moved to the center of the movement range, as in the initial state, such that each of the four sides composing the outline of the imaging surface of the imager 39a1 of the imaging unit 39a is parallel to either the x direction or the y direction.

Furthermore, the CPU 21 communicates with the camera lens 67 so that the lens information is output from the camera lens 67 to the CPU 21.

In step S16, the CPU 21 determines whether the picture-composition adjustment ON/OFF switch 14a (C-SW in FIG. 25) is set to the ON state. When the CPU 21 determines that the picture-composition adjustment ON/OFF switch 14a is not set to the ON state, the CPU 21 sets the value of the picture-composition adjustment parameter CP to 0 in step S17. Otherwise, the CPU 21 sets the value of the picture-composition adjustment parameter CP to 1 in step S18.

In step S19, the exposure operation, that is, the electric charge accumulation of the imager 39a1 (CCD etc.), is performed.

In step S20, the electric charge accumulated in the imager 39a1 during the exposure time is read. In step S21, the CPU 21 communicates with the DSP 19 so that the image-processing operation is performed based on the electric charge read from the imager 39a1. The image on which the image-processing operation is performed is displayed on the display 17 (the indication of the through image).

In step S22, the photometric operation is performed by the AE unit 23 so that the aperture value and the duration of the exposure operation are calculated.

In step S23, the AF sensing operation is performed by the AF unit 24 and the focusing operation is performed by driving the lens control circuit.

In step S24, the CPU 21 determines whether the shutter release switch 13a (R-SW in FIG. 25) is set to the ON state. When the CPU 21 determines that the shutter release switch 13a is not set to the ON state, the operation returns to step S16 and the process described in steps S16 to S23 is repeated. Otherwise, the operation continues on to step S25.

In step S25, the exposure operation, that is, the electric charge accumulation of the imager 39a1 (CCD etc.), is performed. In step S26, the electric charge accumulated in the imager 39a1 during the exposure time is read. In step S27, the CPU 21 communicates with the DSP 19 so that the image-processing operation is performed based on the electric charge read from the imager 39a1. The image on which the image-processing operation is performed is stored in the memory of the photographic apparatus 1. In step S28, the image stored in the memory is displayed on the display 17, and the operation then returns to step S16. In other words, the photographic apparatus 1 is returned to a state in which the next imaging operation can be performed.

Next, the first timer interrupt process in the embodiment, which commences in step S13 in FIG. 25 and is performed at every predetermined time interval (1 ms) independent of the other operations, is explained using the flowchart of FIG. 26.

When the first timer interrupt process commences, the first acceleration ah, which is output from the inclination detection unit 25, is input to the A/D converter A/D 1 of the CPU 21 and converted to the first digital acceleration signal Dah in step S51. Similarly, the second acceleration av, which is also output from the inclination detection unit 25, is input to the A/D converter A/D 2 of the CPU 21 and converted to the second digital acceleration signal Day (the acceleration detection operation).

In the acceleration detection operation in step S51, the first acceleration ah and the second acceleration av, which are amplified by the first and second amplifiers 28a and 28b, are input to the CPU 21.

The high frequencies of the first and second digital acceleration signals Dah and Day are reduced in the digital low-pass filtering process (the first and second digital acceleration Aah and Aav).

In step S52, the hall sensor unit 44a detects the position of the movable platform 30a. The horizontal detected position signal px and the first and second vertical detected position signals pyl and pyr are calculated by the hall sensor signal-processing unit 45. The horizontal detected position signal px is then input to the A/D converter A/D 3 of the CPU 21 and converted to the digital signal pdx, the first vertical detected position signal pyl is then input to the A/D converter A/D 4 of the CPU 21 and converted to the digital signal pdyl, and the second vertical detected position signal pyr is input to the A/D converter A/D 5 of the CPU 21 and also converted to the digital signal pdyr, both of which thus specify the present position P (pdx, pdyl, pdyr) of the movable platform 30a (see (4) in FIG. 16).

In step S53, the CPU 21 calculates the camera inclination angle Kθ on the basis of the first and second digital accelerations Aah and Aav (see (1) in FIG. 16).

The details of the calculation of the camera inclination angle Kθ in the embodiment are explained later using the flowchart of FIG. 27.

In step S54, the CPU 21 determines whether the value of the picture-composition adjustment parameter CP is 0. When the CPU 21 determines that the value of the picture-composition adjustment parameter CP is 0 (CP=0), in other words, that the photographic apparatus 1 is not in the picture-composition adjustment mode, the operation continues to step S55.

When the CPU 21 determines that the value of the picture-composition adjustment parameter CP is not 0 (CP=1), in other words when the photographic apparatus 1 is in picture-composition adjustment mode, the operation proceeds to step S58.

In step S55, the CPU 21 sets the values of the horizontal movement quantity H, the vertical movement quantity V, and the rotation quantity α to 0.

In step S56, the CPU 21 releases (aborts) the warning indication. Specifically, if at least one of the first warning regarding a non-rotatable condition, the second warning regarding an unmovable condition in the horizontal direction, and the third warning regarding an unmovable condition in the vertical direction, is in effect, in other words, if the first information IN1 including the inclined first frame F1 or the emphasized right edge etc. of the second frame F2 is indicated, the CPU 21 releases (cancels) the inclined state of the first frame F1 and the emphasized state of the right edge etc. of the second frame F2.

In step S57, the CPU 21 sets the position S (Sx, Syl, Syr), which is where the movable platform 30a should be moved, to the center of its movement range in both the x and y directions, under the condition in which each of the four sides of the rectangle composing the outline of the imaging surface of the imager (an imaging sensor) 39a1 is parallel to either the x direction or the y direction. (see (6) in FIG. 16).

In step S58, the CPU 21 determines whether the shutter release switch 13a (R-SW in FIG. 26) is set to the ON state. When the CPU 21 determines that the shutter release switch 13a is not set to the ON state, the operation continues to step S59. Otherwise, the operation proceeds to step S61.

In step S59, the CPU 21 determines the values of the horizontal movement quantity H, the vertical movement quantity V, and the rotation quantity α, in accordance to the operation state of the picture-composition adjustment keys 16.

In step S60, the CPU 21 calculates the position S (Sx, Syl, Syr) where the movable platform 30a should be moved (the movement position Sx of the horizontal driving point DPx, the movement position Syl of the first vertical driving point DPyl, and the movement position Syr of the second vertical driving point DPyr), on the basis of the horizontal movement quantity H, the vertical movement quantity V, the rotation quantity α, etc. (see (2) in FIG. 16).

The details of the calculation for the position S (Sx, Syl, Syr) are explained later using the flowchart of FIGS. 29 and 30.

In step S61, the CPU 21 calculates the horizontal driving force Dx (the horizontal PWM duty dx), the first vertical driving force Dyl (the first vertical PWM duty dyl), and the second vertical driving force Dyr (the second vertical PWM duty dyr) of the driving force D, which moves the movable platform 30a to the position S on the basis of the present position P (pdx, pdyl, pdyr) and the coordinates of position S (Sx, Syl, Syr) that were determined in step S57 or step S60 (see (5) in FIG. 16).

In step S62, the horizontal coil 31a is driven by applying the horizontal PWM duty dx through the driver circuit 29: the first vertical coil 32a1 is driven by applying the first vertical PWM duty dyl through the driver circuit 29 and the second vertical coil 32a2 is driven by applying the second vertical PWM duty dyr through the driver circuit 29, so that the movable platform 30a is moved to position S (Sx, Syl, Syr) (see (3) in FIG. 16).

The process of steps S61 and S62 is an automatic control calculation that is performed by the PID automatic control for performing general (normal) proportional, integral, and differential calculations.

In step S63, the CPU 21 calculates the movable platform inclination angle LVL (LVL=Kθ+α, see (7) in FIG. 16).

In step S64, the CPU 21 indicates the first information IN1 on the through image if the first information IN1 has not been indicated on the through image.

If the first information IN1 has already been indicated on the through image, the CPU 21 maintains this indicated state.

Furthermore, the CPU 21 indicates the second information IN2 on the through image on the basis of the camera inclination angle Kθ etc., which is calculated in step S53, if the second information IN2 has not been indicated on the through image.

If the second information IN2 has already been indicated on the through image, the CPU 21 updates the second information IN2, which is indicated on the through image, on the basis of the camera inclination angle Kθ etc.

Next, the calculation of the camera inclination angle Kθ, which is performed in step S53 of FIG. 26, is explained using the flowchart of FIG. 27.

When the calculation of the camera inclination angle Kθ commences, the CPU 21 determines whether the absolute value of the second digital acceleration Aav is larger than or equal to the absolute value of the first digital acceleration Aah, in step S71.

When the CPU 21 determines that the absolute value of the second digital acceleration Aav is larger than or equal to the absolute value of the first digital acceleration Aah, the operation proceeds to step S75, otherwise, the operation continues to step S72.

In step S72, the CPU 21 determines whether the first digital acceleration Aah is larger than or equal to 0. When the CPU 21 determines that the first digital acceleration Aah is larger than or equal to 0, the operation proceeds to step S74, otherwise, the operation continues to step S73.

In step S73, the CPU 21 determines that the photographic apparatus 1 is held approximately in the first vertical orientation, and calculates the camera inclination angle Kθ by taking the negative value of the arcsine transformation of the second digital acceleration Aav (Kθ=−Sin$^{-1}$(Aav)).

In step S74, the CPU 21 determines that the photographic apparatus is held approximately in the second vertical orientation, and calculates the camera inclination angle Kθ by performing the arcsine transformation on the second digital acceleration Aav (Kθ=+Sin$^{-1}$(Aav)).

In step S75, the CPU 21 determines whether the second digital acceleration Aav is larger than or equal to 0. When the CPU 21 determines that the second digital acceleration Aav is larger than or equal to 0, the operation proceeds to step S77, otherwise, the operation continues to step S76.

In step S76, the CPU 21 determines that the photographic apparatus 1 is held approximately in the second horizontal orientation, and calculates the camera inclination angle Kθ by performing the arcsine transformation on the first digital acceleration Aah (Kθ=+Sin$^{-1}$(Aah)).

In step S77, the CPU 21 determines that the photographic apparatus is held approximately in the first horizontal orientation, and calculates the camera inclination angle Kθ by taking the negative value of the arcsine transformation of the first digital acceleration Aah (Kθ=−Sin$^{-1}$(Aah)).

Figure 28:
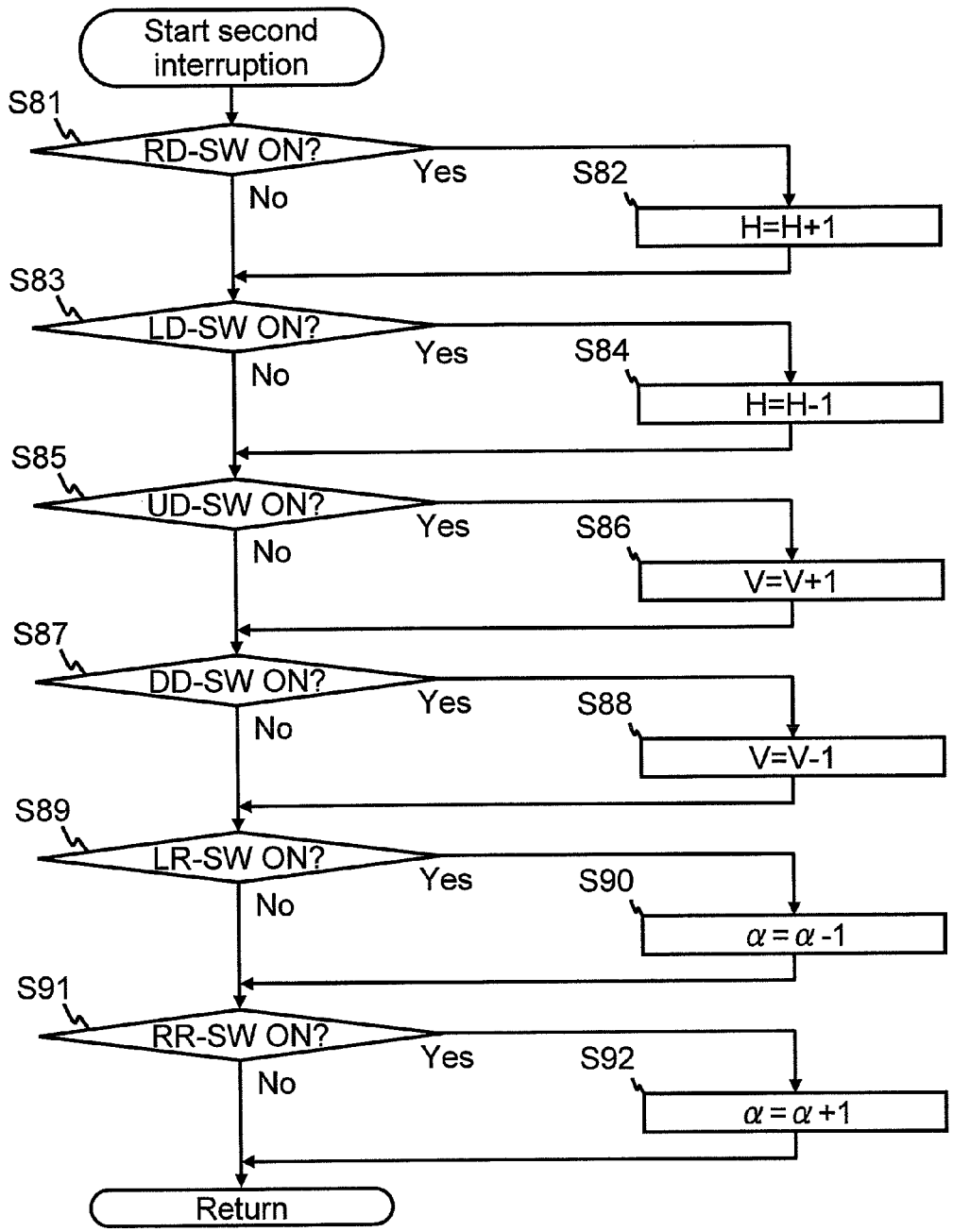
FIG. 28 is a flowchart that shows the details of the second timer interrupt process.

Next, the second timer interrupt process in the embodiment, which commences in step S13 of FIG. 25 and is performed at every predetermined time interval (1 ms) independent of the other operations, is explained using the flowchart of FIG. 28.

When the second timer interrupt process commences, the CPU 21 determines whether the right direction key 16a is depressed so that the right direction switch (RD-SW in FIG. 28) is set to the ON state, in step S81.

When the CPU 21 determines that the right direction switch is set to the ON state, the operation continues to step S82. Otherwise, the operation proceeds to step S83.

In step S82, the CPU 21 incrementally increases the horizontal movement quantity H. In the embodiment, the CPU 21 adds 1 to the value of the horizontal movement quantity H. Then, the operation continues to step S83.

In step S83, the CPU 21 determines whether the left direction key 16b is depressed so that the left direction switch (LD-SW in FIG. 28) is set to the ON state.

When the CPU 21 determines that the left direction switch is set to the ON state, the operation continues to step S84. Otherwise, the operation proceeds to step S85.

In step S84, the CPU 21 incrementally decreases the horizontal movement quantity H. In the embodiment, the CPU 21 subtracts 1 from the value of the horizontal movement quantity H. Then, the operation continues to step S85.

In step S85, the CPU 21 determines whether the upward direction key 16c is depressed so that the upward direction switch (UD-SW in FIG. 28) is set to the ON state.

When the CPU 21 determines that the upward direction switch is set to the ON state, the operation continues to step S86. Otherwise, the operation proceeds to step S87.

In step S86, the CPU 21 incrementally increases the vertical movement quantity V. In the embodiment, the CPU 21 adds 1 to the value of the vertical movement quantity V. Then, the operation continues to step S87.

In step S87, the CPU 21 determines whether the downward direction key 16d is depressed so that the downward direction switch (DD-SW in FIG. 28) is set to the ON state.

When the CPU 21 determines that the downward direction switch is set to the ON state, the operation continues to step S88. Otherwise, the operation proceeds to step S89.

In step S88, the CPU 21 incrementally decreases the vertical movement quantity V. In the embodiment, the CPU 21 subtracts 1 from the value of the vertical movement quantity V. Then, the operation continues to step S89.

In step S89, the CPU 21 determines whether the left-hand rotation key 16f is depressed so that the left-hand rotation switch (LR-SW in FIG. 28) is set to the ON state.

When the CPU 21 determines that the left-hand rotation switch is set to the ON state, the operation continues to step S90. Otherwise, the operation proceeds to step S91.

In step S90, the CPU 21 incrementally decreases the rotation quantity $\alpha$. In the embodiment, the CPU 21 subtracts 1 from the value of the rotation quantity $\alpha$. Then, the operation continues to step S91.

In step S92, the CPU 21 determines whether the right-hand rotation key 16e is depressed so that the right-hand rotation switch (RR-SW in FIG. 28) is set to the ON state.

When the CPU 21 determines that the right-hand rotation switch is set to the ON state, the operation continues to step S92. Otherwise, the operation ends.

In step S92, the CPU 21 incrementally increases the rotation quantity $\alpha$. In the embodiment, the CPU 21 adds 1 to the value of the rotation quantity $\alpha$. Then, the operation ends.

Next, the calculation of the position S (the movement position Sx of the horizontal driving point DPx, the movement position Syl of the first vertical driving point DPyl, and the movement position Syr of the second vertical driving point DPyr) where the movable platform 30a should be moved, which is performed in step S60 of FIG. 26, is explained using the flowchart of FIGS. 29 and 30.

When the calculation of the position S commences, the CPU 21 calculates the first movement quantity Rx and the second movement quantity Ry on the basis of the rotation quantity $\alpha$, in step S101.

In step S102, the CPU 21 determines whether the absolute value of the first movement quantity Rx is larger than the first horizontal movement quantity Tsx, or whether the absolute value of the second movement quantity Ry is larger than the first vertical movement quantity Tsy.

When the CPU 21 determines that the absolute value of the first movement quantity Rx is not larger than the first horizontal movement quantity Tsx, and that the absolute value of the second movement quantity Ry is not larger than the first vertical movement quantity Tsy, the CPU 21 determines that the movable platform 30a does not make contact with the frame of the movement range of the movable platform 30a, even if the movable platform 30a rotates in accordance to the rotation quantity $\alpha$ under the condition in which the movable platform 30a performs the horizontal shift in accordance to the horizontal movement quantity H and performs the vertical shift in accordance to the vertical movement quantity V. Then, the operation continues to step S103.

Otherwise (when the condition in step S102 is true), the CPU 21 determines that a part of the movable platform 30a makes contact with the frame of the movement range of the movable platform 30a if the movable platform 30a rotates in accordance to the rotation quantity $\alpha$ under the condition in which the movable platform 30a performs the horizontal shift in accordance to the horizontal movement quantity H and performs the vertical shift in accordance to the vertical movement quantity V. Then, the operation proceeds to step S106.

In step S103, the CPU 21 calculates the first horizontal shift quantity SHX1, the first vertical shift quantity SHY1, and the third vertical shift quantity SHY3, on the basis of the rotation quantity $\alpha$.

In step S104, the CPU 21 calculates the second horizontal movement quantity Ksx on the basis of the first horizontal movement quantity Tsx, the first movement quantity Rx, and the horizontal movement quantity H. The CPU 21 calculates the second vertical movement quantity Ksy on the basis of the first vertical movement quantity Tsy, the second movement quantity Ry, and the vertical movement quantity V.

In step S105, the CPU 21 releases (aborts) the warning indication. Specifically, if the first warning regarding a non-rotatable condition is being displayed, in other words, if the first information IN1 including the inclined first frame F1 is being indicated, the CPU 21 releases (cancels) the inclined state of the first frame F1.

In step S106, the CPU 21 determines whether the rotation quantity $\alpha$ is less than 0.

When the CPU 21 determines that the rotation quantity $\alpha$ is not less than 0, the CPU 21 determines that the picture-composition cannot be rotated in the right-hand direction (clockwise direction) and the operation continues to step S107.

When the CPU 21 determines that the rotation quantity $\alpha$ is less than 0, the CPU 21 determines that the picture-composition cannot be rotated in the left-hand direction (counter-clockwise direction) and the operation proceeds to step S108.

In step S107, the first warning regarding a non-rotatable condition on the first information IN1 is displayed under the condition in which the first frame F1 is inclined to the lower right, one or more corners of the rectangle of the first frame F1 makes contact with the second frame F2, and the side(s) of the rectangle of the second frame F2 making contact with the corner(s) of the first frame F1 is (are) emphasized.

In step S108, the first warning regarding a non-rotatable condition on the first information IN1 is displayed under the condition in which the first frame F1 is inclined to the lower left, one or more corners of the rectangle of the first frame F1 makes contact with the second frame F2, and the side(s) of the rectangle of the second frame F2 making contact with the corner(s) of the first frame F1 is (are) emphasized (see FIG. 10).

In step S109, the CPU 21 determines whether the absolute value of the horizontal movement quantity H is larger than the second horizontal movement quantity Ksx.

When the CPU 21 determines that the absolute value of the horizontal movement quantity H is not larger than the second horizontal movement quantity Ksx, the CPU 21 determines that the movable platform 30a does not make contact with the frame of the movement range of the movable platform 30a even if the movable platform 30a performs the horizontal shift in accordance to the horizontal movement quantity H. Then, the operation continues to step S110.

Otherwise, the CPU 21 determines that a part of the movable platform 30a makes contact with the frame of the movement range of the movable platform 30a if the movable platform 30a performs the horizontal shift in accordance to the horizontal movement quantity H. Then, the operation proceeds to step S113.

In step S110, the CPU 21 sets the value of the second horizontal shift quantity SHX2 to the horizontal movement quantity H.

In step S111, the CPU 21 calculates the first horizontal movement quantity Tsx on the basis of the second horizontal movement quantity Ksx the horizontal movement quantity H, and the first movement quantity Rx.

In step S112, the CPU 21 releases (aborts) the warning indication. Specifically, if the second warning regarding an unmovable condition in the horizontal direction is being displayed, in other words, if the first information IN1 including the emphasized right edge etc., of the second frame F2 is being indicated, the CPU 21 releases (cancels) the emphasized state of the right edge etc., of the second frame F2.

In step S113, the CPU 21 determines whether the horizontal movement quantity H is less than 0.

When the CPU 21 determines that the horizontal movement quantity H is less than 0, the CPU 21 determines that the horizontal shift of the picture-composition in the left direction cannot be performed (the movement of the movable platform 30a in the right direction, as viewed from the rear, cannot be performed). Then, the operation continues to step S114.

Otherwise, the CPU determines that the horizontal shift of the picture-composition in the right direction cannot be performed (the movement of the movable platform 30a in the left direction, as viewed from the rear, cannot be performed). Then, the operation proceeds to step S115.

In step S114, the second warning regarding an unmovable condition in the horizontal direction on the first information IN1 is displayed under the condition in which the left side of the rectangle of the second frame F2 is emphasized.

In step S115, the second warning regarding an unmovable condition in the horizontal direction on the first information IN1 is displayed under the condition in which the right side of the rectangle of the second frame F2 is emphasized.

In step S116, the CPU 21 determines whether the absolute value of the vertical movement quantity V is larger than the second vertical movement quantity Ksy.

When the CPU 21 determines that the absolute value of the vertical movement quantity V is not larger than the second vertical movement quantity Ksy, the CPU 21 determines that the movable platform 30a does not make contact with the frame of the movement range of the movable platform 30a even if the movable platform 30a performs the vertical shift in accordance to the vertical movement quantity V. Then, the operation continues to step S117.

Otherwise, the CPU 21 determines that a part of the movable platform 30a makes contact with the frame of the movement range of the movable platform 30a if the movable platform 30a performs the vertical shift in accordance to the vertical movement quantity V. Then, the operation proceeds to step S120.

In step S117, the CPU 21 sets the values of the second vertical shift quantity SHY2 and the fourth vertical shift quantity SHY4 to the vertical movement quantity V.

In step S118, the CPU 21 calculates the first vertical movement quantity Tsy, on the basis of the second vertical movement quantity Ksy, the vertical movement quantity V, and the second movement quantity Ry.

In step S119, the CPU 21 releases (aborts) the warning indication. Specifically, if the third warning regarding an unmovable condition in either vertical direction (up or down) is being displayed, in other words, if the first information IN1 including the emphasized upper edge etc. of the second frame F2 is being indicated, the CPU 21 releases (cancels) the emphasized state of the upper edge etc. of the second frame F2.

In step S120, the CPU 21 determines whether the vertical movement quantity V is less than 0.

When the CPU 21 determines that the vertical movement quantity V is less than 0, the CPU 21 determines that the vertical shift of the picture-composition in the downward direction cannot be performed (the movement of the movable platform 30a in the downward direction cannot be performed). Then, the operation continues to step S121.

Otherwise, the CPU determines that the vertical shift of the picture-composition in the upward direction cannot be performed (the movement of the movable platform 30a in the upward direction cannot be performed). Then, the operation proceeds to step S122.

In step S121, the third warning regarding an unmovable condition in the vertical direction (downward) on the first information IN1 is displayed under the condition in which the lower edge of the rectangle of the second frame F2 is emphasized.

In step S122, the third warning regarding an unmovable condition in the vertical direction (upward) on the first information IN1 is displayed under the condition in which the upper edge of the rectangle of the second frame F2 is emphasized.

In step S123, the CPU 21 calculates the horizontal component of the position S (the movement position Sx of the horizontal driving point DPx) on the basis of the first horizontal shift quantity SHX1 and the second horizontal shift quantity SHX2.

The CPU 21 calculates the first vertical component of the position S (the movement position Syl of the first vertical driving point DPyl) on the basis of the first vertical shift quantity SHY1 and the second vertical shift quantity SHY2.

The CPU 21 calculates the second vertical component of the position S (the movement position Syr of the second vertical driving point DPyr) on the basis of the third vertical shift quantity SHY3 and the fourth vertical shift quantity SHY4.

Figure 31:
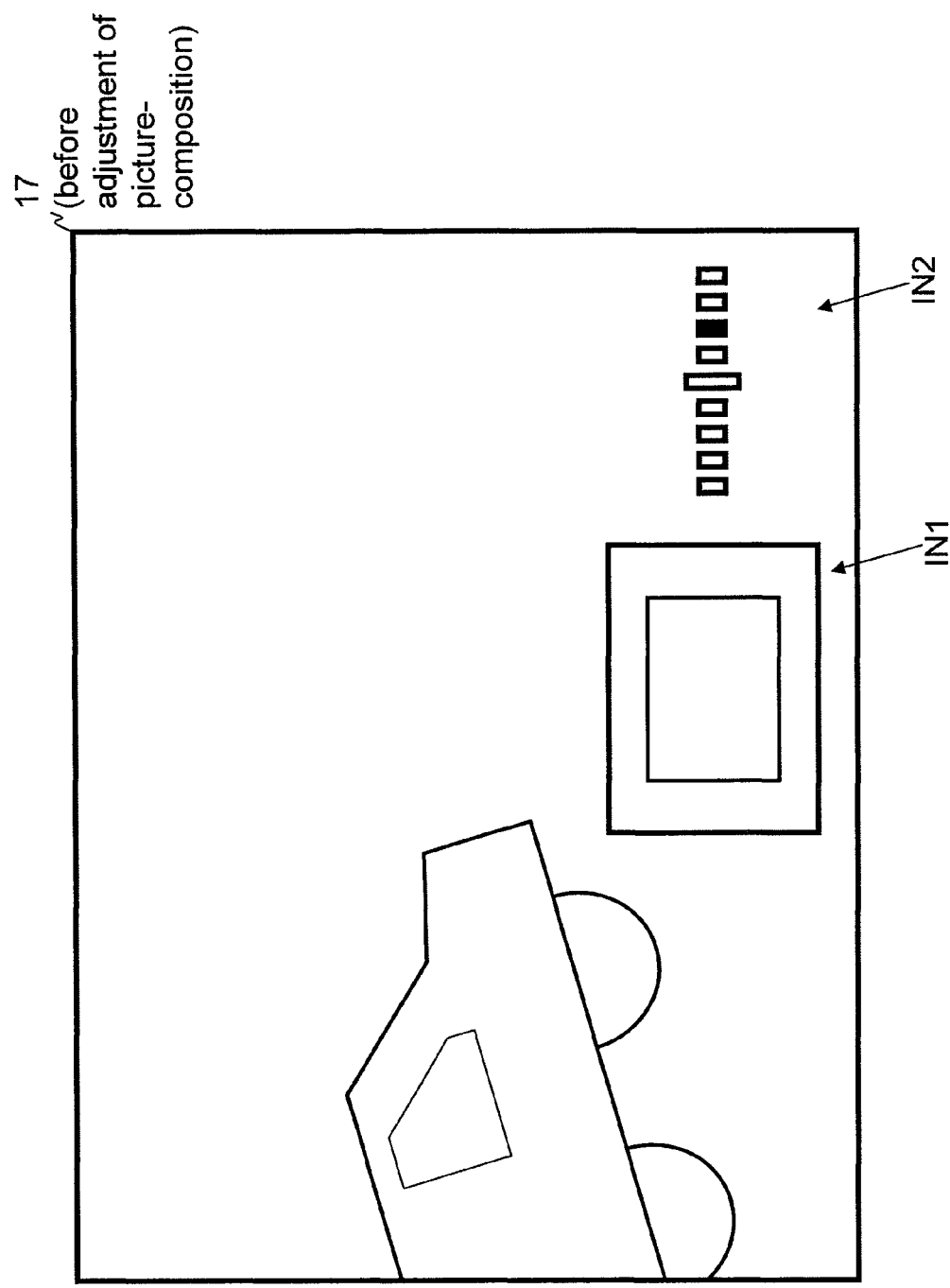
FIG. 31 is the through image, which includes the second information, by using the bar (indicator)

Note that the second information IN2 may indicate only the movable platform inclination angle LVL by using a bar (indicator) as the information regarding the sum of the camera inclination angle and the rotation quantity (see FIG. 31).

Furthermore, it is explained that the hall sensor is configured to perform position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be configured to perform position detection purposes. When one of either the MI sensor, the magnetic resonance-type magnetic-field detecting element, or the MR element is used, the information regarding the position of the movable platform can be obtained by detecting the magnetic-field change, similar to using the hall sensor.

Furthermore, the movable platform 30a may be used as an anti-shake (stabilization) apparatus.

When the anti-shake operation is performed, the CPU 21 performs a controlled movement of the movable platform 30a on the basis of the hand-shake quantity detected by the angular velocity sensor etc., without considering the horizontal movement quantity H, the vertical movement quantity V, and the rotation quantity α that are set by using the picture-composition adjustment keys 16.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application Nos. 2008-326471, 2008-326514, 2008-326561, and 2008-326573 (filed on Dec. 22, 2008), which are expressly incorporated herein by reference, in their entirety.

The invention claimed is:

1. A photographic apparatus comprising:
a movable platform that has an imager that captures an optical image through a taking lens, and is movable relative to said taking lens on an xy plane perpendicular to an optical axis of said taking lens;
an operation unit that is configured to set a movement quantity of said movable platform on the xy plane;
a controller that performs a controlled movement of said movable platform in accordance to said movement quantity set by using said operation unit; and
a display that displays first information regarding a positional relationship between said movable platform and a movement limit of said movable platform, the first information being displayed at a predetermined fixed position in a predetermined portion of the display, while the controller controls movement of the movable platform, wherein said display further displays a through image generated by performing an image-processing operation on the optical image captured by said imager.

2. The photographic apparatus according to claim 1, wherein said movable platform is configured to perform an anti-shake operation; and
said controller performs said controlled movement of said movable platform without considering said movement quantity set by using said operation unit when said anti-shake operation is performed.

3. The photographic apparatus according to claim 1, wherein said operation unit and said display are arranged on a rear surface of said photographic apparatus;
said controller moves said movable platform in a left direction, as viewed from a rear, when said operation unit is operated so as to move a picture-composition in a right direction;
said controller moves said movable platform in the right direction, as viewed from said rear, when said operation unit is operated so as to move said picture-composition in the left direction;
said controller moves said movable platform in a downward direction, when said operation unit is operated so as to move said picture-composition in an upward direction;
said controller moves said movable platform in the upward direction, when said operation unit is operated so as to move said picture-composition in the downward direction;
said controller rotates said movable platform in a clockwise direction, as viewed from said rear, when said operation unit is operated so as to rotate said picture-composition in the clockwise direction; and
said controller rotates said movable platform in a counter-clockwise direction, as viewed from said rear, when said operation unit is operated so as to rotate said picture-composition in the counter-clockwise direction.

4. The photographic apparatus according to claim 1, wherein said controller determines whether said movable platform is in an unmovable state in which said movable platform cannot be moved on the xy plane in accordance to said movement quantity; and
wherein said display displays said first information such that said unmovable state is emphasized, when said controller determines that said movable platform is in said unmovable state.

5. The photographic apparatus according to claim 4, wherein said first information has a first frame and a second frame, said first frame schematically showing an outline of said movable platform, and said second frame schematically showing said movement limit of said movable platform; and
wherein when said controller determines that said movable platform is in said unmovable state, said display displays said first frame and said second frame such that an indication state of at least one of said first frame and said second frame is different from when said movable platform is in a movable state in which said movable platform can be moved on the xy plane in accordance to said movement quantity, in order to emphasize said unmovable state.

6. The photographic apparatus according to claim 5, wherein said movable platform is movable and also rotatable on the xy plane;
wherein when said controller determines that said movable platform is in a non-rotatable state in which said movable platform cannot be rotated on the xy plane, said display displays said first information such that an indication state of said first frame is different from when said movable platform is in a rotatable state in which said movable platform can be rotated on the xy plane; and
wherein when said controller determines that said movable platform is in said unmovable state, said display displays said first information such that an indication state of said second frame is different from when said movable platform is in said movable state.

7. The photographic apparatus according to claim 5, wherein the second frame has a rectangular shape, and when the controller determines that the movable platform cannot be moved vertically, at least one of the top edge and the bottom edge of the second frame is emphasized, and when the controller determines that the movable platform cannot be moved horizontally, at least one of the left edge and the right edge of the second frame is emphasized.

8. The photographic apparatus according to claim 5, wherein the display displays the entire first frame and second frame in a lower half of the display screen.

9. The photographic apparatus according to claim 5, wherein the first frame is displayed inside the second frame, and the first frame and the second frames are displayed such that the position of the first frame relative to the second frame does not change, regardless of a current position of the movable platform.

10. The photographic apparatus according to claim 1, wherein said operation unit has a horizontal direction key that is configured to move said movable platform in a horizontal direction and a vertical direction key that is configured to move said movable platform in a vertical direction.

11. The photographic apparatus according to claim 1, wherein said movable platform is movable and also rotatable on the xy plane; and wherein said operation unit has a horizontal direction key that is configured to move said movable platform in a horizontal direction, a vertical direction key that is configured to move said movable platform in a vertical direction, and a rotation key that is configured to rotate said movable platform.

12. The photographic apparatus according to claim 1, wherein said operation unit has keys, each of said keys including a backlight or a light; and wherein an ON/OFF state of said backlight or light of an invalid key among said keys is differentiated from an ON/OFF state of said backlight or light of a valid key among said keys, when said controller determines that said movable platform is in an unmovable state in which said movable platform cannot be moved on the xy plane in accordance to said movement quantity.

13. The photographic apparatus according to claim 1, wherein said operation unit has keys, said keys being included in a touch panel; and wherein an indication state of an invalid key among said keys is differentiated from an indication state of a valid key among said keys, when said controller determines that said movable platform is in an unmovable state in which said movable platform cannot be moved on the xy plane in accordance to said movement quantity.

14. The photographic apparatus according to claim 1, wherein said operation unit has keys; and wherein said operation unit issues a warning, when an invalid key among said keys corresponding to an unmovable state in which said movable platform cannot be moved in the xy plane in accordance to said movement quantity, is operated, and when said controller determines that said movable platform is in said unmovable state.

15. The photographic apparatus according to claim 1, wherein when movement limit is reached, the first information comprises applying an emphasis to an edge of a displayed frame defining a direction in which the movement limit has been reached.

16. The photographic apparatus according to claim 1, wherein the first information comprising self-contained image, distinct from the through image in remainder of display area.

17. A photographic apparatus comprising:

a movable platform that has an imager that captures an optical image through a taking lens, and is movable and rotatable relative to said taking lens on an xy plane perpendicular to an optical axis of said taking lens;

an operation unit that is configured to set a movement quantity and a rotation quantity of said movable platform on the xy plane;

a controller that performs a controlled movement of said movable platform in accordance to said movement quantity and said rotation quantity set by using said operation unit; and a display that displays first information regarding a positional relationship between said movable platform and a movement limit of said movable platform, the first information being displayed at a predetermined fixed position in a predetermined portion of the display, while the controller controls movement of the movable platform, wherein said display further displays a through image generated by performing an image-processing operation on the optical image captured by said image, wherein the display further displays second information regarding a sum of a camera inclination angle of said photographic apparatus and said rotation quantity, and wherein said camera inclination angle is formed by rotation of said photographic apparatus around said optical axis, as measured with respect to a level plane perpendicular to the direction of gravitational force.

18. The photographic apparatus according to claim 17, wherein said display displays said second information by indicating a first inclination state of said movable platform as measured with respect to the level plane.

19. The photographic apparatus according to claim 18, wherein said display displays information regarding said camera inclination angle by indicating a second inclination state of said photographic apparatus as measured with respect to the level plane, and wherein said display displays information regarding said rotation quantity by indicating a third inclination state of said movable platform with respect to said photographic apparatus.

20. The photographic apparatus according to claim 17, wherein said operation unit has a rotation key that is configured to rotate said movable platform.

21. The photographic apparatus according to claim 17, wherein said first information has a first frame and a second frame, said first frame schematically showing an outline of said movable platform, and said second frame schematically showing said movement limit of said movable platform;

wherein said controller determines whether said movable platform is in a non-rotatable state in which said movable platform cannot be rotated on the xy plane in accordance to said rotation quantity; and wherein when said controller determines that said movable platform is in said non-rotatable state, said display displays said first frame and said second frame such that an indication state of at least one of said first frame and said second frame is different from when said movable platform is in a rotatable state in which said movable platform can be rotated on the xy plane in accordance to said rotation quantity.

22. The photographic apparatus according to claim 21, wherein the second frame has a rectangular shape, and
when the controller determines that the movable platform cannot be moved vertically, at least one of the top edge and the bottom edge of the second frame is emphasized, and
when the controller determines that the movable platform cannot be moved horizontally, at least one of the left edge and the right edge of the second frame is emphasized.

23. The photographic apparatus according to claim 21, wherein the display displays the entire first frame and second frame in a lower half of the display screen.

24. The photographic apparatus according to claim 21, wherein the first frame is displayed inside the second frame, and
the first frame and the second frames are displayed such that the position of the first frame relative to the second frame does not change, regardless of a current position of the movable platform.

25. The photographic apparatus according to claim 17, wherein when movement limit is reached, the first information comprises applying an emphasis to an edge of a displayed frame defining a direction in which the movement limit has been reached.

* * * * *